(12) United States Patent
Shimomura et al.

(10) Patent No.: US 7,197,246 B2
(45) Date of Patent: Mar. 27, 2007

(54) OPTICAL SWITCH, OPTICAL AMPLIFIER AND OPTICAL POWER CONTROLLER AS WELL AS OPTICAL ADD-DROP MULTIPLEXER

(75) Inventors: Hirofumi Shimomura, Tokyo (JP); Seigo Takahashi, Tokyo (JP); Naoya Henmi, Tokyo (JP)

(73) Assignee: NEC Corporation, Tokyo (JP)

( * ) Notice: Subject to any disclaimer, the term of this patent is extended or adjusted under 35 U.S.C. 154(b) by 615 days.

(21) Appl. No.: 10/227,892

(22) Filed: Aug. 27, 2002

(65) Prior Publication Data

US 2003/0048507 A1 Mar. 13, 2003

Related U.S. Application Data

(62) Division of application No. 09/939,665, filed on Aug. 28, 2001, now Pat. No. 6,466,344, which is a division of application No. 09/181,620, filed on Oct. 28, 1998, now Pat. No. 6,424,440.

(30) Foreign Application Priority Data

| Oct. 28, 1997 | (JP) | ................................... 9-311070 |
| Oct. 28, 1997 | (JP) | ................................... 9-311071 |
| Oct. 30, 1997 | (JP) | ................................... 9-298427 |

(51) Int. Cl.
*H04J 14/02* (2006.01)
(52) U.S. Cl. .............................. 398/83; 398/79; 398/82; 398/85; 398/59; 398/91; 398/92; 398/66; 398/67; 398/68; 398/70; 398/71; 398/72; 385/24; 385/37; 385/16; 385/17; 385/18
(58) Field of Classification Search .................. 398/79, 398/82, 83, 84, 85, 91, 92, 59, 66, 67, 68, 398/70, 71, 72; 385/24, 37, 16, 17, 18
See application file for complete search history.

(56) References Cited

U.S. PATENT DOCUMENTS 4,317,614 A * 3/1982 Palmer .......................... 385/24

(Continued)

FOREIGN PATENT DOCUMENTS

EP 0 442 518 A2 8/1991

(Continued)

*Primary Examiner*—Hanh Phan
(74) *Attorney, Agent, or Firm*—Young & Thompson

(57) ABSTRACT

The first present invention provides an optical switch including the following elements. At least a plurality of optical transmission lines are provided for transmissions of optical signals. Each of the at least plurality of optical transmission lines have at least an impurity doped fiber. At least an excitation light source is provided for emitting an excitation light. At least an excitation light switch is provided which is connected to the excitation light source and also connected to the at least plurality of optical transmission lines for individual switching operations to supply the excitation light to the at least plurality of optical transmission lines to feed the excitation light to the impurity doped fiber on the at least plurality of optical transmission lines, thereby causing an excitation of the impurity doped fiber on selected one of the at least plurality of optical transmission lines so as to permit a transmission of the optical signal through the excited impurity doped fiber, whilst unselected one of the impurity doped fibers is unexcited whereby the optical signals are absorbed into the unselected one of the impurity doped fibers thereby to discontinue transmission of the optical signal by the unselected one of the impurity doped fibers.

28 Claims, 20 Drawing Sheets

U.S. PATENT DOCUMENTS

| | | | | |
|---|---|---|---|---|
| 5,121,450 | A | 6/1992 | Eichen et al. | |
| 5,170,451 | A * | 12/1992 | Ohshima | 385/43 |
| 5,241,414 | A | 8/1993 | Giles et al. | |
| 5,473,599 | A | 12/1995 | Li et al. | |
| 5,502,589 | A | 3/1996 | Yamamoto et al. | |
| 5,555,118 | A | 9/1996 | Huber | |
| 5,570,218 | A | 10/1996 | Sotom | |
| 5,572,357 | A | 11/1996 | Nakazato et al. | |
| 5,598,294 | A | 1/1997 | Uno et al. | |
| 5,633,741 | A | 5/1997 | Giles | |
| 5,748,350 | A * | 5/1998 | Pan et al. | 398/87 |
| 5,751,456 | A | 5/1998 | Koonen | |
| 5,778,118 | A | 7/1998 | Sridhar | |
| 5,793,508 | A | 8/1998 | Meli | |
| 5,812,307 | A | 9/1998 | Naganuma | |
| 5,812,710 | A | 9/1998 | Sugaya | |
| 5,815,613 | A | 9/1998 | Fatehi et al. | |
| 5,900,969 | A * | 5/1999 | Srivastava et al. | 359/341.42 |
| 5,914,799 | A | 6/1999 | Tan | |
| 5,933,270 | A | 8/1999 | Toyohara | |
| 6,016,219 | A | 1/2000 | Fatehi et al. | |
| 6,069,731 | A | 5/2000 | Bayart | |
| 6,122,095 | A | 9/2000 | Fatehi | |
| 6,122,096 | A | 9/2000 | Fatehi | |
| 6,208,443 | B1 * | 3/2001 | Liu et al. | 398/9 |
| 6,297,902 | B1 | 10/2001 | Kosaka et al. | |
| 6,344,914 | B1 | 2/2002 | Shimojoh et al. | |

FOREIGN PATENT DOCUMENTS

| | | |
|---|---|---|
| EP | 0 503 849 A2 | 9/1992 |
| EP | 0 585 126 A2 | 3/1994 |
| EP | 0 729 248 A2 | 8/1996 |
| EP | 0 851 543 A2 | 7/1998 |
| EP | 1 011 231 A2 | 6/2000 |
| FR | 2 756 689 | 6/1998 |
| JP | 59-135441 | 8/1984 |
| JP | 2-2768 | 1/1990 |
| JP | 2-291531 | 12/1990 |
| JP | 3-7917 | 1/1991 |
| JP | 3-207139 | 9/1991 |
| JP | 3-235922 | 10/1991 |
| JP | 4-9929 | 1/1992 |
| JP | 4-251828 | 9/1992 |
| JP | 4-260381 | 9/1992 |
| JP | 4-362834 | 12/1992 |
| JP | 5-29686 | 2/1993 |
| JP | 5-41697 | 2/1993 |
| JP | 6-51252 | 2/1994 |
| JP | 6-324368 | 11/1994 |
| JP | 7-226560 | 8/1995 |
| JP | 7-245436 | 9/1995 |
| JP | 9-36834 | 2/1997 |
| JP | 9-96785 | 4/1997 |
| JP | 9-98135 | 4/1997 |
| JP | 9-258148 | 10/1997 |
| JP | 11-46029 | 2/1999 |
| JP | 11-46030 | 2/1999 |
| JP | 11-55700 | 2/1999 |
| JP | 11-98087 | 4/1999 |
| WO | 96/32787 | 10/1996 |
| WO | 97/32372 | 9/1997 |
| WO | 00/72485 A1 | 11/2000 |

* cited by examiner

OPTICAL SWITCH, OPTICAL AMPLIFIER AND OPTICAL POWER CONTROLLER AS WELL AS OPTICAL ADD-DROP MULTIPLEXER

This application is a division of application Ser. No. 09/939,665, filed on Aug. 28, 2001, now U.S. Pat. No. 6,466,344 which is a division of application Ser. No. 09/181,620, filed on Oct. 28, 1998, now U.S. Pat. No. 6,424,440 the entire contents of which are hereby incorporated by reference

BACKGROUND OF THE INVENTION

The present invention relates to an optical switch, an optical amplifier and an optical power controller as well as an optical add-drop multiplexer.

SUMMARY OF THE INVENTION

Accordingly, it is an object of the present invention to provide a novel optical switch free from the above problems.

It is a further object of the present invention to provide a novel optical amplifier.

It is a still further object of the present invention to provide a novel optical power controller.

It is yet a further object of the present invention to provide a novel optical add-drop multiplexer.

The first present invention provides an optical switch including the following elements. At least a plurality of optical transmission lines are provided for transmissions of optical signals. Each of the at least plurality of optical transmission lines have at least an impurity doped fiber. At least an excitation light source is provided for emitting an excitation light. At least an excitation light switch is provided which is connected to the excitation light source and also connected to the at least plurality of optical transmission lines for individual switching operations to supply the excitation light to the at least plurality of optical transmission lines to feed the excitation light to the impurity doped fiber on the at least plurality of optical transmission lines, thereby causing an excitation of the impurity doped fiber on selected one of the at least plurality of optical transmission lines so as to permit a transmission of the optical signal through the excited impurity doped fiber, whilst unselected one of the impurity doped fibers is unexcited whereby the optical signals are absorbed into the unselected one of the impurity doped fibers thereby to discontinue transmission of the optical signal by the unselected one of the impurity doped fibers.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
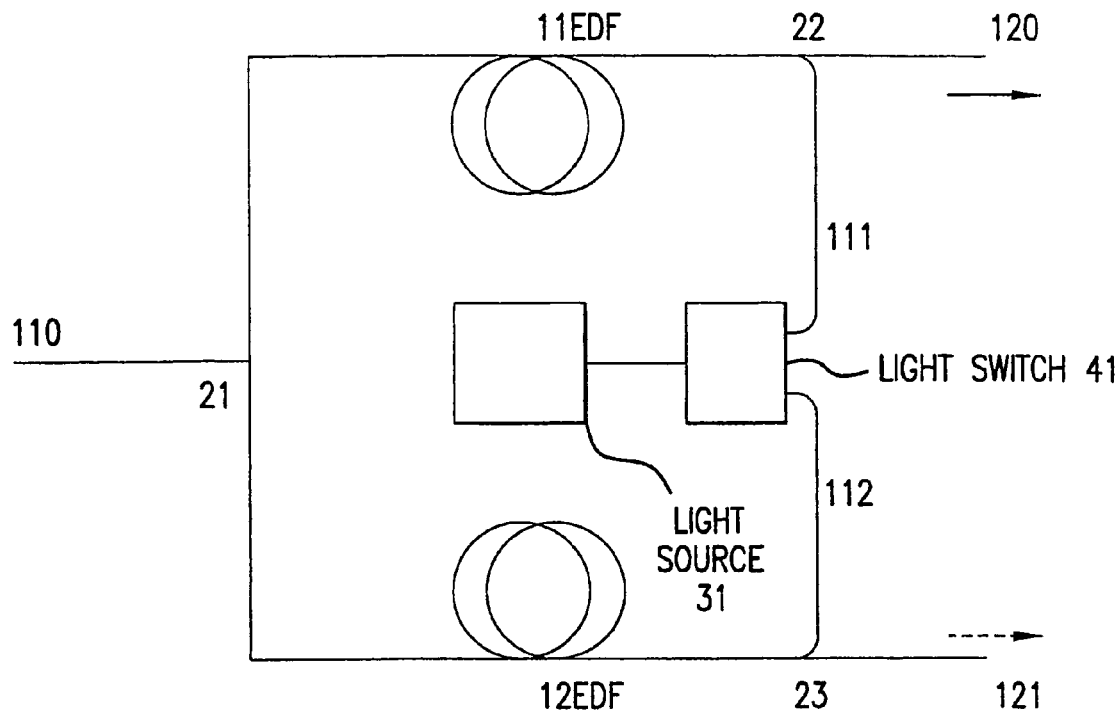
FIG. 1 is a diagram illustrative of a first novel optical switch having a single input and two outputs in a first embodiment in accordance with the present invention.

The first present invention provides an optical switch including the following elements. At least a plurality of optical transmission lines are provided for transmissions of optical signals. Each of the at least plurality of optical transmission lines have at least an impurity doped fiber. At least an excitation light source is provided for emitting an excitation light. At least an excitation light switch is provided which is connected to the excitation light source and also connected to the at least plurality of optical transmission lines for individual switching operations to supply the excitation light to the at least plurality of optical transmission lines to feed the excitation light to the impurity doped fiber on the at least plurality of optical transmission lines, thereby causing an excitation of the impurity doped fiber on selected one of the at least plurality of optical transmission lines so as to permit a transmission of the optical signal through the excited impurity doped fiber, whilst unselected one of the impurity doped fibers is unexcited whereby the optical signals are absorbed into the unselected one of the impurity doped fibers thereby to discontinue transmission of the optical signal by the unselected one of the impurity doped fibers.

It is preferable that the optical switch further includes: a single input side optical transmission line; and a single input side optical coupler connected to the single input side optical transmission line, and wherein the at least plurality of optical transmission lines comprise first and second optical transmission lines which are connected through the single input side optical coupler to the single input side optical transmission line, and the first and second optical transmission lines have first and second impurity doped fibers, and wherein the at least excitation light source comprises a single excitation light source, and the at least excitation light switch comprises a single excitation light switch which has first and second output terminals for selecting any one of the first and second output terminals, and the first output terminal is connected through a first optical coupler to the first impurity doped first to feed the excitation light to the first impurity doped fiber only when the first output terminal is selected by the single excitation light switch, and the second output terminals is connected through a second optical coupler to the second impurity doped fiber to feed the excitation light to the second impurity doped fiber only when the second output terminal is selected by the single excitation light switch.

It is preferable further comprise first and second optical filers. The first optical filter is provided on the first optical transmission line and positioned between the first optical coupler and an output terminal of the first optical transmission line so as to remove a noise from the first optical signal when the first impurity doped fiber is excited. The second optical filter is provided on the second optical transmission line and positioned between the second optical coupler and an output terminal of the second optical transmission line so as to remove a noise from the second optical signal when the second impurity doped fiber is excited.

It is preferable further comprise the following elements. A first optical reflective mirror is provided on one end of the first optical transmission line for reflecting the first optical signal passed through the first impurity doped fiber excited so that the reflected first optical signal is again transmitted through the first impurity doped fiber excited to an opposite end as an output terminal of the first optical transmission line. A first optical isolator is provided between the input side optical coupler and the first optical transmission line for permitting a unidirectional transmission of an optical signal from the input side optical coupler to the first optical transmission line. A second optical reflective mirror is provided on one end of the second optical transmission line for reflecting the second optical signal passed through the second impurity doped fiber excited so that the reflected second optical signal is again transmitted through the second impurity doped fiber excited to an opposite end as an output terminal of the second optical transmission line. A second optical isolator is provided between the input side optical coupler and the second optical transmission line for permitting a unidirectional transmission of an optical signal from the input side optical coupler to the second optical transmission line.

It is preferable further comprise the following elements. A first optical reflective mirror is provided on one end of the first optical transmission line for reflecting the first optical signal passed through the first impurity doped fiber excited so that the reflected first optical signal is again transmitted through the first impurity doped fiber excited to an opposite end as an output terminal of the first optical transmission line. A second optical reflective mirror is provided on one end of the second optical transmission line for reflecting the second optical signal passed through the second impurity doped fiber excited so that the reflected second optical signal is again transmitted through the second impurity doped fiber excited to an opposite end as an output terminal of the second optical transmission line. A circulator is provided as the input side optical coupler and an optical isolator provided between the input side optical transmission line and the first and second optical transmission lines.

It is preferable that the first optical coupler is inserted between the first impurity doped fiber and an output terminal of the first optical transmission line so as to feed the excitation light to the first impurity doped fiber in an opposite direction to a transmission of the first optical signal through the first impurity doped fiber excited, and also the second optical coupler is inserted between the second impurity doped fiber and an output terminal of the second optical transmission line so as to feed the excitation light to the second impurity doped fiber in an opposite direction to a transmission of the second optical signal through the second impurity doped fiber excited.

It is preferable that the first optical coupler is inserted between the first impurity doped fiber and the input side optical coupler so as to feed the excitation light to the first impurity doped fiber in the same direction as a transmission of the first optical signal through the first impurity doped fiber excited, and also the second optical coupler is inserted between the second impurity doped fiber and the input side optical coupler so as to feed the excitation light to the second impurity doped fiber in the same direction as a transmission of the second optical signal through the second impurity doped fiber excited.

It is preferable that the optical switch has two inputs and two outputs and comprises a pair of first and second optical switches connected to each other through at least an interconnecting optical transmission line, and wherein each of the first and second optical switches further comprises the following elements. A single input side optical coupler is provided which is connected to the single input side optical transmission line. First and second optical transmission lines are connected through the single input side optical coupler to the single input side optical transmission line. The first and second optical transmission lines have first and second impurity doped fibers. A single excitation light source is provided. A single excitation light switch is provided which has first and second output terminals for selecting any one of the first and second output terminals. The first output terminal is connected through a first optical coupler to the first impurity doped fiber to feed the excitation light to the first impurity doped fiber only when the first output terminal is selected by the single excitation light switch. The second output terminal is connected through a second optical coupler to the second impurity doped fiber to feed the excitation light to the second impurity doped fiber only when the second output terminal is selected by the single excitation light switch.

It is preferable that each of the first and second optical switches further comprises first and second optical filters. The first optical filter is provided on the first optical transmission line and positioned between the first optical coupler and an output terminal of the first optical transmission line so as to remove a noise from the first optical signal when the first impurity doped fiber is excited. The second optical filter is provided on the second optical transmission line and positioned between the second optical coupler and an output terminal of the second optical transmission line so as to remove a noise from the second optical signal when the second impurity doped fiber is excited.

It is preferable that each of the first and second optical switches further comprises the following elements. A first optical reflective mirror is provided on one end of the first optical transmission line for reflecting the first optical signal passed through the first impurity doped fiber excited so that the reflected first optical signal is again transmitted through the first impurity doped fiber excited to an opposite end as an output terminal of the first optical transmission line. A first optical isolator is provided between the input side optical coupler and the first optical transmission line for permitting a unidirectional transmission of an optical signal from the input side optical coupler to the first optical transmission line. A second optical reflective mirror is provided on one end of the second optical transmission line for reflecting the second optical signal passed through the second impurity doped fiber excited so that the reflected second optical signal is again transmitted through the second impurity doped fiber excited to an opposite end as an output terminal of the second optical transmission line. A second optical isolator is provided between the input side optical coupler and the second optical transmission line for permitting a unidirectional transmission of an optical signal from the input side optical coupler to the second optical transmission line.

It is preferable that each of the first and second optical switches further comprises the following elements. A first optical reflective mirror is provided on one end of the first optical transmission line for reflecting the first optical signal passed through the first impurity doped fiber excited so that the reflected first optical signal is again transmitted through the first impurity doped fiber excited to an opposite end as an output terminal of the first optical transmission line. A second optical reflective mirror is provided on one end of the second optical transmission line for reflecting the second optical signal passed through the second impurity doped fiber excited so that the reflected second optical signal is again transmitted through the second impurity doped fiber excited to an opposite end as an output terminal of the second optical transmission line. A circulator is provided as the input side optical coupler and an optical isolator provided between the input side optical transmission line and the first and second optical transmission lines.

It is preferable that, for each of the first and second optical switches, the first optical coupler is inserted between the first impurity doped fiber and an output terminal of the first optical transmission line so as to feed the excitation light to the first impurity doped fiber in an opposite direction to a transmission of the first optical signal through the first impurity doped fiber excited, and also the second optical coupler is inserted between the second impurity doped fiber and an output terminal of the second optical transmission line so as to feed the excitation light to the second impurity doped fiber in an opposite direction to a transmission of the second optical signal through the second impurity doped fiber excited.

It is preferable that, for each of the first and second optical switches, the first optical coupler is inserted between the first impurity doped fiber and the input side optical coupler so as to feed the excitation light to the first impurity doped fiber in the same direction as a transmission of the first optical signal through the first impurity doped fiber excited, and also the second optical coupler is inserted between the second impurity doped fiber and the input side optical coupler so as to feed the excitation light to the second impurity doped fiber in the same direction as a transmission of the second optical signal through the second impurity doped fiber excited.

It is preferable that the optical switch has two inputs and two outputs and comprises a pair of first and second optical switches connected to each other through at least an interconnecting optical transmission line, and a common excitation light source connected to the first and second optical switches, and wherein each of the first and second optical switches further comprises the following elements. A single input side optical coupler is provided which is connected to the single input side optical transmission line. First and second optical transmission lines are provided which are connected through the single input side optical coupler to the single input side optical transmission line. The first and second optical transmission lines have first and second impurity doped fibers. A single excitation light switch is provided which is connected to the common excitation light source, the single excitation light switch having first and second output terminals for selecting any one of the first and second output terminals, and the first output terminal being connected through a first optical coupler to the first impurity doped fiber to feed the excitation light to the first impurity doped fiber only when the first output terminal is selected by the single excitation light switch, and the second output terminal being connected through a second optical coupler to the second impurity doped fiber to feed the excitation light to the second impurity doped fiber only when the second output terminal is selected by the single excitation light switch.

It is preferable that the at least plurality of optical transmission lines are separated from each other for separate transmission of different optical signals on the plurality of separated optical transmission lines. Each of the separated optical transmission lines has a single impurity doped fiber. The at least excitation light source comprises a single excitation light source. The at least excitation light switch comprises a single excitation light switch for separate switching operations to the at least plurality of optical transmission lines to separately control individual excitations of the impurity doped fibers on the least plurality of optical transmission lines.

It is preferable that the at least plurality of optical transmission lines are separated from each other for separate transmission of different optical signals on the plurality of separated optical transmission lines, and each of the separated optical transmission lines has a single impurity doped fiber, and the at least excitation light source comprises two excitation light source, and further at least excitation light switch comprises a single optical cross connector for separate switching operations to the at least plurality of optical transmission lines to separately control individual excitations of the impurity doped fibers on the at least plurality of optical transmission lines.

The second present invention provides an optical switch comprising the following elements. A first optical transmission line is provided for transmitting a first optical signal. An optical reflectivity variable mirror is provided which is capable of varying a reflectivity in a range of 0% to 100% for reflecting the first optical signal. The optical reflectivity variable mirror is connected with the first optical transmission line. A second optical transmission line is provided which is connected through the optical reflectivity variable mirror to the first optical transmission line. An optical transmitter is provided which is connected through the second optical transmission line to the optical reflectivity variable mirror for transmitting a second optical signal. If the optical reflectivity variable mirror sets the reflectivity at less than 100%, then the first optical signal is reflected by the optical reflectivity variable mirror so that the first optical signal is outputted from the first optical transmission line, if the optical reflectivity variable mirror sets the reflectivity at 100%, then the first optical signal is transmitted through the optical reflectivity variable mirror, whilst the second optical signal transmitted from the optical transmitter is also transmitted through the optical reflectivity variable mirror to be outputted from the first optical transmission line.

The third present invention provides an optical add-drop multiplexer comprising at least a single set of the following elements. A first optical transmission line is provided for transmitting a first optical signal. An optical coupler is provided on the first optical transmission line for dividing the first optical signal into first and second divided optical signals. A fourth optical transmission line is provided which is connected with the optical coupler for transmitting the first divided optical signal. An optical receiver is provided which is connected through the fourth optical transmission line to the optical coupler for receiving the first divided optical signal. An optical reflectivity variable mirror is provided which is capable of varying a reflectivity in a range of 0% to 100%. The optical reflectivity variable mirror is connected with first optical transmission line for reflecting the second divided optical signal. A second optical transmission line is provided which is connected through the optical reflectivity variable mirror to the first optical transmission line. An optical transmitter is provided which is connected through the second optical transmission line to the optical reflectivity variable mirror for transmitting a second optical signal. If the optical reflectivity variable mirror sets the reflectivity at less than 100%, then the first optical signal is reflected by the optical reflectivity variable mirror so that the first optical signal is outputted from the first optical transmission line. If the optical reflectivity variable mirror sets the reflectivity at 100%, then the first optical signal is transmitted through the optical reflectivity variable mirror, whilst the second optical signal transmitted from the optical transmitter is also transmitted through the optical reflectivity variable mirror to be outputted from the first optical transmission line.

It is preferable that the optical add-drop multiplexer comprises a plurality of the optical add-drop multiplexers, and further comprising an optical device having at least any one of multiplexing function and demultiplexing function so that the optical add-drop multiplexers are operable to different wavelength optical signals.

The fourth present invention provides an optical add-drop multiplexer comprising at least a single set of the following elements. An input side optical transmission line is provided for transmitting a first optical signal. An input side optical coupler is provided on the first optical transmission line for dividing the first optical signal into first and second divided optical signals. First and second optical transmission lines are provided which are connected with the input side optical coupler for transmissions of the first and second divided optical signals respectively. The first and second optical transmission lines have first and second impurity doped fibers. An optical receiver is provided which is connected through the first optical transmission line to the first impurity doped fiber for receiving the first divided optical signal only when the first impurity doped fiber is excited. An optical transmitter is provided which is connected through the second optical transmission line to the second impurity doped fiber for transmitting a second optical signal through the second impurity doped fiber to the input side optical transmission line for output of the second optical signal only when the second impurity doped fiber is excited. At least an excitation light source is provided for emitting an excitation light. An excitation light switch is provided which is connected to the excitation light source and also connected to the first and second optical transmission lines for selective switching operations to supply the excitation light to any one of the first and second optical transmission lines to feed the excitation light to selected one of the first and second impurity doped fibers, thereby causing an excitation of the selected one of the first and second impurity doped fibers, whilst unselected one of the first and second impurity doped fibers is unexcited.

It is preferable that the optical add-drop multiplexer comprises a plurality of the optical add-drop multiplexers, and further comprising an optical device having at least any one of multiplexing function and demultiplexing function so that the optical add-drop multiplexers are operable to different wavelength optical signals.

The fifth present invention provides an optical gate switch comprising the following elements. A first optical transmission line is provided for transmitting an input optical input signal. A second optical transmission line is provided for transmitting an optical output signal. A fourth optional transmission line is connected through an optical coupler to both the first and second optional transmission lines. The fourth optional transmission line has at least a impurity doped fiber and a wavelength band selective optical reflecting mirror capable of selecting a wavelength band of a light to be reflected. The impurity doped fiber is positioned between the wavelength band selective optical reflecting mirror. An excitation light source is provided which is connected to the wavelength band selective optical reflecting mirror for controlling an emission of an excitation light so that if the excitation light source emits the excitation light to feed the excitation light to the impurity doped fiber so as to excite the impurity doped fiber, whereby the optical input signal is transmitted through the excited impurity doped fiber and amplified by the excited impurity doped fiber and subsequently the amplified optical signal is reflected by the wavelength band selective optical reflecting mirror before the reflected optical signal is then transmitted through the excited impurity doped fiber and further amplified by the excited impurity doped fiber for subsequent output of the further amplified optical signal through the output signal optical transmission line.

The sixth present invention provides an optical add-drop multiplexer comprising at least a single set of the following elements. A first optional transmission line is provided for transmitting an input optical input signal. A second optical transmission line is provided for transmitting an optical output signal. A fourth optional transmission line is provided which is connected through an optical coupler to both the first and second optional transmission lines. The fourth optional transmission line has at least a impurity doped fiber and a wavelength band selective optical reflecting mirror capable of selecting a wavelength band of a light to be reflected. The impurity doped fiber is positioned between the wavelength band selective optical reflecting mirror. An optical receiver is provided which is connected through a second optical coupler to the fourth optical transmission line so that the second optical coupler is positioned between the first optical coupler and the impurity doped fiber for allowing the optical receiver receives a part of the optical input signal. An optical transmitter is provided which is connected through a fourth optical coupler to the output signal transmission line for transmitting a second optical signal as a substitute output signal only when no output signal is supplied from the impurity doped fiber. An excitation light source is provided which is connected to the wavelength band selective optical reflecting mirror for controlling an emission of an excitation light so that if the excitation light source emits the excitation light to feed the excitation light to the impurity doped fiber so as to excite the impurity doped fiber, whereby the optical input signal is transmitted through the excited impurity doped fiber and amplified by the excited impurity doped fiber and subsequently the amplified optical signal is reflected by the wavelength band selective optical reflecting mirror before the reflected optical signal is then transmitted through the excited impurity doped fiber and further amplified by the excited impurity doped fiber for subsequent output of the further amplified optical signal through the output signal optical transmission line.

It is preferable that the optical add-drop multiplexer comprises a plurality of the optical add-drop multiplexers, and further comprising an optical device having at least any one of multiplexing function and demultiplexing function so that the optical add-drop multiplexers are operable to different wavelength optical signals.

The seventh present invention provides an optical transmission line junction structure comprising at least three optical transmission lines for transmuting optical signals and an optical device having at least any one of wavelength multiplexing and demultiplexing functions connected to the at least three optical transmission lines, so that the optical device having at least any one of multiplexing and demultiplexing functions serves as a same roll as an optical coupler so as to reduce an optical power loss when the optical signal is transmitted through the optical transmission line junction structure.

It is preferable that the optical device comprises an optical multiplexer/demultiplexer.

It is preferable that the optical device comprises an optical multiplexer.

It is preferable that the optical device comprises an optical demultiplexer.

The eighth present invention provides an optical transmission line junction structure comprising at least three optical transmission lines for transmuting optical signals and an optical circulator connected to the at least three optical transmission lines, so that the optical circulator serves as a same roll as an optical coupler so as to reduce an optical power loss when the optical signal is transmitted through the optical transmission line junction structure.

The ninth present invention provides an optical loop-structured circuit having at least a plurality of looped optical transmission lines having at least a plurality of optical transmission line junctions from which at least three optical transmission lines extend, wherein at least one of the plurality of optical transmission line junctions has an optical device having at least any one of wavelength multiplexing and demultiplexing functions, which is connected to the at least three optical transmission lines, so that the optical device having at least any one of multiplexing and demultiplexing functions serves as a same roll as an optical coupler so as to reduce an optical power loss when the optical signal is transmitted through the optical transmission line junction structure.

It is preferable that all of the plurality of optical transmission line junctions have the optical devices.

It is preferable that at least one of the plurality of looped optical transmission lines has at least a single set of an optical amplifier and an optical isolator so that the optical loop-structured circuit has a function of an optical amplifier.

It is preferable that the at least one of the plurality of looped optical transmission lines is further connected to at least two set of an optical receiver and an optical transmitter so that the optical loop-structured circuit has a function of an optical add-drop multiplexer.

It is preferable that at least one of the plurality of looped optical transmission lines has at least single set of an optical attenuator and an optical isolator so that the optical loop-structured circuit has a function of an optical equalizer.

It is preferable that at least two of the plurality of looped optical transmission lines are connected to an optical multiplexer/demultiplexer, whilst a single looped optical transmission line is separated by the at least two of the plurality of looped optical transmission lines from the optical multiplexer/demultiplexer, so that optical signals are individually transmitted along the plurality of looped optical transmission lines, and wherein all of the plurality of optical transmission line junctions have the optical devices.

It is preferable that each of the plurality of looped optical transmission lines has at least a single set of an optical amplifier and an optical isolator so that the optical loop-structured circuit has a function of an optical amplifier.

It is preferable that each of the plurality of looped optical transmission lines is further connected to at least two set of an optical receiver an optical transmitter so that the optical loop-structured circuit has a function of an optical add-drop multiplexer.

It is preferable that each of the plurality of looped optical transmission lines has at least a single set of an optical attenuator and an optical isolator so that the optical loop-structured circuit has a function of an optical equalizer.

It is preferable that the optical device comprises an optical multiplexer/demultiplexer.

It is preferable that the optical device comprises an optical multiplexer.

It is preferable that the optical device comprises an optical demultiplexer.

The tenth present invention provides an optical loop-structured circuit having at least a plurality of looped optical transmission lines having at least a plurality of optical transmission line junctions from which at least three optical transmission lines extend, wherein at least one of the plurality of optical transmission line junctions has an optical circulator, which is connected to the at least three optical transmission lines, so that the optical circulator serves as a same roll as an optical coupler so as to reduce an optical power loss when the optical signal is transmitted through the optical transmission line junction structure.

It is preferable that all of the plurality of optical transmission line junctions have the optical circulators.

It is preferable that at least one of the plurality of looped optical transmission lines has at least a single set of an optical amplifier and an optical isolator so that the optical loop-structured circuit has a function of an optical amplifier.

It is preferable that at least one of the plurality of looped optical transmission lines is further connected to at least two set of an optical receiver and an optical transmitter so that the optical loop-structured circuit has a function of an optical add-drop multiplexer.

It is preferable that at least one of the plurality of looped optical transmission lines has at least a single set of an optical attenuator and an optical isolator so that the optical loop-structured circuit has a function of an optical equalizer.

It is preferable that at least two of the plurality of looped optical transmission lines are connected to an optical multiplexer/demultiplexer, whilst a single looped optical transmission line is separated by the at least two of the plurality of looped optical transmission lines from the optical multiplexer/demultiplexer, so that optical signals are individually transmitted along the plurality of looped optical transmission lines, and wherein all of the plurality of optical transmission line junctions have the optical circulators.

It is preferable that each of the plurality of looped optical transmission lines has at least a single set of an optical amplifier and an optical isolator so that the optical loop-structured circuit has a function of an optical amplifier.

It is preferable that each of the plurality of looped optical transmission lines is further connected to at least two set of an optical receiver and an optical transmitter so that the optical loop-structured circuit has a function of an optical add-drop multiplexer.

It is preferable that each of the plurality of looped optical transmission lines has at least a single set of an optical attenuator and an optical isolator so that the optical loop-structured circuit has a function of an optical equalizer.

The eleventh present invention provides an optical gate switch comprising the following elements. A main optical transmission line is provided. First and second optical multiplexer/demultiplexers are also provided on the main optical transmission line so that the first and second optical multiplexer/demultiplexers are separated from each other. The first and second optical multiplexer/demultiplexers are connected with first and second subordinate optical transmission lines respectively. An impurity doped fiber is provided on the main optical transmission line and positioned between the first and second optical multiplexer/demultiplexers. An excitation light source is provided which is connected through the first subordinate optical transmission line to the first optical multiplexer/demultiplexer so that the excitation light source emits an excitation light which is transmitted through the first subordinate optical transmission line and the first optical multiplexer/demultiplexer to the impurity doped fiber. The second optical multiplexer/demultiplexer transmits the optical signal onto the main optical transmission line and also transmits a leaked part of the excitation light onto the second subordinate optical transmission line.

It is preferable to further comprise an optical reflecting mirror provided on the second subordinate optical transmission line for reflecting the leaked part of the excitation light to the impurity doped fiber.

It is preferable to further comprise a secondary excitation light source on the second subordinate optical transmission line.

Preferred Embodiments

First Embodiment

A first embodiment according to the present invention will be described in detail with reference to FIG. 1 which is a diagram illustrative of a first novel optical switch having a single input and two outputs. The optical switch has an input side coupler 21 which is connected to a first optical transmission line 110 on which an optical input signal is transmitted and then inputted into the optical switch. The optical input signal has a wavelength of 1550 nanometers and an intensity of 0 dBm. The optical input signal is divided by the input side coupler 21 into two parts. The optical switch has second and third optical transmission lines 120 and 121 which are connected to the input side coupler 21. The two divided optical signals are then transmitted through the second and third optical transmission lines 120 and 121 for output thereof. The second optical transmission line 120 is connected to a first output side coupler 22. The third optical transmission line 121 is connected to a second output side optical coupler 23. A first erbium doped fiber EDF11 is provided on the second optical transmission line 120 between the input side coupler 21 and the first output side coupler 22. A second erbium doped fiber EDF12 is provided on the third optical transmission line 120 between the input side coupler 21 and the second output side coupler 23. The first and second erbium doped fibers EDF11 and EDF12 have a length of 50 meters. The first and second erbium doped fibers EDF11 and EDF12 may be replaced by rare earth doped fibers. The two divided optical signals are transmitted through the first and second erbium doped fibers EDF11 and EDF12 respectively. The optical switch further has an excitation light switch 41 which is connected through a first excitation light transmission line 111 to the first output side coupler 22 as well as which is connected through a second excitation light transmission line 112 to the second output side coupler 23. The optical switch further has an excitation light source 31 which is connected to the excitation light switch 41. The excitation light source 31 emits an excitation light with a wavelength of 1480 nanometers The excitation light switch 41 is operated to switch the excitation light to any one of the first and second excitation light transmission lines 111 and 112 to supply any one of the first and second erbium doped fibers EDF11 and EDF12.

If the excitation light switch 41 is operated to switch to supply the excitation light to the first erbium doped fiber EDF11, then the first erbium doped first EDF11 is excited whereby the divided optical signal with the wavelength of 1550 nanometers is transmitted through the first erbium doped fiber EDF11 without any optical absorption and then the optical signal with an intensity of 0 dBm is outputted from the second optical transmission line 120. Accurately, the majority part of the excitation light emitted from the excitation light source 31 is switched by the excitation light switch 41 to be fed through the first excitation light transmission line 111 and the first output side optical coupler 22 to the first erbium doped fiber EDF11. On the other hand, the minority part of the excitation light emitted from the excitation light source 31 might be leaked through the excitation light switch 41 whereby a leaked excitation light is then fed through the second output side optical coupler 23 to the second erbium doped fiber EDF12. However, the leaked excitation light is incapable of exciting the second erbium doped fiber EDF11, for which reason the divided optical signal with the wavelength of 1550 nanometers is absorbed into the second erbium doped fiber EDF11. As a result, an optical output signal from the third optical transmission line 121 has an intensity of −60 dBm or less. The excitation light switch 41 causes an insertion loss of 2 dB and a crosstalk of 20 dB which allow the optical switch to be free from any substantive insertion loss and a low or reduced crosstalk.

As a modification to the above first embodiment, the above excitation light switch 41 may be replaced by a polymer optical switch.

If the polymer optical switch 41 is operated to switch to supply the excitation light to the first erbium doped fiber EDF11, then the first erbium doped fiber EDF11 is excited whereby the divided optical signal with the wavelength of 1550 nanometers is transmitted through the first erbium doped fiber EDF11 without any optical absorption and then the optical signal with an intensity of 0 dBm is outputted from the second optical transmission line 120. Accurately, the majority part of the excitation light emitted from the excitation light source 31 is switched by the polymer optical switch 41 to be fed through the first excitation light transmission line 111 and the first output side optical coupler 22 to the first erbium doped fiber EDF11. On the other hand, the minority part of the excitation light emitted from the excitation light source 31 might be leaked through the polymer optical switch 41 whereby a leaked excitation light is then fed through the second output side optical coupler 23 to the second erbium doped fiber EDF12. However, the leaked excitation light is incapable of exciting the second erbium doped fiber EDF12, for which reason the divided optical signal with the wavelength of 1550 nanometers is absorbed into the second erbium doped fiber EDF12. As a result, an optical output signal from the third optical transmission line 121 has intensity of −60 dBm or less. The polymer optical switch 41 causes an insertion loss of 2 dB and a crosstalk of 20 dB which allow the optical switch to be free from any substantive insertion loss and a low or reduced crosstalk.

If the polymer optical switch 41 is operated to switch to supply the excitation light to the second erbium doped fiber EDF12, then the second erbium doped fiber EDF12 is excited whereby the divided optical signal with the wavelength of 1550 nanometers is transmitted through the second erbium doped fiber EDF12 without any optical absorption and then the optical signal with an intensity of 0 dBm is outputted from the third optical transmission line 121. Accurately, the majority part of the excitation light emitted from the excitation light source 31 is switched by the polymer optical switch 41 to be fed through the second excitation light transmission line 112 and the second output side optical coupler 23 to the second erbium doped fiber EDF12. On the other hand, the minority part of the excitation light emitted from the excitation light source 31 might be leaked through the polymer optical switch 41 whereby a leaked excitation light is then fed through the first output side optical coupler 22 to the first erbium doped fiber EDF11. However, the leaked excitation light is incapable of exciting the first erbium doped fiber EDF11, for which reason the divided optical signal with the wavelength of 1550 nanometers is absorbed into the first erbium doped fiber EDF11. As a result, an optical output signal from the third optical transmission line 121 has an intensity of −60 dBm or less. The polymer optical switch 41 causes an insertion loss of 2 dB and a crosstalk of 20 dB which allow the optical switch to be free from any substantive insertion loss and a low or reduced crosstalk.

As a further modification to the above first embodiment, the excitation light has a wavelength of 980 nanometers in order to shorten the wavelength for a remarkable reduction in noise factor of the optical output signal. In this case, the optical switch is also free from any substantive insertion loss and a low or reduced crosstalk.

In the above embodiment, the number of the wavelength multiplexing on each optical transmission line is one. Notwithstanding, 8, 16, 32, 64-wavelength multiplexing are available, wherein the batch-switching operation to the plural number wavelength multiplexing is carried out.

It is also possible to set the wavelength of the optical input signal at not only 1550 nanometers but also other wavelengths, for example, 1330 nanometers.

It is also possible to set the wavelength of the excitation light at not only 1480 nanometers or 980 nanometers but also other wavelengths provided that such wavelength is capable of exciting the impurity doped fiber. It is preferable to set the wavelength of the excitation light in consideration of both the wavelength of the optical input signal and the kind of the impurity doped fiber.

The above excitation light switch may also be replaced by an acousto-optical switch, or a quartz-based switch.

It is further possible to control an intensity of the optical output signal by controlling an optical power of the excitation light to be fed to the impurity doped fiber. It is possible to control the optical power of the excitation light to be fed to the impurity doped fiber by controlling an injection current to the excitation light source or by use of variable or fixed attenuator.

It is furthermore possible to replace the erbium doped fiber by rare earth doped fiber such as tellurium doped fiber. The length of the rare earth doped fiber and a doping concentration thereof may be set in accordance with the required specifications of the optical switch.

It is moreover possible to input the excitation light into the rare earth doped fiber in either directions or in both directions.

It is still more possible to conduct a polarization-multiplexing to different excitation lights emitted separately from plural different excitation light sources in order to input the polarization-multiplexed excitation light into the rare earth doped fiber to obtain a high gain.

It is yet more possible to set freely a ratio of optical division at the optical coupler in accordance with the various design choices.

The provisions of the smaller number of the excitation light source and the single excitation light switch permit ON-OFF switching operations of the plural gate switches by a simple structure. The above switch exhibits such a gain property as a sharp rising, for which reason there is substantially no influence due to a leaked light from the excitation light switch. This makes the switch available to switches having relatively large crosstalk levels such as a polymer type switch or LiNbO.sub.3 switch, thereby realizing a low crosstalk and low insertion loss optical switch. In addition, the use of the impurity doped fiber serving as an optical power amplifier can obtain a gain as the optical switch.

Second Embodiment

Figure 2:
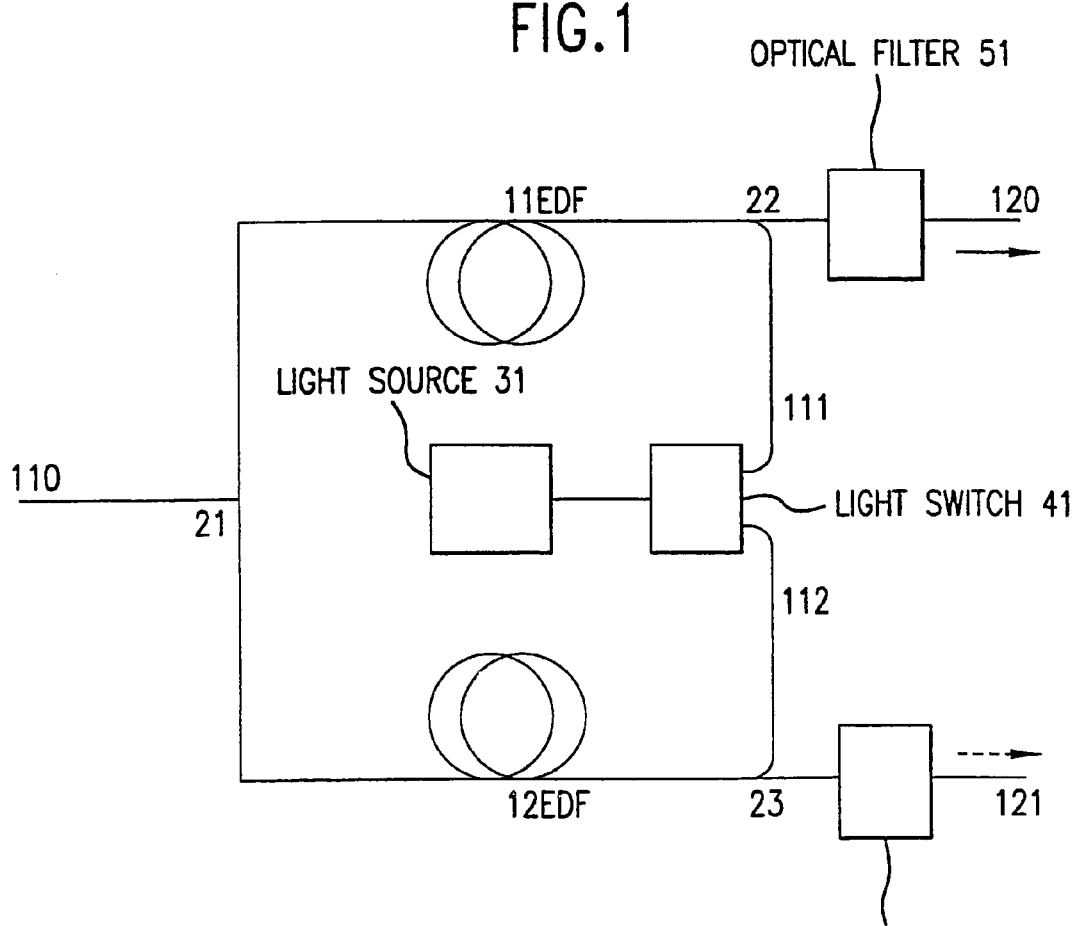
FIG. 2 is a diagram illustrative of a second novel optical switch having a single input and two outputs in a second embodiment in accordance with the present invention.

A second embodiment according to the present invention will be described in detail with reference to FIG. 2 which is a diagram illustrative of a second novel optical switch having a single input and two outputs. A structural difference of the second novel optical switch from the first novel optical switch is only in further providing first and second optical filters on two output sides in order to eliminate or remove amplified noises from the optical output signals.

The optical switch has an input side coupler 21 which is connected to a first optical transmission line 110 on which an optical input signal is transmitted and then inputted into the optical switch. The optical input signal has a wavelength of 1550 nanometers and an intensity of 0 dBm. The optical input signal is divided by the input side coupler 21 into two parts. The optical switch has second and third optical transmission lines 120 and 121 which are connected to the input side coupler 21. The two divided optical signals are then transmitted through the second and third optical transmission lines 120 and 121 for output thereof. The second optical transmission line 120 is connected to a first output side coupler 22. The third optical transmission line 121 is connected to a second output side optical coupler 23. A first erbium doped fiber EDF11 is provided on the second optical transmission line 120 between the input side coupler 21 and the fist output side coupler 22. A second erbium doped fiber EDF12 is provided on the third optical transmission line 120 between the input side coupler 21 and the second output side coupler 23. The first and second erbium doped fibers EDF11 and EDF12 have a length of 50 meters. The first and second erbium doped fibers EDF11 and EDF12 may be replaced by rare earth doped fibers. The two divided optical signals are transmitted through the first and second erbium doped fibers EDF11 and EDF12 respectively. The optical switch further has an excitation light switch 41 which is connected through a first excitation light transmission line 111 to the first output side coupler 22 as well as which is connected through a second excitation light transmission line 112 to the second output side coupler 23. The optical switch further has an excitation light source 31 which is connected to the excitation light switch 41. The excitation light source 31 emits an excitation light with a wavelength of 1480 nanometers. The excitation light switch 41 is operated to switch the excitation light to any one of the first and second excitation light transmission lines 111 and 112 to supply any one of the first and second erbium doped fibers EDF11 and EDF12.

Further, in this second embodiment, a first optical filter 51 is provided on the second optical transmission line 120 and positioned closer to the output side than the first output side optical coupler 22. If the first erbium doped fiber EDF11 is excited, then this first erbium doped fiber EDF11 also serves as an optical power amplifier which, however, amplifies not only the divided optical signal from the first optical transmission line 110 but also noises induced in the optical signals, for which reason it is preferable to remove or eliminate the noises from the optical output signal by the first optical filter 51 in order to avoid deterioration in signal-to-noise ratio due to provision of the excitation light switch 41. Similarly, a second optical filter 52 is provided on the third optical transmission line 121 and positioned closer to the output side than the second output side optical coupler 23. If the second erbium doped fiber EDF12 is excited, then this second erbium doped fiber EDF12 also serves as an optical power amplifier which, however, amplifies not only the divided optical signal from the first optical transmission line 110 but also noises included in the optical signals, for which reason it is preferable to remove or eliminate the noises from the optical output signal by the second optical filter 52 in order to avoid deterioration in signal-to-noise ratio due to provision of the excitation light switch 41.

If the excitation light switch 41 is operated to switch to supply the excitation light to the first erbium doped fiber EDF11, then the first erbium doped fiber EDF11 is excited whereby the divided optical signal with the wavelength of 1550 nanometers is transmitted through the first erbium doped fiber EDF11 without any optical absorption. The optical output signal is then fed to the first optical filter 51 to remove or eliminate the noises from the optical output signal by the first optical filter 51 in order to avoid deterioration in signal-to-noise ratio due to provision of the excitation light switch 41. Therefore, the optical signal filtered in wavelength and having an intensity of 0 dBm is outputted from the second optical transmission line 120. Accurately, the majority part of the excitation light emitted from the excitation light source 31 is switched by the excitation light switch 41 to be fed through the first excitation light transmission line 111 and the first output side optical coupler 22 to the first erbium doped fiber EDF11. On the other hand, the minority part of the excitation light emitted from the excitation light source 31 might be leaked through the excitation light switch 41 whereby a leaked excitation light is then fed through the second output side optical coupler 23 to the second erbium doped fiber EDF12. However, the leaked excitation light is incapable of exciting the second erbium doped fiber EDF12, for which reason the divided optical signal with the wavelength of 1550 nanometers is absorbed into the second erbium doped fiber EDF12. As a result, an optical output signal from the third optical transmission line 121 is free of any substantive noise and has an intensity of −60 dBm or less. The excitation light switch 41 causes an insertion loss of 2 dB and a crosstalk of 20 dB which allow the optical switch to be free from any substantive insertion loss and a low or reduced crosstalk.

If the excitation light switch 41 is operated to switch to supply the excitation light to the second erbium doped fiber EDF12, then the second erbium doped fiber EDF12 is excited whereby the divided optical signal with the wavelength of 1550 nanometers is transmitted through the second erbium doped fiber EDF12 without any optical absorption. The optical output signal is then fed to the second optical filter 52 to remove or eliminate the noises from the optical output signal by the second optical filter 52 in order to avoid deterioration in signal-to-noise ratio due to provision of the excitation light switch 41. Therefore, the optical signal filtered in wavelength and having an intensity of 0 dBm is outputted from the second optical transmission line 120. Accurately, the majority part of the excitation light emitted from the excitation light source 31 is switched by the excitation light switch 41 to be fed through the second excitation light transmission line 112 and the second output side optical coupler 23 to the second erbium doped fiber EDF12. On the other hand, the minority part of the excitation light emitted from the excitation light source 31 might be leaked through the excitation light switch 41 whereby a leaked excitation light is then fed through the first output side optical coupler 22 to the first erbium doped fiber EDF11. However, the leaked excitation light is incapable of exciting the first erbium doped fiber EDF11, for which reason the divided optical signal with the wavelength of 1550 nanometers is absorbed into the first erbium doped fiber EDF11. As a result, an optical output signal from the third optical transmission line 121 is free of any substantive noise and has an intensity of −60 dBm or less. The excitation light switch 41 causes an insertion loss of 2 dBm and a crosstalk of 20 dB which allow the optical switch to be free from any substantive insertion loss and a low or reduced crosstalk.

As a modification to the above second embodiment, the above excitation light switch 41 may be replaced by a polymer optical switch similarly to the first embodiment.

If the polymer optical switch 41 is operated to switch to supply the excitation light to the first erbium doped fiber EDF11, then the first erbium doped fiber EDF11 is excited whereby the divided optical signal with the wavelength of 1550 nanoseconds is transmitted through the first erbium doped fiber EDF11 without any optical absorption. The optical output signal is then fed to the first optical filter 51 to remove or eliminate the noises from the optical output signal by the first optical filter 51 in order to avoid deterioration in signal-to-noise ratio due to provision of the polymer optical switch 41. Therefore, the optical signal filtered in wavelength and having an intensity of 0 dBm is outputted from the second optical transmission line 120. Accurately, the majority part of the excitation light emitted from the excitation light source 31 is switched by the polymer optical switch 41 to be fed through the first excitation light transmission line 111 and the first output side optical coupler 22 to the first erbium doped EDF11. On the other hand, the minority part of the excitation light emitted from the excitation light source 31 might be leaked through the polymer optical switch 41 whereby a leaked excitation light is then fed through the second output side optical coupler 23 to the second erbium doped fiber EDF12. However, the leaked excitation light is incapable of exciting the second erbium doped fiber EDF12, for which reason the divided optical signal with the wavelength of 1550 nanometers is absorbed into the second erbium doped fiber EDF12. As a result, an optical output signal from the third optical transmission line 121 is free of any substantive noise and has an intensity of −60 dBm or less. The polymer optical switch 41 causes an insertion loss of 20 dB and a crosstalk of 20 dB which allow the optical switch to be free from any substantive insertion loss and a low or reduced crosstalk.

If the polymer optical switch 41 is operated to switch to supply the excitation light to the second erbium doped fiber EDF12, then the second erbium doped fiber EDF12 is excited whereby the divided optical signal with the wavelength of 1550 nanometers is transmitted through the second erbium doped fiber EDF12 without any optical absorption. The optical output signal is then fed to the second optical filter 52 to remove or eliminate the noises from the optical output signal by the second optical filter 52 in order to avoid deterioration in signal-to-noise ratio due to provision of the polymer optical switch 41. Therefore, the optical signal filtered in wavelength and having an intensity of 0 dBm is outputted from the second optical transmission line 120. Accurately, the majority part of the excitation light emitted from the excitation light source 31 is switched by the polymer optical switch 41 to be fed through the second excitation light transmission line 112 and the second output side coupler 23 to the second erbium doped fiber EDF12. On the other hand, the minority part of the excitation light emitted from the excitation light source 31 might be leaked through the polymer optical switch 41 whereby a leaked excitation light is then fed through the first output side optical coupler 22 to the first erbium doped fiber EDF11. However, the leaked excitation light is incapable of exciting the first erbium doped fiber EDF11, for which reason the divided optical signal with the wavelength of 1550 nanometers is absorbed into the first erbium doped fiber EDF11. As a result, an optical output signal from the third optical transmission line 121 is free of any substantive noise and has no intensity of −60 dBm or less. The polymer optical switch 41 causes an insertion loss of 2 dB and a crosstalk of 20 dB which allow the optical switch to be free from any substantive insertion loss and a low or reduced crosstalk.

As a further modification to the above second embodiment, the excitation light has a wavelength of 980 nanometers in order to shorten the wavelength for a remarkable reduction in noise factor of the optical output signal. In this case, the optical switch is also free from any substantive insertion loss and a low or reduced crosstalk.

In the above embodiment, the number of the wavelength multiplexing on each optical transmission line is one. Notwithstanding, 8, 16, 32, 64-wavelength multiplexing are available, wherein the batch-switching operation to the plural number wavelength multiplexing is carried out.

It is also possible to set the wavelength of the optical input signal at not only 1550 nanometers but also other wavelengths, for example, 1330 nanometers.

It is also possible to set the wavelength of the excitation light at not only 1480 nanometers or 980 nanometers but also other wavelengths provided that such wavelength is capable of exciting the impurity doped fiber. It is preferable to set the wavelength of the excitation light in consideration of both the wavelength of the optical input signal and the kind of the impurity doped fiber.

The above excitation light switch may also be replaced by an acousto-optical switch, or a quartz-based switch.

It is further possible to control an intensity of the optical output signal by controlling an optical power of the excitation light to be fed to the impurity doped fiber. It is possible to control the optical power of the excitation light to be fed to the impurity doped fiber by controlling an injection current to the excitation light source or by use of variable or fixed attenuator.

It is furthermore possible to replace the erbium doped fiber by rear earth doped fiber such as tellurium doped fiber. The length of the rare earth doped fiber and a doping concentration thereof may be set in accordance with the required specifications of the optical switch.

It is moreover possible to input the excitation light into the rare earth doped fiber in either directions or in both directions.

It is still more possible to conduct a polarization-multiplexing to different excitation lights emitted separated from plural different excitation light sources in order to input the polarization-multiplexed excitation light into the rare earth doped fiber to obtain a high gain.

It is yet more possible to set freely a ratio of optical devices at the optical coupler in accordance with the various design choices.

It is still further possible to freely set the transmission-band width in accordance with the number of the optical signals to be transmitted through the optical switch.

It is yet further possible to provide optical filters and optical isolators since the excitation light and returned light provide no influence to input and output sides of the optical switch.

The provisions of the smaller number of the excitation light source and the single excitation light switch permit ON-OFF switching operations of the plural gate switches by a simple structure. The above switch exhibits such a gain property as a sharp rising, for which reason there is substantially no influence due to a leaked light from the excitation light switch. This makes the switch available to switches having relatively large crosstalk levels such as a polymer type switch or LiNbO.sub.3 switch, thereby realizing a low crosstalk and low insertion loss optical switch. In addition, the use of the impurity doped fiber serving as an optical power amplifier can obtain a gain as the optical switch.

Third Embodiment

Figure 3:
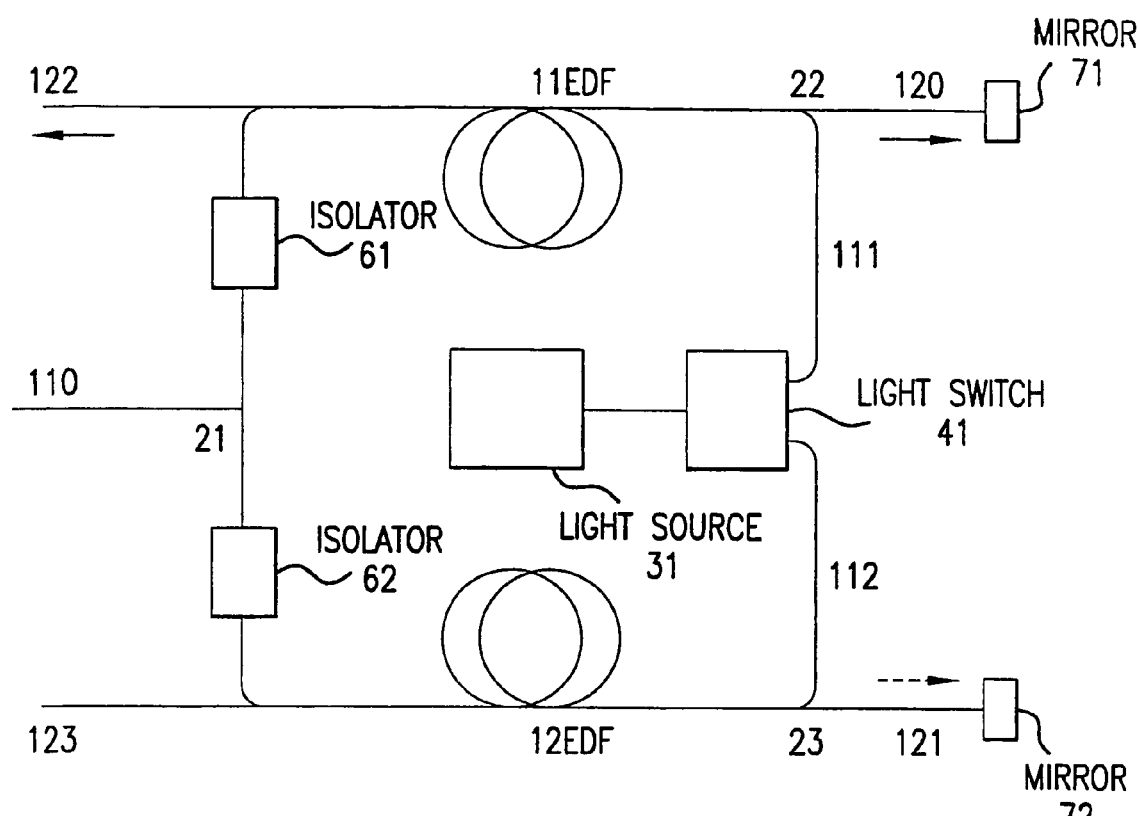
FIG. 3 is a diagram illustrative of a third novel optical switch having a single input and two outputs in a third embodiment in accordance with the present invention.

A third embodiment according to the present invention will be described in detail with reference to FIG. 3 which is a diagram illustrative of a third novel optical switch having a single input and two outputs. A structural difference of the third novel optical switch from the first novel optical switch is in further providing first and second optical isolators as well as first and second optical mirrors in order to increase an efficiency of excitation of the erbium doped fiber with allowance of a sufficient optical absorption.

The optical switch has an input side coupler 21 which is connected to a first optical transmission line 110 on which an optical switch signal is transmitted and then inputted into the optical switch. The optical input signal has a wavelength of 1550 nanometers and an intensity of 0 dBm. The optical input signal is divided by the input side coupler 21 into two parts. The optical switch has second and third optical transmission lines 120 and 121 which are connected to the input side coupler 21. The two divided optical signals are then transmitted through the second and third optical transmission lines 120 and 121 for output thereof. The second optical transmission line 120 is connected to a first output side coupler 22. The third optical transmission line 121 is connected to a second output side optical coupler 23. A first erbium doped fiber EDF11 is provided on the second optical transmission line 120 between the input side coupler 21 and the first output side coupler 22. A second erbium doped fiber EDF12 is provided on the third optical transmission line 120 between the input side coupler 21 and the second output side coupler 23. The first and second erbium doped fibers EDF11 and EDF12 have a length of 50 meters. The first and second erbium doped fibers EDF11 and EDF12 may be replaced by rare earth doped fibers. The two divided optical signals are transmitted through the first and second erbium doped fibers EDF11 and EDF12 respectively. The optical switch further has an excitation light switch 41 which is connected through a first excitation light transmission line 111 to the first output side coupler 22 as well as which is connected through a second excitation light transmission line 112 to the second output side coupler 23. The optical switch further has an excitation light source 31 which is connected to the excitation light switch 41. The excitation light source 31 emits an excitation light with a wavelength of 1480 nanometers. The excitation light switch 41 is operated to switch the excitation light to any one of the first and second excitation light transmission line 111 and 112 to supply any one of the first and second erbium doped fibers EDF11 and EDF12.

In addition, a first optical isolator 61 is provided on the second optical transmission line 120 and positioned between the input side optical coupler 21 and the first erbium doped fiber EDF11. The first optical isolator 61 permits only a unidirectional transmission of the optical signal from the input side optical coupler 21 to the first erbium doped fiber EDF11, however, preventing an opposite direction transmission of the optical signal from the first erbium doped fiber EDF11 to the input side optical coupler 21. A second optical isolator 62 is provided on the third optical transmission line 121 and positioned between the input side optical coupler 21 and the second erbium doped fiber EDF12. The second optical isolator 62 permits only a unidirectional transmission of the optical signal from the input side optical coupler 21 to the second erbium doped fiber EDF12, however, preventing an opposite direction transmission of the optical signal from the second erbium doped fiber EDF12 to the input side optical coupler 21. Moreover, a first optical reflective mirror 71 is provided on a first terminal of the second optical transmission line 120 so that the divided optical signal having passed through the first erbium doped fiber EDF11 is reflected by the first optical reflective mirror 71 toward the first erbium doped fiber EDF11, whereby the divided optical signal passes through the first erbium doped fiber EDF11 two times. If the first erbium doped fiber EDF11 is excited, then this first erbium doped fiber EDF11 serves as an amplifier. This two times transmissions of the divided optical signal by the first optical reflective mirror 71 increases the efficiency of the excitation of the first erbium doped fiber EDF11 even if the power of the excitation light emitted from the excitation light source 31 is not so high. The reflected optical signal is thus transmitted through the first erbium doped fiber EDF11 and divided into two parts, wherein one of the further divided parts of the reflected optical signal is outputted from an output terminal of a fourth optical transmission line 122 whilst transmission of the remaining one of the further divided parts of the reflected optical signal is discontinued by the first optical isolator 61 so that no light is transmitted back to the first optical transmission line 110. Furthermore, a second optical reflective mirror 72 is provided on a second terminal of the third optical transmission line 121 so that the divided optical signal having passed through the second erbium doped fiber EDF12 is reflected by the second optical reflective mirror 72 toward the second erbium doped fiber EDF12, whereby the divided optical signal passes through the second erbium doped fiber EDF12 two times. If the second erbium doped fiber EDF12 is excited, then this second erbium doped fiber EDF12 serves as an amplifier. This two times transmissions of the divided optical signal by the second optical reflective mirror 72 increases the efficiency of the excitation of the second erbium doped fiber EDF12 even if the power of the excitation light emitted from the excitation light source 31 is not so high. The reflected optical signal is thus transmitted through the second erbium doped fiber EDF12 and divided into two parts, wherein one of the further divided parts of the reflected optical signal is outputted from an output terminal of a fifth optical transmission line 123 whilst transmission of the remaining one of the further divided parts of the reflected optical signal is discontinued by the second optical isolator 62 so that no light is transmitted back to the first optical transmission line 110.

If the excitation light switch 41 is operated to switch to supply the excitation light to the first erbium doped fiber EDF11, then the first erbium doped fiber EDF11 is excited whereby the divided optical signal with the wavelength of 1550 nanometers is transmitted through the first erbium doped fiber EDF11 without any optical absorption and then the optical signal is reflected by the first optical reflective mirror 71 for subsequent returning to the first erbium doped fiber EDF11. This two times transmissions of the divided optical signal by the first optical reflective mirror 71 increases the efficiency of the excitation of the first erbium doped fiber EDF11, even if the power of the excitation light emitted from the excitation light source 31 is not so high. The reflected optical signal is thus transmitted through the first erbium doped fiber EDF11 and divided by an optical coupler into two parts, wherein one of the further divided parts of the reflected optical signal is outputted from an output terminal of a fourth optical transmission line 122 whilst transmission of the remaining one of the further divided parts of the reflected optical signal is discontinued by the first optical isolator 61 so that no light is transmitted back to the first optical transmission line 110. The optical signal with an intensity of 0 dBm is outputted from the output terminal of the fourth optical transmission line 122. Accurately, the majority part of the excitation light emitted from the excitation light source 31 is switched by the excitation light switch 41 to be fed through the first excitation light transmission line 111 and the first output side optical coupler 22 to the first erbium doped fiber EDF11. On the other hand, the minority part of the excitation light emitted from the excitation light source 31 might be leaked through the excitation light switch 41 whereby a leaked excitation light is then fed through the second output side optical coupler 23 to the second erbium doped fiber EDF12. However, the leaked excitation light is incapable of exciting the second erbium doped fiber EDF12, for which reason the divided optical signal with the wavelength of 1550 nanometers in absorbed into the second erbium doped fiber EDF12. A leaked divided optical signal is also reflected by the second optical reflective mirror 72 and the reflected leaked optical signal is again transmitted through the second erbium doped fiber EDF12. As a result, an optical output signal from the fifth optical transmission line 123 has an intensity of −80 dBm or less. The excitation light switch 41 causes an insertion loss of 2 dB and a crosstalk of 20 dB which allow the optical switch to be free from any substantive insertion loss and a low or reduced crosstalk.

If the excitation light switch 41 is operated to switch to supply the excitation light to the second erbium doped fiber EDF12, then the second erbium doped fiber EDF12 is excited whereby the divided optical signal with the wavelength of 1550 nanometers is transmitted through the second erbium doped fiber EDF12 without any optical absorption and then the optical signal is reflected by the second optical reflective mirror 72 for subsequent returning to the second erbium doped fiber EDF12. This two times transmissions of the divided optical signal by the second optical reflective mirror 72 increases the efficiency of the excitation of the second erbium doped fiber EDF12 even if the power of the excitation light emitted from the excitation light source 31 is not so high. The reflected optical signal is thus transmitted through the second erbium doped fiber EDF12 and divided by an optical coupler into two parts, wherein one of the further divided parts of the reflected optical signal is outputted from an output terminal of a fifth optical transmission line 123 whilst transmission of the remaining one of the further divided parts of the reflected optical signal is discontinued by the second optical isolator 62 so that no light is transmitted back to the first optical transmission line 110. The optical signal with an intensity of 0 dBm is outputted from the output terminal of the fourth optical transmission line 122. Accurately, the majority part of the excitation light emitted from the excitation light source 31 is switched by the excitation light switch 41 to be fed through the second excitation light transmission line 112 and the second output side optical coupler 23 to the second erbium doped fiber EDF12. On the other hand, the minority part of the excitation light emitted from the excitation light source 31 might be leaked through the excitation light switch 41 whereby a leaked excitation light is then fed through the first output side optical coupler 22 to the first erbium doped fiber EDF11. However, the leaked excitation light is incapable of exciting the first erbium doped fiber EDF11, for which reason the divided optical signal with the wavelength of 1550 nanometers is absorbed into the first erbium doped fiber EDF11. A leaked divided optical signal is also reflected by the first optical reflective mirror 71 and the reflected leaked optical signal is again transmitted through the first erbium doped fiber EDF11. As a result, an optical output signal from the fourth optical transmission line 122 has an intensity of −80 dBm or less. The excitation light switch 41 causes an insertion loss of 2 dBm and a crosstalk of 20 dB which allow the optical switch to be free from any substantive insertion loss and a low or reduced crosstalk.

As a modification to the above third embodiment, the above excitation light switch 41 may be replaced by a polymer optical switch.

If the polymer optical switch 41 is operated to switch to supply the excitation light to the first erbium doped fiber EDF11, then the first erbium doped fiber EDF11 is excited whereby the divided optical signal with the wavelength of 1550 nanometers is transmitted through the first erbium doped fiber EDF11 without any optical absorption and then the optical signal is reflected by the first optical reflective mirror 71 for subsequent returning to the first erbium doped fiber EDF11. This two times transmissions of the divided optical signal by the first optical reflective mirror 71 increases the efficiency of the excitation of the first erbium doped fiber EDF11 even if the power of the excitation light emitted from the excitation light source 31 is not so high. The reflected optical signal is thus transmitted through the first erbium doped fiber EDF11 and divided by an optical coupler into two parts, wherein one of the further divided parts of the reflected optical signal is outputted from an output terminal of a fourth optical transmission line 122 whilst transmission of the remaining one of the further divided parts of the reflected optical signal is discontinued by the first optical isolator 61 so that no light is transmitted back to the first optical transmission line 110. The optical signal with an intensity of 0 dBm is outputted from the output terminal of the fourth optical transmission line 122. Accurately, the majority part of the excitation light emitted from the excitation light source 31 is switched by the polymer optical switch 41 to be fed through the first excitation light transmission line 111 and the first output side optical coupler 22 to the first erbium doped fiber EDF11. On the other hand, the minority part of the excitation light emitted from the excitation light source 31 might be leaked through the polymer optical switch 41 whereby a leaked excitation light is then fed through the second output side optical coupler 23 to the second erbium doped fiber EDF12. However, the leaked excitation light is incapable of exciting the second erbium doped fiber EDF12, for which reason the divided optical signal with the wavelength of 1550 nanometers is absorbed into the second erbium doped fiber EDF12. A leaked divided optical signal is also reflected by the second optical reflective mirror 72 and the reflected leaked optical signal is again transmitted through the second erbium doped fiber EDF12. As a result, an optical output signal from the fifth optical transmission line 123 has an intensity of −80 dBm or less. The polymer optical switch 41 causes an insertion loss of 2 dB and a crosstalk of 20 dB which allow the optical switch to be free from any substantive insertion loss and a low or reduced crosstalk.

If the polymer optical switch 41 is operated to switch to supply the excitation light to the second erbium doped fiber EDF12, then the second erbium doped fiber EDF12 is excited whereby the divided optical signal with the wavelength of 1550 nanometers is transmitted through the second erbium doped fiber EDF12 without any optical absorption and then the optical signal is reflected by the second optical reflective mirror 72 for subsequent returning to the second erbium doped fiber EDF12. This two times transmissions of the divided optical signal by the second optical reflective mirror 72 increases the efficiency of the excitation of the second erbium doped fiber EDF12 even if the power of the excitation light emitted from the excitation light source 31 is not so high. The reflected optical signal is thus transmitted through the second erbium doped fiber EDF12 and divided by an optical coupler into two parts, wherein one of the further divided parts of the reflected optical signal is outputted from an output terminal of a fifth optical transmission line 123 whilst transmission of the remaining one of the further divided parts of the reflected optical signal is discontinued by the second optical isolators 62 so that no light is transmitted back to the first optical transmission line 110. The optical signal with an intensity of 0 dBm is outputted from the output terminal of the fourth optical transmission line 122. Accurately, the majority part of the excitation light emitted from the excitation light source 31 is switched by the polymer optical switch 41 to be fed through the second excitation light transmission line 112 and the second output side optical coupler 23 to the second erbium doped fiber EDF12. On the other hand, the minority part of the excitation light emitted from the excitation light source 31 might be leaked through the polymer optical switch 41 whereby a leaked excitation light is then fed through the first output side optical coupler 22 to the first erbium doped fiber EDF11. However, the leaked excitation light is incapable of exciting the first erbium doped fiber EDF11, for which reason the divided optical signal with the wavelength of 1550 nanometers is absorbed into the first erbium doped fiber EDF11. A leaked divided optical signal is also reflected by the first optical reflective mirror 71 and the reflected leaked optical signal is again transmitted through the first erbium doped fiber EDF11. As a result, an optical signal from the fourth optical transmission line 122 has an intensity of −80 dBm or less. The polymer optical switch 41 causes an insertion loss of 2 dBm and a crosstalk of 20 dB which allow the optical switch to be free from any substantive insertion loss and a low or reduced crosstalk.

As a further modification to the above third embodiment, the excitation light has a wavelength of 980 nanometers in order to shorten the wavelength for a remarkable reduction in noise factor of the optical output signal. In this case, the optical switch is also free from any substantive insertion loss and a low or reduced crosstalk.

In the above embodiment, the number of the wavelength multiplexing on each optical transmission line is one. Notwithstanding, 8, 16, 32, 64-wavelength multiplexing are available, wherein the batch-switching operation to the plural number wavelength multiplexing is carried out.

It is also possible to set the wavelength of the optical input signal at not only 1550 nanometers but also other wavelengths, for example, 1330 nanometers.

It is also possible to set the wavelength of the excitation light at not only 1480 nanometers or 980 nanometers but also other wavelengths provided that such wavelength is capable of exciting the impurity doped fiber. It is preferable to set the wavelength of the excitation light in consideration of both the wavelength of the optical input signal and the kind of the impurity doped fiber.

The above excitation light switch may also be replaced by an acousto-optical switch, or a quartz-based switch.

It is further possible to control an intensity of the optical output signal by controlling an optical power of the excitation light to be fed to the impurity doped fiber. It is possible to control the optical power of the excitation light to be fed to the impurity doped fiber by controlling an injection current to the excitation light source or by use of variable or fixed attenuator.

It is furthermore possible to replace the erbium doped fiber by rare earth doped fiber such as tellurium doped fiber. The length of the rare earth doped fiber and a doping concentration thereof may be set in accordance with the required specifications of the optical switch.

It is moreover possible to input the excitation light into the rare earth doped fiber in either directions or in both directions.

It is still more possible to conduct a polarization-multiplexing to different excitation lights emitted separately from plural different excitation light sources in order to input the polarization-multiplexed excitation light into the rare earth doped fiber to obtain a high gain.

It is yet more possible to set freely a ratio of optical division at the optical coupler in accordance with the various design choices.

It is still further possible that the optical input and output transmission lines are used commonly or separately according to the required optical system.

It is yet further possible to replace the input side coupler 21 and the first and second optical isolators 61 and 62 by a circulator.

It is additionally possible to provide optical reflective mirrors having fixed or variable reflectivity as the first and second optical reflective mirrors 71 and 72. If the variable reflectivity type optical reflective mirrors are provided, it is possible to control the optical powers of the output signals.

The provisions of the smaller number of the excitation light source and the single excitation light switch permit ON-OFF switching operations of the plural gate switches by a simple stricture. The above switch exhibits such a gain property as a sharp rising, for which reason there is substantially no influence due to a leaked light from the excitation light switch. This makes the switch available to switches having relatively large crosstalk levels such as a polymer type switch or LiNbO.sub.3 switch, thereby realizing a low crosstalk and low insertion loss optical switch. In addition, the use of the impurity doped fiber serving as an optical power amplifier can obtain a gain as the optical switch.

Fourth Embodiment

Figure 4:
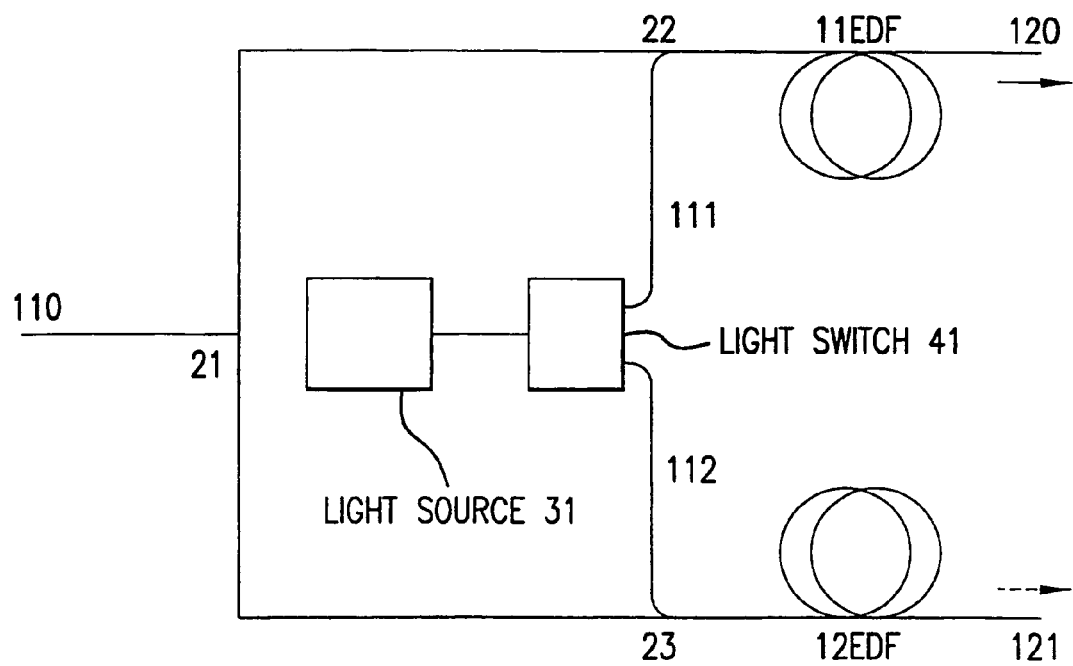
FIG. 4 is a diagram illustrative of a fourth novel optical switch having a single input and two outputs in a fourth embodiment in accordance with the present invention.

A fourth embodiment according to the present invention will be described in detail with reference to FIG. 4 which is a diagram illustrative of a fourth novel optical switch having a single input and two outputs. A structural difference of the fourth novel optical switch from the first novel optical switch is in positions of first and second erbium doped fibers so that first and second erbium doped fibers receive an excitation light in the same direction as receipt of the optical signals, whilst in the first embodiment the first and second erbium doped fibers receive the excitation light in the opposite direction to the receipt of the optical signals.

The optical switch has an input side coupler 21 which is connected to a first optical transmission line 110 on which an optical input signal is transmitted and then inputted into the optical switch. The optical input signal has a wavelength of 1550 nanometers and an intensity of 0 dBm. The optical light signal is divided by the input side coupler 21 into two parts. The optical switch has second and third optical transmission lines 120 and 121 which are connected to the input side coupler 21. The two divided optical signals are then transmitted through the second and third optical transmission lines 120 and 121 for output thereof. The second optical transmission line 120 is connected to a first output side coupler 22. The third optical transmission line 121 is connected to a second output side optical coupler 23. A first erbium doped fiber EDF11 is provided on the second optical transmission line 120 and positioned between the first output side coupler 22 and the output terminal of the second optical transmission line 120. A second erbium doped fiber EDF12 is provided on the third optical transmission line 120 and positioned between the second output side coupler 23 and the output terminal of the third optical transmission line 121. The first and second erbium doped fibers EDF11 and EDF12 have a length of 50 meters. The first and second erbium doped fibers EDF11 and EDF12 may be replaced by rare earth doped fibers. The two divided optical signals are transmitted through the first and second erbium doped fibers EDF11 and EDF12 respectively. The optical switch further has an excitation light switch 41 which is connected through a first excitation light transmission line 111 to the first output side coupler 22 as well as which is connected through a second excitation light transmission line 112 to the second output side coupler 23. The optical switch further has an excitation light source 31 which is connected to the excitation light switch 41. The excitation light source 31 emits an excitation light with a wavelength of 1480 nanometers. The excitation light switch 41 is operated to switch the excitation light to any one of the first and second excitation light transmission lines 111 and 112 to supply any one of the first and second erbium doped fibers EDF11 and EDF12, so that the selected one of the first and second erbium doped fibers EDF11 and EDF12 receives the excitation light in the same direction as receipt of the optical signal.

If the excitation light switch 41 is operated to switch to supply the excitation light to the first erbium doped fiber EDF11 so that the first and second erbium doped fiber EDF11 receives the excitation light in the same direction as receipt of the optical signal, then the first erbium doped fiber EDF11 is excited whereby the divided optical signal with the wavelength of 1550 nanometers is transmitted through the first erbium doped fiber EDF11 without any optical absorption and then the optical signal with an intensity of 0 dBm is outputted from the second optical transmission line 120. Accurately, the majority part of the excitation light emitted from the excitation light source 31 is switched by the excitation light switch 41 to be fed through the first excitation light transmission line 111 and the first output side optical coupler 22 to the first erbium doped fiber EDF11. On the other hand, the minority part of the excitation light emitted from the excitation light source 31 might be leaked through the excitation light switch 41 whereby a leaked excitation light is then fed through the second output side optical coupler 23 to the second erbium doped fiber EDF12. However, the leaked excitation light is incapable of exciting the second erbium doped fiber EDF12, for which reason the divided optical signal with the wavelength of 1550 nanometers is absorbed into the second erbium doped fiber EDF12. As a result, an optical output signal from the third optical transmission line 121 has an intensity of −60 dBm or less. The excitation light switch 41 causes an insertion loss of 2 dB and a crosstalk of 20 dB which allow the optical switch to be free from any substantive insertion loss and a low or reduced crosstalk.

If the excitation light switch 41 is operated to switch to supply the excitation light to the second erbium doped fiber EDF12 so that the second erbium doped fiber EDF12 receives the excitation light in the same direction as receipt of the optical signal, then the second erbium doped fiber EDF12 is excited whereby the divided optical signal with the wavelength of 1550 nanometers is transmitted through the second erbium doped fiber EDF12 without any optical absorption and then the optical signal with an intensity of 0 dBm is outputted from the third optical transmission line 121. Accurately, the majority part of the excitation light emitted from the excitation light source 31 is switched by the excitation light switch 41 to be fed through the second excitation light transmission line 112 and the second output side optical coupler 23 to the second erbium doped fiber EDF12. On the other hand, the minority part of the excitation light emitted from the excitation light source 31 might be leaked through the excitation light switch 41 whereby a leaked excitation light is then fed through the first output side optical coupler 22 to the first erbium doped fiber EDF11. However, the leaked excitation light is incapable of exciting the first erbium doped fiber EDF11, for which reason the divided optical signal with the wavelength of 1550 nanometers is absorbed into the first erbium doped fiber EDF11. As a result, an optical output signal from the third optical transmission line 121 has an intensity of −60 dBm or less. The excitation light switch 41 causes an insertion loss of 2 dB and a crosstalk of 20 dB which allow the optical switch to be free from any substantive insertion loss and a low or reduced crosstalk.

As a modification to the above first embodiment, the above excitation light switch 41 may be replaced by a polymer optical switch.

If the polymer optical switch 41 is operated to switch to supply the excitation light to the first erbium doped fiber EDF11 so that the first and second erbium doped fiber EDF11 receives the excitation light in the same direction as receipt of the optical signal, then the first erbium doped fiber EDF11 is excited whereby the divided optical signal with the wavelength of 1550 nanometers is transmitted through the first erbium doped fiber EDF11 without any optical absorption and then the optical signal with an intensity of 0 dBm is outputted from the second optical transmission line 120. Accurately, the majority part of the excitation light emitted from the excitation light source 31 is switched by the polymer optical switch 41 to be fed through the first excitation light transmission line 111 and the first output side optical coupler 22 to the first erbium doped fiber EDF11. On the other hand, the minority part of the excitation light emitted from the excitation light source 31 might be leaked through the polymer optical switch 41 whereby a leaked excitation light is then fed through the second output side optical coupler 23 to the second erbium doped fiber EDF12. However, the leaked excitation light is incapable of exciting the second erbium doped fiber EDF12, for which reason the divided optical signal with the wavelength of 1550 nanometers is absorbed into the second erbium doped fiber EDF12. As a result, an optical output signal from the third optical transmission line 121 has an intensity of −60 dBm or less. The polymer optical switch 41 causes an insertion loss of 2 dB and a crosstalk of 20 dB which allow the optical switch to be free from any substantive insertion loss and a low or reduced crosstalk.

If the polymer optical switch 41 is operated to switch to supply the excitation light to the second erbium doped fiber EDF12 so that the second erbium doped fiber EDF12 receives the excitation light in the same direction as receipt of the optical signal, then the second erbium doped fiber EDF12 is excited hereby the divided optical signal with the wavelength of 1550 nanometers is transmitted through the second erbium doped fiber EDF12 without any optical absorption and then the optical signal with an intensity of 0 dBm is outputted from the third optical transmission line 121. Accurately, the majority part of the excitation light emitted from the excitation light source 31 is switched by the polymer optical switch 41 to be fed through the second excitation light transmission line 112 and the second output side optical coupler 23 to the second erbium doped fiber EDF12. On the other hand, the minority part of the excitation light emitted from the excitation light source 31 might be leaked through the polymer optical switch 41 whereby a leaked excitation light is then fed through the first output side optical coupler 22 to the first erbium doped fiber EDF11. However, the leaked excitation light is incapable of exciting the first erbium doped fiber EDF11, for which reason the divided optical signal with the wavelength of 1550 nanometers is absorbed into the first erbium doped fiber EDF11. As a result, an optical output signal from the third optical transmission line 121 has an intensity of −60 dBm or less. The polymer optical switch 41 causes an insertion loss of 2 dB and a crosstalk of 20 dB which allow the optical switch to be free from any substantive insertion loss and a low or reduced crosstalk.

As a further modification to the above first embodiment, the excitation light has a wavelength of 980 nanometers in order to shorten the wavelength for a remarkable reduction in noise factor of the optical output signal. In this case, the optical switch is also free from any substantive insertion loss and a low or reduced crosstalk.

In the above embodiment, the number of the wavelength multiplexing on each optical transmission line is one. Notwithstanding, 8, 16, 32, 64-wavelength multiplexing are available, wherein the batch-switching operation to the plural number wavelength multiplexing is carried out.

It is also possible to set the wavelength of the optical input signal at not only 1550 nanometers but also other wavelengths, for example, 1330 nanometers.

It is also possible to set the wavelength of the excitation light at not only 1480 nanometers or 980 nanometers but also other wavelengths provided that such a wavelength is capable of exciting the impurity doped fiber. It is preferable to set the wavelength of the excitation light in consideration of both the wavelength of the optical input signal and the kind of the impurity doped fiber.

The above excitation light switch may also be replaced by an acousto-optical switch, or a quartz-based switch.

It is further possible to control an intensity of the optical output signal by controlling an optical power of the excitation light to be fed to the impurity doped fiber. It is possible to control the optical power of the excitation light to be fed to the impurity doped fiber by controlling an injection current to the excitation light source or by use of variable or fixed attenuator.

It is furthermore possible to replace the erbium doped fiber by rare earth doped fiber such as tellurium doped fiber. The length of the rare earth doped fiber and a doping concentration thereof may be set in accordance with the required specifications of the optical switch.

It is moreover possible to input the excitation light into the rare earth doped fiber in either directions or in both directions.

It is still more possible to conduct a polarization-multiplexing to different excitation lights emitted separately from plural different excitation light sources in order to input the polarization-multiplexed excitation light into the rare earth doped fiber to obtain a high gain.

It is yet more possible to set freely a ratio of optical division at the optical coupler in accordance with the various design choices.

The provisions of the smaller number of the excitation light source and the single excitation light switch permit ON-OFF switching operations of the plural gate switches by a simple structure. The above switch exhibits such a gain property as a sharp rising, for which reason there is substantially no influence due to a leaked light from the excitation light switch. This makes the switch available to switches having relatively large crosstalk levels such as a polymer type switch or LiNbO.sub.3 switch, thereby realizing a low crosstalk and low insertion loss optical switch. In addition, the use of the impurity doped fiber serving as an optical power amplifier can obtain a gain as the optical switch.

Fifth Embodiment

Figure 5:
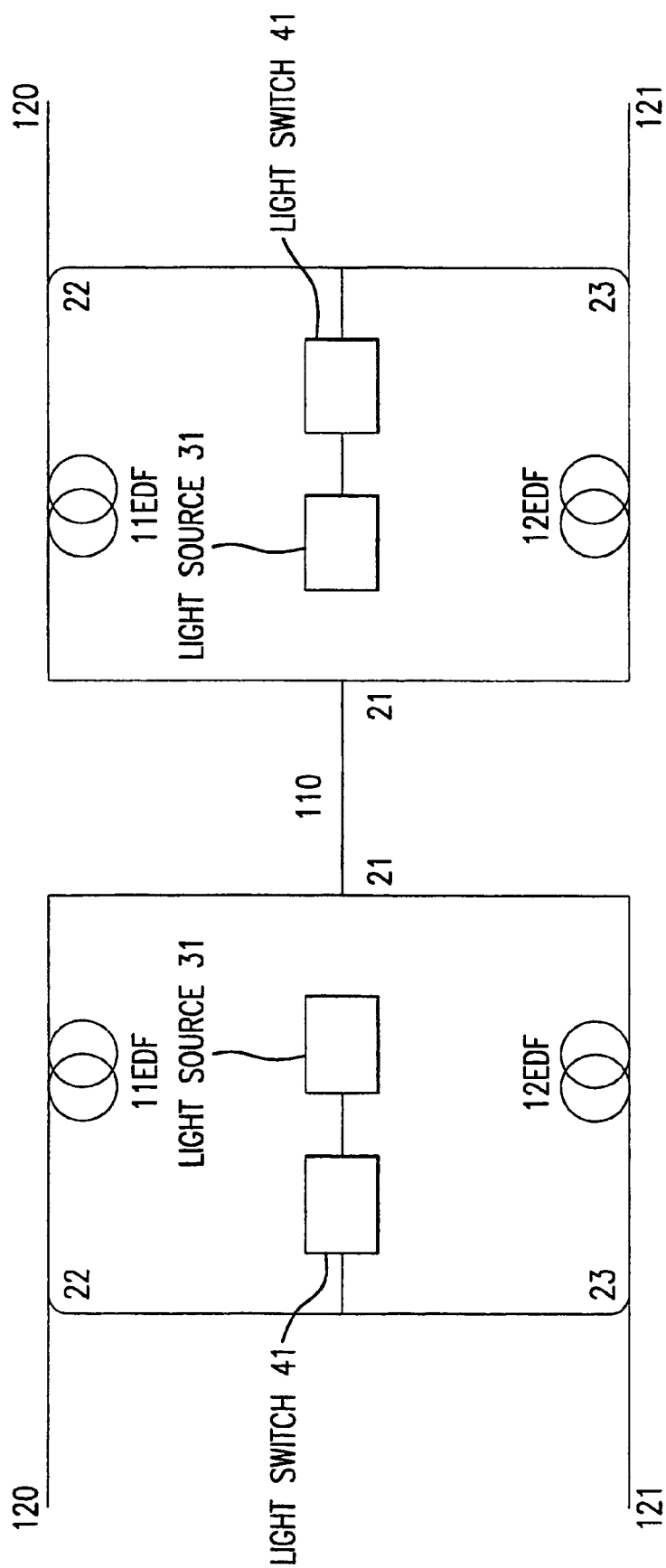
FIG. 5 is a diagram illustrative of a fifth novel optical switch having two inputs and two outputs in a fifth embodiment in accordance with the present invention.

A fifth embodiment according to the present invention will be described in detail with reference to FIG. 5 which is a diagram illustrative of a fifth novel optical switch having two inputs and two outputs. The fifth novel optical switch comprises a pair of the above first novel optical switches described in the first embodiment. The two first novel optical switches are connected to each other through a first optical transmission line 110 as a common line. If the left side one of the paired first novel optical switches is in input side and the right side one of the paired first novel optical switches is in output side, then the switching operation of the left side one of the paired first novel optical switches is carried out to select or switch any one of the two inputs of the fifth novel optical switch having the two inputs and the two outputs, whilst the switching operation of the right side one of the paired first novel optical switches is carried out to select or switch any one of the two outputs of the fifth novel optical switch having the two inputs and the two outputs, whereby the switching operations of the paired first novel optical switches realize the fifth novel optical switch having the two inputs and the two outputs.

Each of the paired first novel optical switches is exactly the same as described in the first embodiment, for which reason duplicate descriptions to the first novel optical switches will be omitted.

As a modification to the above fifth novel optical switch, it is also possible that the fifth novel optical switch comprises a pair of the above fourth novel optical switches described in the fourth embodiment. The two fourth novel optical switches are connected to each other through a first optical transmission line 110 as a common line. If the left side one of the paired fourth novel optical switches is in input side and the right side one of the paired fourth novel optical switches is in output side, then the switching operation of the left side one of the paired fourth novel optical switches is carried out to select or switch any one of the two inputs of the fifth novel optical switch having the two inputs and the two outputs, whilst the switching operation of the right side one of the paired fourth novel optical switches is carried out to select or switch any one of the two outputs of the fifth novel optical switch having the two inputs and the two outputs, whereby the switching operations of the paired fourth novel optical switches realize the fifth novel optical switch having the two inputs and the two outputs.

Each of the paired fourth novel optical switches is exactly the same as described in the fourth embodiment, for which reason duplicate descriptions to the fourth novel optical switches will be omitted.

In the above embodiment, the number of the wavelength multiplexing on each optical transmission line is one. Notwithstanding, 8, 16, 32, 64-wavelength multiplexing are available, wherein the batch-switching operation to the plural number wavelength multiplexing is carried out.

It is also possible to set the wavelength of the optical input signal at not only 1550 nanometers but also other wavelengths, for example, 1330 nanometers.

It is also possible to set the wavelength of the excitation light at not only 1480 nanometers or 980 nanometers but also the wavelengths provided that such wavelength is capable of exciting the impurity doped fiber. It is preferable to set the wavelength of the excitation light in consideration of both the wavelength of the optical input signal and the kind of the impurity doped fiber.

The above excitation light switch may also be replaced by an acousto-optical switch, or a quartz-based switch.

It is further possible to control an intensity of the optical output signal by controlling an optical power of the excitation light to be fed to the impurity doped fiber. It is possible to control the optical power of the excitation light to be fed to the impurity doped fiber by controlling an injection current to the excitation light source or by use of variable or fixed attenuator.

It is furthermore possible to replace the erbium doped fiber by rare earth doped fiber such as tellurium doped fiber. The length of the rare earth doped fiber and a doping concentration thereof may be set in accordance with the required specifications of the optical switch.

It is moreover possible to input the excitation light into the rare earth doped fiber in either directions or in both directions.

It is still more possible to conduct a polarization-multiplexing to different excitation lights emitted separately from plural different excitation light sources in order to input the polarization-multiplexed excitation light into the rare earth doped fiber to obtain a high gain.

It is yet more possible to set freely a ratio of optical division at the optical coupler in accordance with the various design choices.

The provisions of the smaller number of the excitation light source and the single excitation light switch permit ON-OFF switching operations of the plural gate switches by a simple structure. The above switch exhibits such a gain property as a sharp rising, for which reason there is substantially no influence due to a leaked light from the excitation light switch. This makes the switch available to switches having relatively large crosstalk levels such as a polymer type switch or LiNbO.sub.3 switch, thereby realizing a low crosstalk and low insertion loss optical switch. In addition, the use of the impurity doped fiber serving as an optical power amplifier can obtain a gain as the optical switch.

Sixth Embodiment

Figure 6:
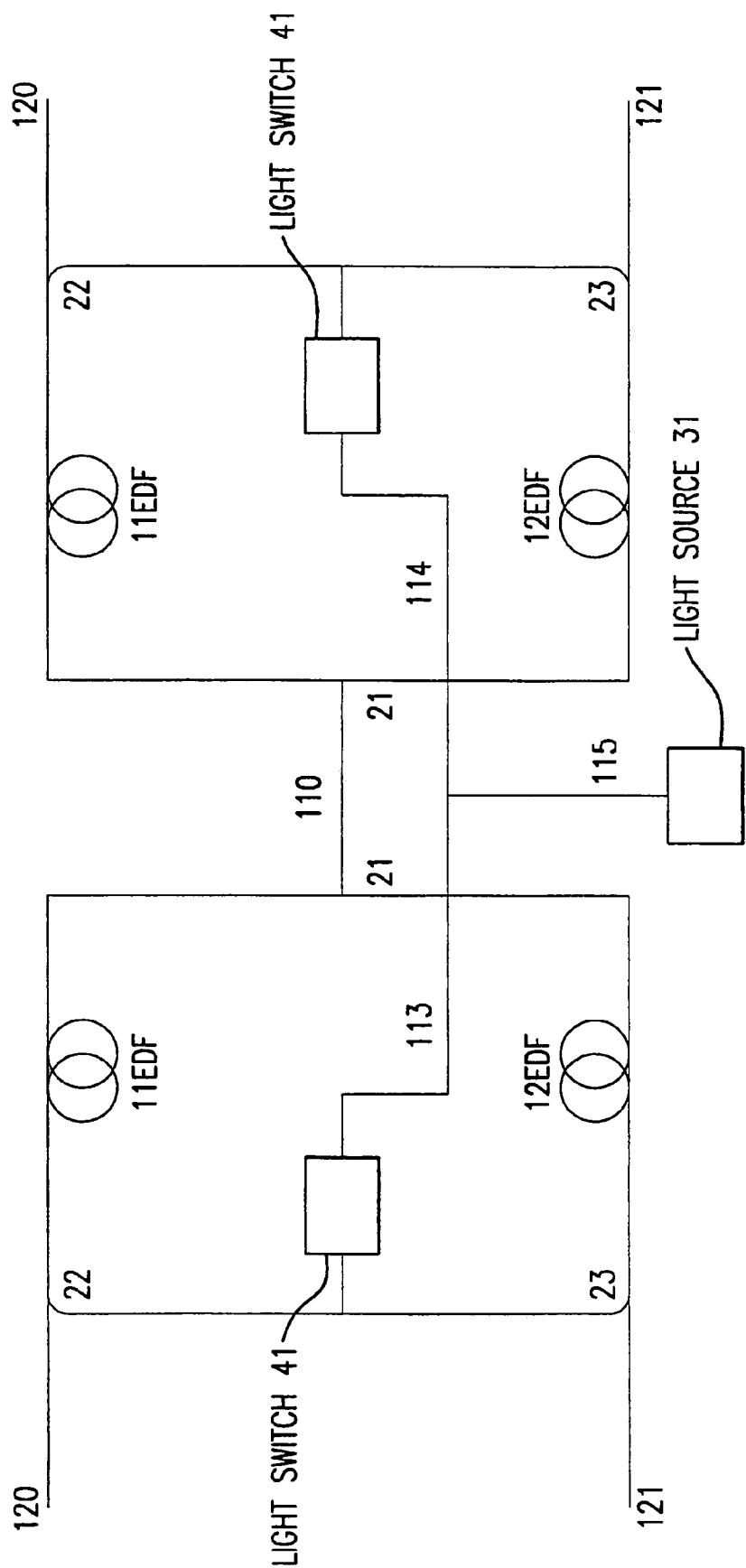
FIG. 6 is a diagram illustrative of a sixth novel optical switch having two inputs and two outputs in a sixth embodiment in accordance with the present invention.

A sixth embodiment according to the present invention will be described in detail with reference to FIG. 6 which is a diagram illustrative of a sixth novel optical switch having two inputs and two outputs. A structural difference of the sixth novel optical switch from the fifth novel optical switch is in providing a single or common excitation light source to a pair of modified first novel optical switches excluding individual excitation light sources described in the first embodiment.

The sixth novel optical switch comprises a pair of the first novel optical switches described in the first embodiment. The two first novel optical switches are connected to each other through a first optical transmission line 110 as a common line. The two first novel optical switches are connected are also connected to the single and common excitation light source 31 to reduce the number of the required excitation light source. If the left side one of the paired first novel optical switches is in input side and the right side one of the paired first novel optical switches is in output side, then the switching operation of the left side one of the paired first novel optical switches is carried out to select or switch any one of the two inputs of the sixth novel optical switch having the two inputs and the two outputs, whilst the switching operation of the right side one of the paired first novel optical switches is carried out to select or switch any one of the two outputs of the sixth novel optical switch having the two inputs and the two outputs, whereby the switching operations of the paired first novel optical switches realize the sixth novel optical switch having the two inputs and the two outputs.

Each of the paired first novel optical switches is the same as described in the first embodiment except for excluding the individual excitation light sources, for which reason duplicate descriptions to the first novel optical switches will be omitted.

As a modification to the above sixth novel optical switch, it is also possible that the sixth novel optical switch comprises a pair of the above fourth novel optical switches described in the fourth embodiment. The two fourth novel optical switches are connected to each other through a first optical transmission line 110 as a common line. The two first novel optical switches are connected are also connected to the single and common excitation light source 31 to reduce the number of the required excitation light source. If the left side one of the paired fourth novel optical switches is in input side and the right side one of the paired fourth novel optical switches is in output side, then the switching operation of the left side one of the paired fourth novel optical switches is carried out to select or switch any one of the two inputs of the sixth novel optical switch having the two inputs and the two outputs, whilst the switching operation of the right side one of the paired fourth novel optical switches is carried out to select or switch any one of the two outputs of the sixth novel optical switch having the two inputs and the two outputs, whereby the switching operations of the paired fourth novel optical switches realize the sixth novel optical switch having the two inputs and the two outputs.

Each of the paired fourth novel optical switches is exactly the same as described in the fourth embodiment, for which reason duplicate descriptions to the fourth novel optical switches will be omitted.

In the above embodiment, the number of the wavelength multiplexing on each optical transmission line is one. Notwithstanding, 8, 16, 32, 64-wavelength multiplexing are available, wherein the batch-switching operation to the plural number wavelength multiplexing is carried out.

It is also possible to set the wavelength of the optical input signal at not only 1550 nanometers but also other wavelengths, for example, 1330 nanometers.

It is also possible to set the wavelength of the excitation light at not only 1480 nanometers or 980 nanometers but also other wavelengths provided that such wavelength is capable of exciting the impurity doped fiber. It is preferable to set the wavelength of the excitation light in consideration of both the wavelength of the optical input signal and the kind of the impurity doped fiber.

The above excitation light switch may also be replaced by an acousto-optical switch, or a quartz-based switch.

It is further possible to control an intensity of the optical output signal by controlling an optical power of the excitation light to be fed to the impurity doped fiber. It is possible to control the optical power of the excitation light to be fed to the impurity doped fiber by controlling an injection current to the excitation light source or by use of variable or fixed attenuator.

It is furthermore possible to replace the erbium doped fiber by rare earth doped fiber such as tellurium doped fiber. The length of the rare earth doped fiber and a doping concentration thereof may be set in accordance with the required specifications of the optical switch.

It is moreover possible to input the excitation light into the rare earth doped fiber in either directions or in both directions.

It is still more possible to conduct a polarization-multiplexing to different excitation lights emitted separately from plural different excitation light sources in order to input the polarization-multiplexed excitation light into the rare earth doped fiber to obtain a high gain.

It is yet more possible to set freely a ratio of optical division at the optical coupler in accordance with the various design choices.

The provisions of the smaller number of the excitation light source and the single excitation light switch permit ON-OFF switching operations of the plural gate switches by a simple structure. The above switch exhibits such a gain property as a sharp rising, for which reason there is substantially no influence due to a leaked light from the excitation light switch. This makes the switch available to switches having relatively large crosstalk levels such as a polymer type switch or LiNbO3 switch, thereby realizing a low crosstalk and low insertion loss optical switch. In addition, the use of the impurity doped fiber serving as an optical power amplifier can obtain a gain as the optical switch.

Seventh Embodiment

Figure 7:
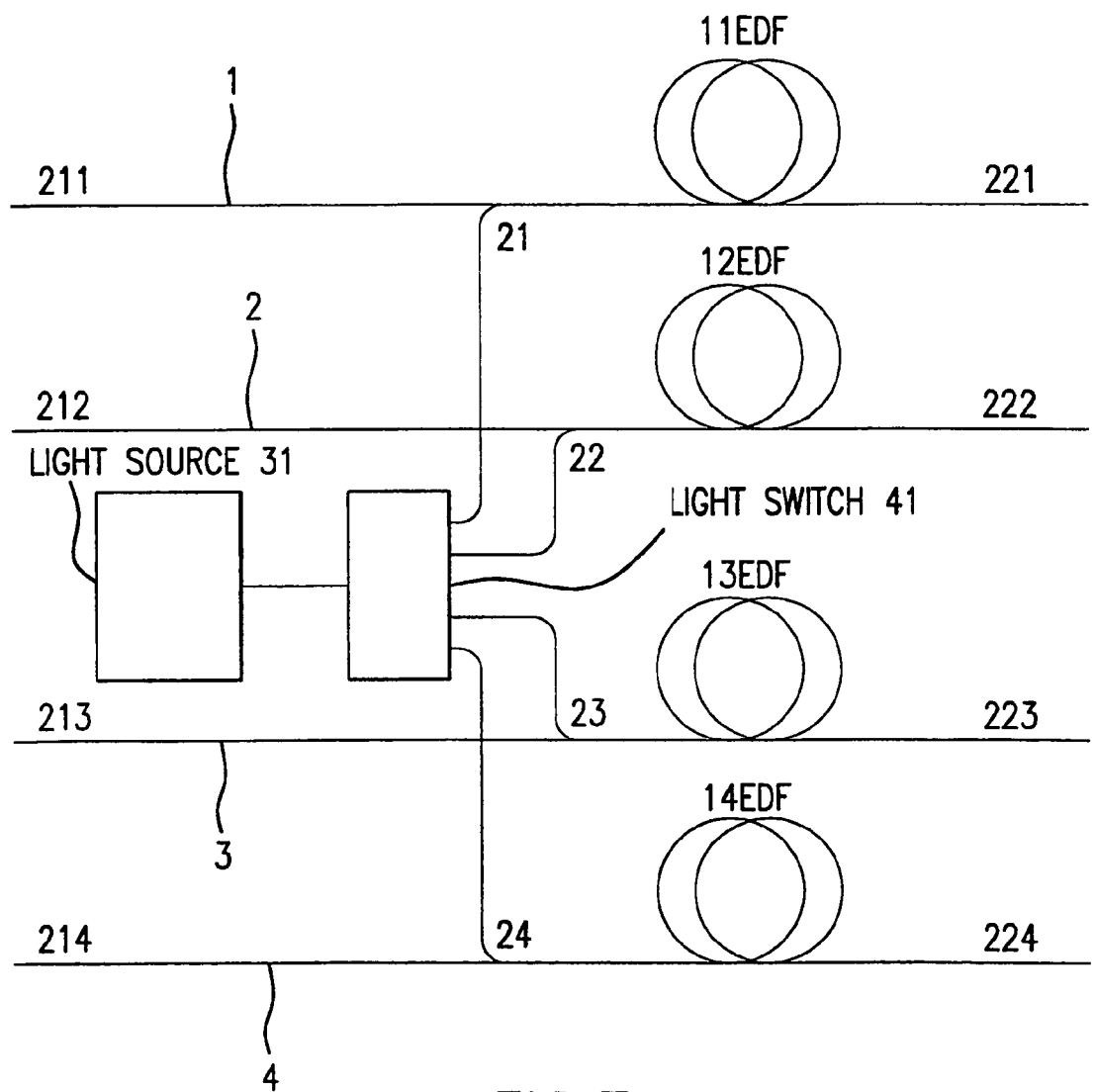
FIG. 7 is a diagram illustrative of a seventh novel optical switch having four separate optical transmission lines for separately switching optical signal transmissions on the four separate optical transmission lines in a seventh embodiment in accordance with the present invention.

A seventh embodiment according to the present invention will be described in detail with reference to FIG. 7 which is a diagram illustrative of a seventh novel optical switch having four separate optical transmission lines for separately switching optical signal transmission on the four separate optical transmission lines.

The seventh novel optical switch has first, second, third and fourth optical transmission lines 1, 2, 3, and 4 on which separate optical signals are transmitted. The seventh novel optical switch also has an excitation light source 31 for emitting an excitation light. The seventh novel optical switch also has an excitation light switch 41 having a single input connected to the excitation light source 31 and four outputs. The excitation light switch 41 is capable of separately ON-OFF switching operations to transmissions of the excitation lights from the four outputs.

The first optical transmission line 1 comprises a first input side optical transmission line 211 and a first output side optical transmission line 221, wherein the first input side optical transmission line 211 is connected through a first erbium doped fiber 11EDF to the first input side optical transmission line 211. A first optical coupler 21 is provided on the first input side optical transmission line 211. The first optical coupler 21 is connected to a first output of the excitation light switch 41. A first optical signal is transmitted on the first input side optical transmission line 211 through the first erbium doped fiber 11EDF to the first input side optical transmission line 211. If the excitation light switch 41 is operated to switch ON to allow transmission of the excitation light emitted from the excitation light source 31 through the first optical coupler 21 to the first erbium doped fiber 11EDF, then the first erbium doped fiber 11EDF is excited to allow that the transmission of the first optical signal having been transmitted on the first input side optical transmission line 211 is transmitted through the first erbium doped fiber 11EDF to the first output side optical transmission line 221.

The second optical transmission line 1 comprises a second input side optical transmission line 212 and a second output side optical transmission line 222, wherein the second input side optical transmission line 212 is connected through a second erbium doped fiber 12EDF to the second input side optical transmission line 212. A second optical coupler 22 is provided on the second input side optical transmission line 212. The second optical coupler 22 is connected to a second output of the excitation light switch 41. A second optical signal is transmitted on the second input side optical transmission line 212 through the second erbium doped fiber 12EDF to the second input side optical transmission line 212. If the excitation light switch 41 is operated to switch ON to allow transmission of the excitation light emitted from the excitation light source 31 through the second optical coupler 22 to the second erbium doped fiber 12EDF, then the second erbium doped fiber 12EDF is excited to allow that the transmission of the second optical signal having been transmitted on the second input side optical transmission line 212 is transmitted through the second erbium doped fiber 12EDF to the second output side optical transmission line 222.

The third optical transmission line 1 comprises a third input side optical transmission line 213 and a third output side optical transmission line 223, wherein the third input side optical transmission line 213 is connected through a third erbium doped fiber 13EDF to the third input side optical transmission line 213. A third optical coupler 23 is provided on the third input side optical transmission line 213. The third optical coupler 23 is connected to a third output of the excitation light switch 41. A third optical signal is transmitted on the third input side optical transmission line 213 through the third erbium doped fiber 13EDF to the third input side optical transmission line 213. If the excitation light switch 41 is operated to switch ON to allow transmission of the excitation light emitted from the excitation light source 31 through the third optical coupler 23 to the third erbium doped fiber 13EDF, then the third erbium doped fiber 13EDF is excited to allow that the transmission of the third optical signal having been transmitted on the third input side optical transmission line 213 is transmitted through the third erbium doped fiber 13EDF to the third output side optical transmission line 223.

The fourth optical transmission line 1 comprises a fourth input side optical transmission line 214 and a fourth output side optical transmission line 224, wherein the fourth input side optical transmission line 214 is connected through a fourth erbium doped fiber 14EDF to the fourth input side optical transmission line 214. A fourth optical coupler 24 is provided on the fourth input side optical transmission line 214. The fourth optical coupler 24 is connected to a fourth output of the excitation light switch 41. A fourth optical signal is transmitted on the fourth input side optical transmission line 214 through the fourth erbium doped fiber 14EDF to the fourth input side optical transmission line 214. If the excitation light switch 41 is operated to switch ON to allow transmission of the excitation light emitted from the excitation light source 31 through the fourth optical coupler 24 to the fourth erbium doped fiber 14EDF, then the fourth erbium doped fiber 14EDF is excited to allow that the transmission of the fourth optical signal having been transmitted on the fourth input side optical transmission line 214 is transmitted through the fourth erbium doped fiber 14EDF to the fourth output side optical transmission line 224.

The excitation light switch 41 is capable of separate ON-OFF switching operations to the four outputs from which the excitation lights are outputted. If the excitation light switch 41 is operated to switch ON to the four outputs, then the excitation lights are red through the first, second, third and fourth couplers 21, 22, 23 and 24 to the first, second, third and fourth erbium doped fibers 11EDF, 12EDF, 13EDF and 14EDF, whereby the first, second, third and fourth optical signals are transmitted through the first, second, third and fourth erbium doped fibers 11EDF, 12EDF, 13EDF and 14EDF to the first, second, third and fourth output side optical transmission lines 221, 222, 223 and 224. If the excitation light switch 41 is operated to switch ON to the first, second and third outputs, then the excitation lights are fed through the first, second and third couplers 21, 22 and 23 to the first, second and third erbium doped fibers 11EDF, 12EDF and 13EDF, whereby the first, second and third optical signals are transmitted through the first, second and third erbium doped fibers 11EDF, 12EDF and 13EDF to the first, second and third output side optical transmission lines 221, 222 and 223, whilst the fourth optical signal is absorbed by the fourth erbium doped fiber 14EDF. If the excitation light switch 41 is operated to switch ON to the first and second outputs, then the excitation lights are fed through the first and second couplers 21 and 22 to the first and second erbium doped fibers 11EDF and 12EDF, whereby the first and second optical signals are transmitted through the first and second erbium doped fibers 11EDF and 12EDF to the first and second output side optical transmission lines 221 and 222, whilst the third and fourth optical signals are absorbed by the third and fourth erbium doped fibers 13EDF and 14EDF. If the excitation light switch 41 is operated to switch ON to the first output, then the excitation lights are fed through the first coupler 21 to the first erbium doped fiber 11EDF, whereby the first optical signal is transmitted through the first erbium doped fiber 11EDF to the first output side optical transmission line 221, whilst the second, third and fourth optical signals are absorbed by the second, third and fourth erbium doped fibers 12EDF, 13EDF and 14EDF.

In the above embodiment, the number of the wavelength multiplexing on each optical transmission line is one. Notwithstanding, 8, 16, 32, 64-wavelength multiplexing are available, wherein the batch-switching operation to the plural number wavelength multiplexing is carried out.

It is also possible to set the wavelength of the optical input signal at not only 1550 nanometers but also other wavelengths, for example, 1330 nanometers.

It is also possible to set the wavelength of the excitation light at not only 1480 nanometers or 980 nanometers but also other wavelengths provided that such wavelengths is capable of exciting the impurity doped fiber. It is preferable to set the wavelength of the excitation light in consideration of both the wavelength of the optical input signal and the kind of the impurity doped fiber.

The above excitation light switch may also be replaced by an acousto-optical switch, or a quartz-based switch.

It is further possible to control an intensity of the optical output signal by controlling an optical power of the excitation light to be fed to the impurity doped fiber. It is possible to control the optical power of the excitation light to be fed to the impurity doped fiber by controlling an injection current to the excitation light source or by use of variable or fixed attenuator.

It is furthermore possible to replace the erbium doped fiber by rare earth doped fiber such as tellurium doped fiber. The length of the rare earth doped fiber and a doping concentration thereof may be set in accordance with the required specifications of the optical switch.

It is moreover possible to input the excitation light into the rare earth doped fiber in either directions or in both directions.

It is still more possible to conduct a polarization-multiplexing to different excitation lights emitted separately from plural different excitation light sources in order to input the polarization-multiplexed excitation light into the rare earth doped fiber to obtain a high gain.

It is yet more possible to set freely a ratio of optical division at the optical coupler in accordance with the various design choices.

The provisions of the smaller number of the excitation light source and the single excitation light switch permit ON-OFF switching operations of the plural gate switches by a simple structure. The above switch exhibits such a gain property as a sharp rising, for which reason there is substantially no influence due to a leaked light from the excitation light switch. This makes the switch available to switches having relatively large crosstalk levels such as a polymer type switch or LiNbO3 switch, thereby realizing a low crosstalk and low insertion loss optical switch. In addition, the use of the impurity doped fiber serving as an optical power amplifier can obtain a gain as the optical switch.

Eighth Embodiment

Figure 8:
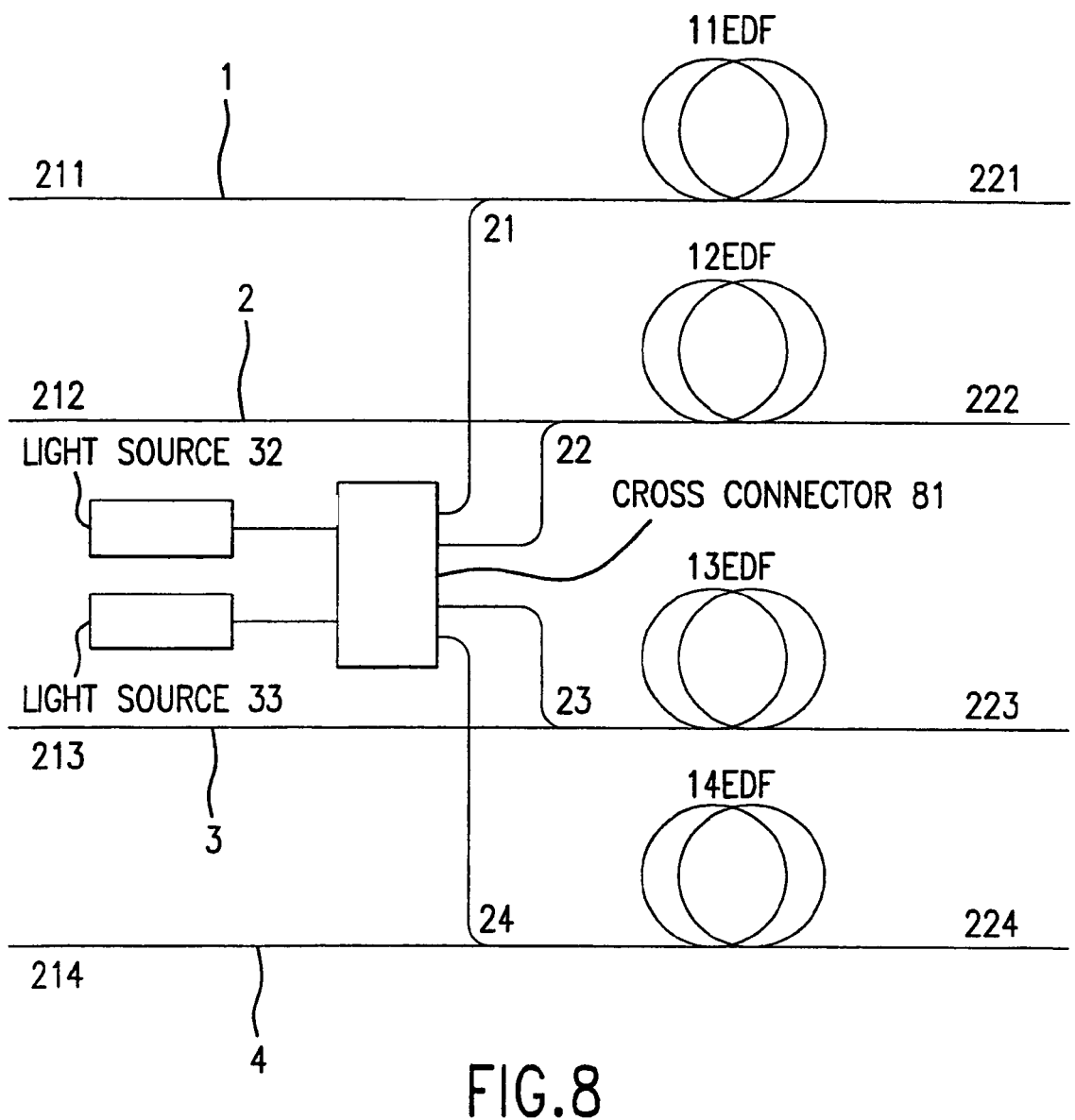
FIG. 8 is a diagram illustrative of an eighth novel optical switch having four separate optical transmission lines for separately switching optical signal transmissions on the four separate optical transmission lines in an eight embodiment in accordance with the present invention.

An eighth embodiment according to the present invention will be described in detail with reference to FIG. 8 which is a diagram illustrative of an eighth novel optical switch having four separate optical transmission lines for separately switching optical signal transmissions on the four separate optical transmission lines. A structural difference of the eighth novel optical switch from the seventh novel optical switch is in providing double excitation light sources and an optical cross connector serving as a switch.

The eighth novel optical switch has first, second, third and fourth optical transmission lines 1, 2, 3, and 4 on which separate optical signals are transmitted. The seventh novel optical switch also has first and second excitation light sources 32 and 33 for emitting excitation lights. The eighth novel optical switch also has an optical cross connector 81 serving as a switch having two inputs connected to the first and second excitation light sources 32 and 33 and four outputs. The optical cross connector 81 is capable of separate switching operations of the four outputs for each of the excitation lights emitted from the first and second excitation light sources 32 and 33. The dual excitation lights sources 32 and 33 increases the excitation power to be fed to the individual erbium doped fibers on the first to fourth optical transmission lines 1, 2, 3, and 4.

The first optical transmission line 1 comprises a first input side optical transmission line 211 and a first output side optical transmission line 221, wherein the first input side optical transmission line 211 is connected through a first erbium doped fiber 11EDF to the first input side optical transmission line 211. A first optical coupler 21 is provided on the first input side optical transmission line 211. The first optical coupler 21 is connected to a first output of the optical cross connector 81. A first optical signal is transmitted on the first input side optical transmission line 211 through the first erbium doped fiber 11EDF to the first input side optical transmission line 211. If the optical cross connector 81 is operated to switch ON to allow transmission of the excitation light emitted from the excitation light source 31 through the first optical coupler 21 to the first erbium doped fiber 11EDF, then the first erbium doped fiber 11EDF is excited to allow that the transmission of the first optical signal having been transmitted on the first input side optical transmission line 211 is transmitted through the first erbium doped fiber 11EDF to the first output side optical transmission line 221.

The second optical transmission line 1 comprises a second input side optical transmission line 212 and a second output side optical transmission line 222, wherein the second input side optical transmission line 212 is connected through a second erbium doped fiber 12EDF to the second input side optical transmission line 212. A second optical coupler 22 is provided on the second input side optical transmission line 212. The second optical coupler 22 is connected to a second output of the optical cross connector 81. A second optical signal is transmitted on the second input side optical transmission line 212 through the second erbium doped fiber 12EDF to the second input side optical transmission line 212. If the optical cross connector 81 is operated to switch ON to allow transmission of the excitation light emitted from the excitation light source 31 through the second optical coupler 22 to the second erbium doped fiber 12EDF, then the second erbium doped fiber 12EDF is excited to allow that the transmission of the second optical signal having been transmitted on the second input side optical transmission line 212 is transmitted through the second erbium doped fiber 12EDF to the second output side optical transmission line 222.

The third optical transmission line 1 comprises a third input side optical transmission line 213 and a third output optical transmission line 223, wherein the third input side optical transmission line 213 is connected through a third erbium doped fiber 13EDF to the third input side optical transmission line 213. A third optical coupler 23 is provided on the third input side optical transmission line 213. The third optical coupler 23 is connected to a third output of the optical cross connector 81. A third optical signal is transmitted on the third input side optical transmission line 213 through the third erbium doped fiber 13EDF to the third input side optical transmission line 213. If the optical cross connector 81 is operated to switch ON to allow transmission of the excitation light emitted from the excitation light source 31 through the third optical coupler 23 to the third erbium doped fiber 13EDF, then the third erbium doped fiber, 13EDF is excited to allow that the transmission of the third optical signal having been transmitted on the third input side optical transmission line 213 is transmitted through the third erbium doped fiber 13EDF to the third output side optical transmission line 223.

The fourth optical transmission line 1 comprises a fourth input side optical transmission line 214 and a fourth output side optical transmission line 224, wherein the fourth input side optical transmission line 214 is connected through a fourth erbium doped fiber 14EDF to the fourth input side optical transmission line 214. A fourth optical coupler 24 is provided on the fourth input side optical transmission line 214. The fourth optical coupler 24 is connected to a fourth output of the optical cross connector 81. A fourth optical signal is transmitted on the fourth input side optical transmission line 214 through the fourth erbium doped fiber 14EDF to the fourth input side optical transmission line 214. If the optical cross connector 81 is operated to switch ON to allow transmission of the excitation light emitted from the excitation light source 31 through the fourth optical coupler 24 to the fourth erbium doped fiber 14EDF, then the fourth erbium doped fiber 14EDF is excited to allow that the transmission of the fourth optical signal having been transmitted on the fourth input side optical transmission line 214 is transmitted through the fourth erbium doped fiber 14EDF to the fourth output side optical transmission line 224.

The optical cross connector 81 is capable of separate ON-OFF switching operations to the four outputs from which the excitation lights are outputted. If the optical cross connector 81 is operated to switch ON to the four outputs, then the excitation lights are fed through the first, second, third and fourth couplers 21, 22, 23 and 24 to the first, second, third and fourth erbium doped fibers 11EDF, 12EDF, 13EDF and 14EDF, whereby the first, second, third and fourth optical signals are transmitted through the first, second, third and fourth erbium doped fibers 11EDF, 12EDF, 13EDF and 14EDF to the first, second, third and fourth output side optical transmission lines 221, 222, 223 and 224. If the optical cross connector 81 is operated to switch ON to the first, second and third outputs, then the excitation lights are fed through the first, second and third couplers 21, 22 and 23 to the first, second and third erbium doped fibers 11EDF, 12EDF and 13EDF, whereby the first, second and third optical signals are transmitted through the first, second and third erbium doped fibers 11EDF, 12EDF and 13EDF to the first, second and third output side optical transmission lines 221, 222 and 223, whilst the fourth optical signal is absorbed by the fourth erbium doped fiber 14EDF. If the optical cross connector 81 is operated to switch ON to the first and second outputs, then the excitation lights are fed through the first and second couplers 21 and 22 to the first and second erbium doped fibers 11EDF and 12EDF, whereby the first and second optical signals are transmitted through the first and second erbium doped fibers 11EDF and 12EDF to the first and second output side optical transmission lines 221 and 222, whilst the third and fourth optical signals are absorbed by the third and fourth erbium doped fibers 13EDF and 14EDF. If the optical cross connector 81 is operated to switch ON to the first output, then the excitation lights are fed through the first coupler 21 to the first erbium doped fiber 11EDF, whereby the first optical signal is transmitted through the first erbium doped fiber 11EDF to the first output side optical transmission line 221, whilst the second, third and fourth optical signals are absorbed by the second, third and fourth erbium doped fibers 12EDF, 13EDF and 14EDF.

The duel excitation light sources 32 and 33 increases the excitation power to be fed to the individual erbium doped fibers on the first to fourth optical transmission lines 1, 2, 3 and 4. This means it possible to further increase the number of the separate optical transmission lines to increase the size of the optical switch.

In the above embodiment, the number of the wavelength multiplexing on each optical transmission line is one. Notwithstanding, 8, 16, 32, 64-wavelength multiplexing are available, wherein the batch-switching operation to the plural member wavelength multiplexing is carried out.

It is also possible to set the wavelength of the optical input signal at not only 1550 nanometers but also other wavelengths, for example, 1330 nanometers.

It is also possible to set the wavelength of the excitation light at not only 1480 nanometers or 980 nanometers but also other wavelengths provided that such wavelengths is capable of exciting the impurity doped fiber. It is preferable to set the wavelength of the excitation light in consideration of both the wavelength of the optical input signal and the kind of the impurity doped fiber.

The above excitation light switch may also be replaced by an acousto-optical switch, or a quartz-based switch.

It is further possible to control an intensity of the optical output signal by controlling an optical power of the excitation light to be fed to the impurity doped fiber. It is possible to control the optical power of the excitation light to be fed to the impurity doped fiber by controlling an injection current to the excitation light source or by use of variable or fixed attenuator.

It is furthermore possible to replace the erbium doped fiber by rare earth doped fiber such as tellurium doped fiber. The length of the rare earth doped fiber and a doping concentration thereof may be set in accordance with the required specifications of the optical switch.

It is moreover possible to input the excitation light into the rare earth doped fiber in either directions or in both directions.

It is still more possible to conduct a polarization-multiplexing to different excitation lights emitted separately from plural different excitation light sources in order to input the polarization-multiplexed excitation light into the rare earth doped fiber to obtain a high gain.

It is yet more possible to set freely a ratio of optical division at the optical coupler in accordance with the various design choices.

The provisions of the smaller number of the excitation light source and the single excitation light switch permit ON-OFF switching operations of the plural gate switches by a simple structure. The above switch exhibits such a gain property as a sharp rising, for which reason there is substantially no influence due to a leaked light from the excitation light switch. This makes the switch available to switches having relatively large crosstalk levels such as polymer type switch or LiNbO3 switch, thereby realizing a low crosstalk and low insertion loss optical switch. In addition, the use of the impurity doped fiber serving as an optical power amplifier can obtain a gain as the optical switch.

Ninth Embodiment

Figure 9:
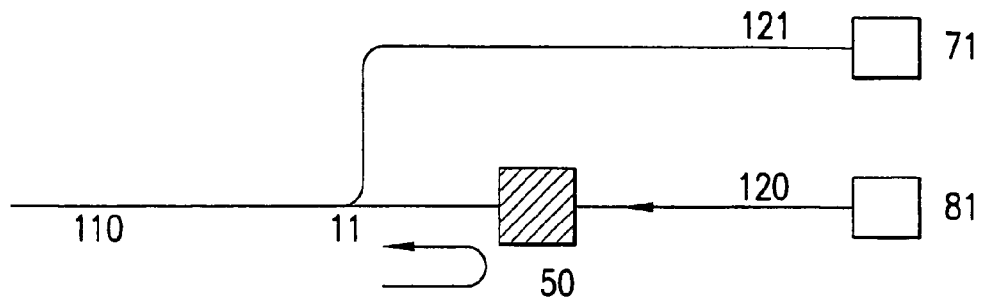
FIG. 9 is a diagram illustrative of a ninth novel optical switch provided in a novel first optical add-drop multiplexer performing optical addition, drop and transmission of said optical signals in a ninth embodiment in accordance with the present invention.

A ninth embodiment according to the present invention will be described in detail with reference to FIG. 9 which is a diagram illustrative of a ninth novel optical switch provided in a novel first optical add-drop multiplexer performing optical addition, drop and transmission of said optical signals.

The ninth novel optical switch comprises a first optical transmission line 110 for transmitting an optical signal having a wavelength of 1550 nanometers, an optical reflectivity variable mirror 50 connected to the first optical transmission line 110 for reflecting the optical signal at a controlled reflectivity, a second optical transmission line 120 connected to the optical reflectivity variable mirror 50, and an optical transmitter 81 connected through the second optical transmission line 120 to the optical reflectivity variable mirror 50 for transmitting an optical signal having a wavelength of 1550 nanometers.

In order to form the novel first optical add-drop multiplexer, a first optical coupler 11 is provided on the first optical transmission line 110. Further, a third optical transmission line 121 is connected to the first optical coupler 11. Furthermore, an optical receiver 71 is also connected with the third optical transmission line 121 so that the optical receiver 71 is also connected through the third optical transmission line 121 to the first optical coupler 11. The optical input signal is divided by the first optical coupler 11 so that one of the divided optical input signals is transmitted through the third optical transmission line 121 to the optical receiver 71, whilst the remaining one of the divided optical input signals is transmitted to the optical reflectivity variable mirror 50 whereby the remaining one of the divided optical input signals is reflected by the optical reflectivity variable mirror 50 at a controlled reflectivity. The optical reflectivity variable mirror 50 is capable of varying a reflectivity in the range of from 0% to 100%. If the reflectivity of the optical reflectivity variable mirror 50 is set 0%, then the optical reflectivity variable mirror 50 is a transmission state which allows an optical signal transmission. In this case, the optical signal transmitted from the optical transmitter 81 is transmitted through the optical reflectivity variable mirror 50 to the first optical transmission line.

A signal transmission operation of the novel first optical add-drop multiplexer will subsequently be described. An optical input signal having a wavelength of 1550 nanometers is transmitted on the first optical transmission line 110 and then reflected by the optical reflectivity variable mirror 50 before the reflected optical signal is then transmitted on the first optical transmission line 110.

A signal drop operation of the novel first optical add-drop multiplexer will subsequently be described. An optical input signal having a wavelength of 1550 nanometers is transmitted on the first optical transmission line 110 and then divided into two parts by the optical coupler 11. One of the divided optical input signals is then transmitted through the third optical transmission line 121 to the optical receiver 71. It is possible to set a low ratio of a first optical division for the optical receiver 71 to a second optical division for the optical reflectivity variable mirror 50, in order to suppress an optical loss by the optical division by the optical coupler 11.

A signal add operation of the novel first optical add-drop multiplexer will subsequently be described. The optical reflectivity variable mirror 50 is capable of varying a reflectivity in the range of from 0% to 100%. If the reflectivity of the optical reflectivity variable mirror 50 is set 0%, then the optical reflectivity variable mirror 50 is in a transmission state which allows an optical signal transmission. In this case, the optical signal transmitted from the optical transmitter 81 is transmitted through the optical reflectivity variable mirror 50 to the first optical transmission line.

The above novel first optical add-drop multiplexer does require no optical coupler for signal adding, thereby realizing a low optical loss.

As a modification to this embodiment, it is possible to provide any one of the above first to fourth optical switches of FIGS. 1 to 4 in the first to fourth embodiments, in place of the above optical coupler 11 and the optical reflectivity variable mirror 50.

It is possible that the input and output ports are commonly used or that the input and output ports are separated from each other by use of an optical coupler and an optical isolator or by use of a circulator.

It is also possible that the optical reflectivity variable mirror 50 may be replaced by an optical switch for switching an transmission and a reflection, or by an optical reflectivity switching mirror for switching 0% reflectivity and 100% reflectivity, provided that if the reflectivity is 0%, then the switch is capable of transmission of the optical signal.

It is also possible to change the number of the gate arrays from eight.

The optical multiplexer, the optical demultiplexer or the optical multiplexer/demultiplexer may comprise an array waveguide grating, a wavelength router having substantially the same grating structure as the array waveguide grating, or a wavelength MUX coupler having substantially the same grating structure as the array waveguide grating.

Since insertion loss is different among the optical multiplexer, the optical demultiplexer and the optical multiplexer/demultiplexer, it is possible to use optical attenuators in individual waveguides for control of the optical power levels.

It is also possible to control a gain of the erbium doped fiber amplifier gate or control reflectivity of the reflective mirror for control of the optical power levels for every wavelengths separately.

It is furthermore possible to replace the erbium doped fiber by rare earth doped fiber such as tellurium doped fiber, or an aluminum doped fiber. The length of the rare earth doped fiber and a doping concentration thereof may be set in accordance with the required specifications of the optical switch.

The excitation light may have a wavelength of 980 nanometers in order to shorten the wavelength for a remarkable reduction in noise factor of the optical output signal. In this case, the optical switch is also free from any substantive insertion loss and a low or reduced crosstalk.

Tenth Embodiment

Figure 10:
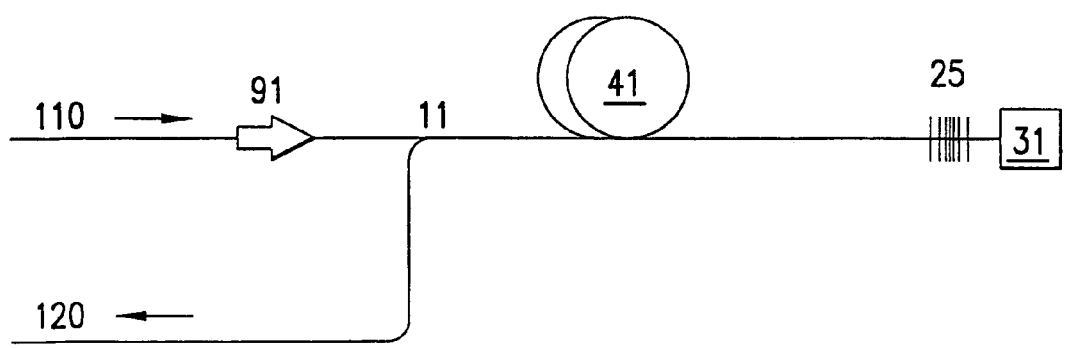
FIG. 10 is a diagram illustrative of a tenth novel optical switch as an optical gate switch in a tenth embodiment in accordance with the present invention.

A tenth embodiment according to the present invention will be described in detail with reference to FIG. 10 which is a diagram illustrative of a tenth novel optical switch as an optical gate switch.

The tenth novel optical switch is an optical gate switch. The tenth novel optical switch comprises an optical input signal transmission line 110 for transmitting an optical input signal, an optical output signal transmission line 120 for transmitting an optical output signal, an optical transmission line 130 connected through an optical coupler 11 to said input and output signal transmission lines 110 and 120, an optical isolator 91 provided on said optical input signal transmission line 110 for permitting a unidirectional transmission of said optical input signal toward said optical transmission line 130, an erbium doped fiber 41 provided on said optical transmission line 130, a wavelength band selective optical reflecting mirror 25 provided on said optical transmission line 130, and an excitation light source 31 connected to said wavelength band selective optical reflecting mirror 25. The optical input signal has a wavelength of 1550 nanometers. The excitation light source 31 is capable of emitting an excitation light having a wavelength of 1480 nanometers. The wavelength band selective optical reflecting mirror 25 is capable of selecting a reflecting wavelength band of an optical signal to be reflected by the wavelength band selective optical reflecting mirror 25.

In this case, the wavelength band selective optical reflecting mirror 25 so sets the reflecting wavelength band that the optical input signal with the wavelength of 1550 nanometers is total-reflected by the wavelength band selective optical reflecting mirror 25, whilst the excitation light emitted from the excitation light source 31 is transmitted through the wavelength band selective optical reflecting mirror 25 to the erbium doped fiber 41, whereby the erbium doped fiber 41 is excited by the excitation light. The excited erbium doped fiber 41 is capable of amplifying the optical input signal. The amplified input signal is then total-reflected by the wavelength band selective optical reflecting mirror 25. The reflected input signal is then transmitted again through the erbium doped fiber 41, whereby the reflected signal is further amplified. The further amplified optical signal is divided by the optical coupler 11 into two parts, one of which is transmitted to the optical isolator 91. However, the transmission of the divided optical signal is prevented by the optical isolator 91. On the other hand, the other divided part of the optical signal is transmitted through the output signal transmission line 120. In the above state, the above optical gate switch is in ON state.

If no excitation light is emitted from the excitation light source 31, the erbium doped fiber 41 receives no excitation light and is unexcited, whereby the input optical signal is absorbed by the erbium doped fiber 41. No optical signal is outputted from the output signal transmission line 120. In the above state, the optical gate switch is in OFF state.

The above novel optical gate switch is capable of reducing an insertion loss and also reducing the number of the required optical couplers.

Figure 11:
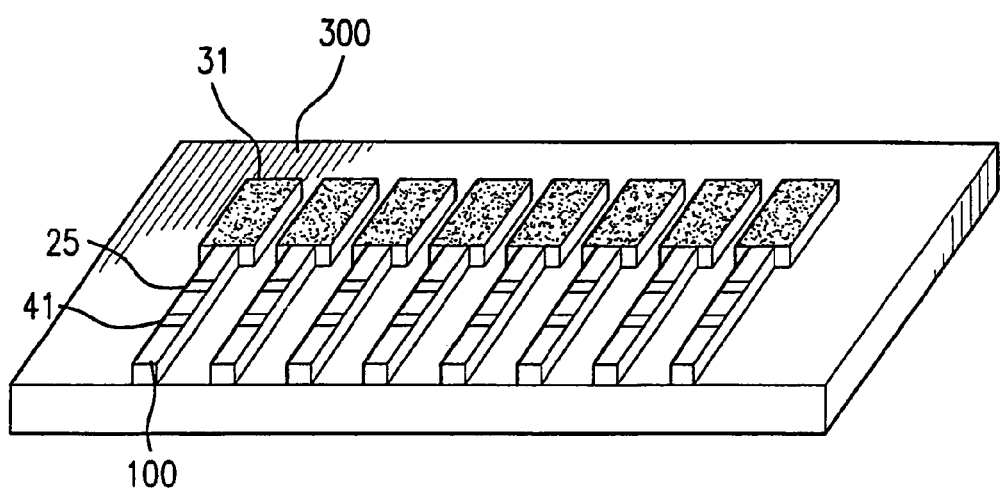
FIG. 11 is a schematic view illustrative of an integration of the above novel optical gate switch in a tenth embodiment in accordance with the present invention.

It is also possible to integrate the wavelength band selective optical reflecting mirror 25 and the excitation light source 31. FIG. 11 is a schematic view illustrative of an integration of the above novel optical gate switch. An erbium doped fiber amplifier gate array 300 has an integration of eight sets of an excitation light source 31, a wavelength band selective optical reflecting mirror 25, an erbium doped fiber 41, and an optical transmission line 100.

As a modification to this embodiment, it is possible to provide any one of the above first to fourth optical switches of FIGS. 1 to 4 in the first to fourth embodiments, in place of the above optical coupler 11 and the optical reflectivity variable mirror 50.

It is possible that the input and output ports are commonly used or that the input and output ports are separated from each other by use of an optical coupler and an optical isolator or by use of a circulator.

It is possible to change the positions of the optical couplers provided that the functions of the optical add-drop multiplexer can be ensured.

The optical multiplexer, the optical demultiplexer or the optical multiplexer/demultiplexer may comprise an array waveguide grating, a wavelength router having substantially the same grating structure as the array waveguide grating, or a wavelength MUX coupler having substantially the same grating structure as the array waveguide grating.

Since insertion loss is different among the optical multiplexer, the optical demultiplexer and the optical multiplexer/demultiplexer, it is possible to use optical attenuators individual waveguides for control of the optical power levels.

It is also possible to control a gain of the erbium doped fiber amplifier gate or control reflectivity of the reflective mirror for control of the optical power levels for every wavelengths separately.

It is furthermore possible to replace the erbium doped fiber by rare earth doped fiber such as tellurium doped fiber, or an aluminum doped fiber. The length of the rare earth doped fiber and a doping concentration thereof may be set in accordance with the required specifications of the optical switch.

The excitation light may have a wavelength of 980 nanometers in order to shorten the wavelength of a remarkable reduction in noise factor of the optical output signal. In this case, the optical switch is also free from any substantive insertion loss and a low or reduced crosstalk.

Eleventh Embodiment

Figure 12:
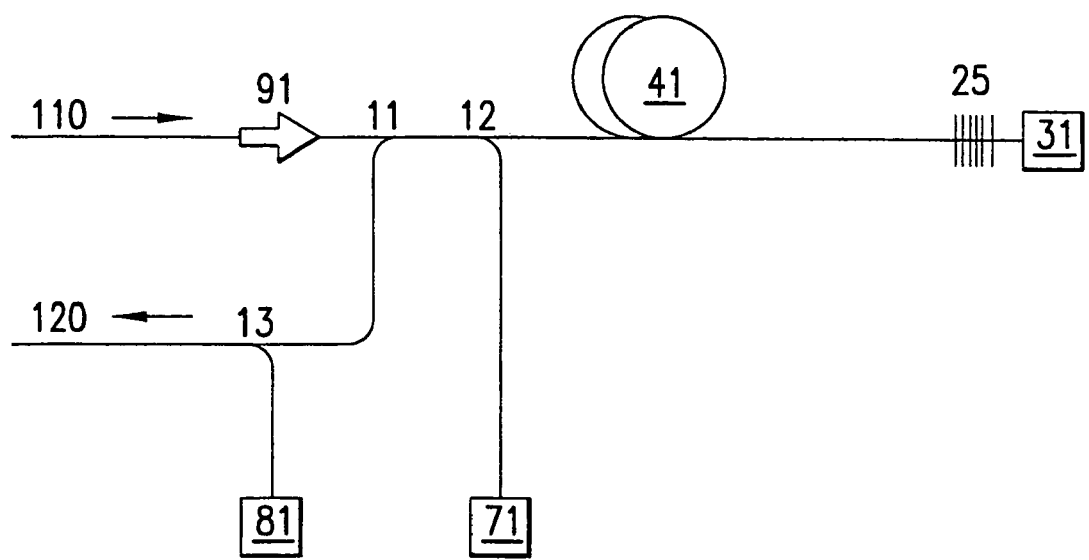
FIG. 12 is a diagram illustrative of a novel optical add-drop multiplexer using an optical gate switch of FIG. 10 for performing optical addition, drop and transmission of said optical signals in an eleventh embodiment in accordance with the present invention.

An eleventh embodiment according to the present invention will be described in detail with reference to FIG. 12 which is a diagram illustrative of a novel optical add-drop multiplexer using an optical gate switch of FIG. 10 for performing optical addition, drop and transmission of said optical signals.

The novel optical add-drop multiplexer using an optical gate switch comprises an optical input signal transmission line 110 for transmitting an optical input signal, an optical output signal transmission line 120 for transmitting an optical output signal, an optical transmission line 130 connected through an optical coupler 11 to said input and output signal transmission lines 110 and 120, and optical isolator 91 provided on said optical input signal transmission line 110 for permitting a unidirectional transmission of said optical input signal toward said optical transmission line 130, an erbium doped fiber 41 provided on said optical transmission line 130, a wavelength band selective optical reflecting mirror 25 provided on said optical transmission line 130, an excitation light source 31 connected to said wavelength band selective optical reflecting mirror 25, an optical receiver 71 connected through a second optical coupler 12 to the optical transmission line 130 and positioned between the first optical coupler 11 and the erbium doped fiber 41 and an optical transmitter 81 connected through a third optical coupler 13 to the output signal optical transmission line 130. The optical input signal has a wavelength of 1550 nanometers. The excitation light source 31 is capable of emitting an excitation light have a wavelength of 1480 nanometers. The wavelength band selective optical reflecting mirror 25 is capable of selecting a reflecting wavelength band of an optical signal to be reflected by the wavelength band selective optical reflecting mirror 25.

In this case, the wavelength band selective optical reflecting mirror 25 so sets the reflecting wavelength band that the optical input signal with the wavelength of 1550 nanometers is total-reflected by the wavelength band selective optical reflecting mirror 25, whilst the excitation light emitted from the excitation light source 31 is transmitted through the wavelength band selective optical reflecting mirror 25 to the erbium doped fiber 41, whereby the erbium doped fiber 41 is excited by the excitation light. The excited erbium doped fiber 41 is capable of amplifying the optical input signal. The amplified input signal is then total-reflected by the wavelength band selective optical reflecting mirror 25. The reflected input signal is then transmitted again through the erbium doped fiber 41, whereby the reflected signal is further amplified. The further amplified optical signal is divided by the optical coupler 11 into two parts, one of which is transmitted to the optical isolator 91. However, the transmission of the divided optical signal is prevented by the optical isolator 91. On the other hand, the other divided part of the optical signal is transmitted through the output signal transmission line 120. In the above state, the above optical gate switch is in ON state.

A signal transmission operation of the above novel optical add-drop multiplexer will subsequently be described. The excitation light is emitted from the excitation light source 31 and then supplied to the erbium doped fiber 41, whereby the erbium doped fiber 41 is excited. The optical input signal is transmitted through the erbium doped fiber 41 and amplified by the excited erbium doped fiber 41. The amplified optical input signal is total-reflected by the wavelength band selective optical reflecting mirror 25. The reflected optical signal is then transmitted again through the erbium doped fiber 41, whereby the reflected signal is further amplified. The further amplified optical signal is divided by the first optical coupler 11 into two parts, one of which is transmitted to the optical isolator 91. However, the transmission of the divided optical signal is prevented by the optical isolator 91. On the other hand, the other divided part of the optical signal is transmitted through the output signal transmission line 120.

A signal drop operation of the above novel optical add-drop multiplexer will subsequently be described. The optical input signal is divided by the second optical coupler into two parts, one of which is transmitted to the optical receiver 71.

It is possible to set the ratio of first optical division for the optical receiver 71 to second optical division for the erbium doped fiber 41 is small in order to reduce the optical loss due to the second optical coupler 12.

A signal add operation of the above novel optical add-drop multiplexer will subsequently be described. In this case, no excitation light is emitted from the excitation light source 31, for which reason the erbium doped fiber 41 receives 110 excitation light and is unexcited, whereby the input output signal is absorbed by the erbium doped fiber 41. No optical signal is outputted from the output signal transmission line 120. On the other hand, the optical transmitter 81 emits a second optical signal with a wavelength of 1550 nanometers which is then transmitted on the output signal optical transmission line 120, whereby the second optical signal is outputted from the output signal optical transmission line 120.

The above novel optical add-drop multiplexer is capable of reducing an insertion loss and also reducing the number of required optical couplers.

Figure 13:
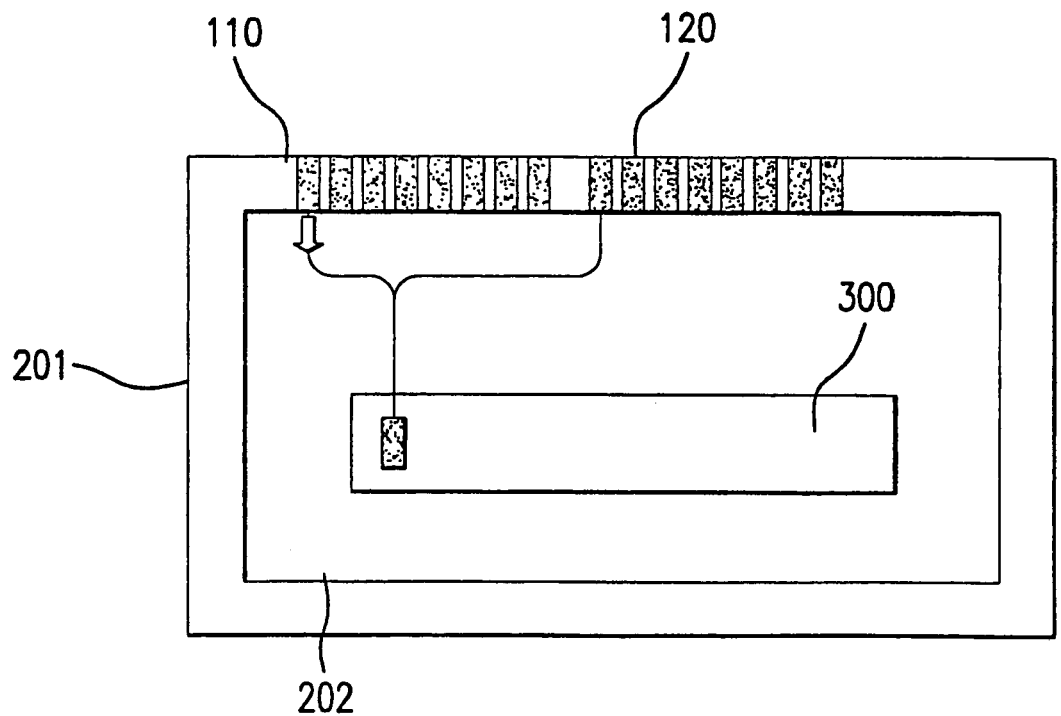
FIG. 13 is a schematic view illustrative of an integration of the above novel optical add-drop multiplexer in an eleventh embodiment in accordance with the present invention.

It is also possible to integrate the wavelength band selective optical reflecting mirror 25 and the excitation light source 31. FIG. 13 is a schematic view illustrative of an integration of the above novel optical add-drop multiplexer. An erbium doped fiber amplifier gate module 202 is provided formed on a package 210. The erbium doped fiber amplifier gate module 202 has an erbium doped fiber amplifier gate array 300. The erbium doped fiber amplifier gate array 300 has an integration of eight sets of an excitation light source 31, a wavelength band selective optical reflecting mirror 25, an erbium doped fiber 41, and an optical transmission line 100. The erbium doped fiber amplifier gate module 202 has an input port 110 and an output port 120 which are provided in the same side of the package 201. This allows a high density integration of the package.

As a modification to this embodiment, it is possible to provide any one of the above first to fourth optical switches of FIGS. 1 to 4 in the first to fourth embodiments, in place of the above optical gate switch.

It is possible that the input and output ports are commonly used or that the input and output ports are separated from each other by use of an optical coupler and an optical isolator or by use of a circulator.

It is also possible that the erbium doped fibers are packaged in the same array, or that the reflective mirrors are incorporated into the erbium doped fiber amplifier gate module, or that all of the above elements are packaged onto a PLC board.

The optical multiplexer, the optical demultiplexer or the optical multiplexer/demultiplexer may comprise an array waveguide grating, a wavelength router having substantially the same grating structure as the array waveguide grating, or a wavelength MUX coupler having substantially the same grating structure as the array waveguide grating.

Since the insertion loss is different among the optical multiplexer, the optical demultiplexer and the optical multiplexer/demultiplexer, it is possible to use optical attenuators in individual waveguides for control of the optical power levels.

It is also possible to control a gain of the erbium doped fiber amplifier gate or control reflectivity of the reflective mirror for control of the optical power levels for every wavelengths separately.

It is furthermore possible to replace the erbium doped fiber by rare earth doped fiber such as tellurium doped fiber, or an aluminum doped fiber. The length of the rare earth doped fiber and a doping concentration thereof may be set in accordance with the required specifications of the optical switch.

The excitation light may have a wavelength of 980 nanometers in order to shorten the wavelength for a remarkable reduction in noise factor of the optical output signal. In this case, the optical switch is also free from any substantive insertion loss and a low or reduced crosstalk.

Twelfth Embodiment

Figure 14:
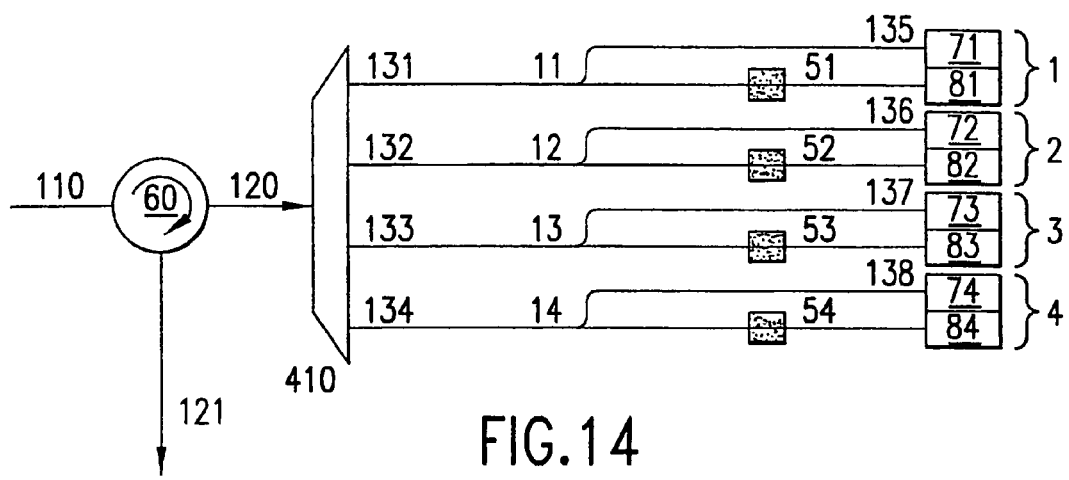
FIG. 14 is a diagram illustrative of a novel wavelength-multiplexed optical add-drop multiplexer using four sets of the above novel optical add-drop multiplexer of FIG. 9 in a twelfth embodiment in accordance with the present invention.

A twelfth embodiment according to the present invention will be described in detail with reference to FIG. 14 which is a diagram illustrative of a novel wavelength-multiplexed optical add-drop multiplexer using four sets of the above novel optical add-drop multiplexer of FIG. 9.

The novel wavelength-multiplexed optical add-drop multiplexer comprises a single optical circulator 60 connected with optical transmission lines 110, 120 and 121, an optical multiplexer/demultiplexer 410 connected through said optical transmission line 120 to said optical circulator 60 and first to fourth optical add-drop multiplexer 1, 2, 3 and 4. The first optical add-drop multiplexer is operable for a signal having a wavelength of 1548 nanometers. The second optical add-drop multiplexer is operable for a signal having a wavelength of 1550 nanometers. The third optical add-drop multiplexer is operable for a signal having a wavelength of 1552 nanometers. The fourth optical add-drop multiplexer is operable for a signal having a wavelength of 1554 nanometers.

The optical input signal having four wavelength compositions of 1548 nanometers, 1550 nanometers, 1552 nanometers, and 1554 nanometers is transmitted from the optical transmission line 110 through the optical circulator 60 to the optical multiplexer/demultiplexer 410, so that the optical input signal is wavelength-demultiplexer by the optical multiplexer/demultiplexer 410 whereby the optical input signal is divided into a first signal having a wavelength of 1548 nanometers, a second signal having a wavelength of 1550 nanometers, a third signal having a wavelength of 1552 nanometers, and a fourth signal having wavelength of 1554 nanometers. The first, second, third and fourth optical signals are inputted into the first, second, third and fourth optical add-drop multiplexers 1, 2, 3 and 4 respectively.

The first optical add-drop multiplexer 1 comprises a first main optical transmission line 131 for transmitting the first optical signal, a first optical reflectivity variable mirror 51 provided on the first main optical transmission line 131 for reflecting the first optical signal at a controlled reflectivity, and an optical transmitter 81 with an end of the first main optical transmission line 131, a first subordinate optical transmission line 135 connected through a first optical coupler 11 to the first main optical transmission line, and a first optical receiver 71 connected with said first subordinate optical transmission line 135. The first optical input signal is divided by the first optical coupler 11 so that one of the divider first optical input signal is transmitted the first subordinate optical transmission line 135 to the optical receiver 71, whilst the remaining one of the divided first optical input signal is transmitted to the optical reflectivity variable mirror 51 whereby the remaining one of the divided first optical input signal is reflected by the first optical reflectivity variable mirror 51 at a controlled reflectivity. The first optical reflectivity variable mirror 51 is capable of varying a reflectivity in the range of from 0% to 100%. If the reflectivity of the first optical reflectivity variable mirror 51 is set 0%, then the first optical reflectivity variable mirror 51 is in a transmission state which allows an optical signal transmission. In this case, the first optical signal transmitted from the first optical transmitter 81 is transmitted through the first optical reflectivity variable mirror 51 to the first main optical transmission line 131.

A signal transmission operation of the first optical add-drop multiplexer will subsequently be described. The first optical input signal is transmitted on the first main optical transmission line 131 and then reflected by the first optical reflectivity variable mirror 51 before the reflected optical signal is then transmitted on the first main optical transmission line 131.

A signal drop operation of the first optical add-drop multiplexer will subsequently be described. The first optical input signal is transmitted on the first main optical transmission line 131 and then divided into two parts by the first optical coupler 11. One of the divided first optical input signals is then transmitted through the first subordinate optical transmission line 135 to the optical receiver 71.

A signal add operation of the first optical add-drop multiplexer will subsequently be described. If the reflectivity of the first optical reflectivity variable mirror 51 is set 0%, then the first optical reflectivity variable mirror 51 is in a transmission state which allows an optical signal transmission. In this case, a first substitute optical signal transmitted from the optical transmitter 81 is transmitted through the first optical reflectivity variable mirror 51 to the first main optical transmission line 131.

The second optical add-drop multiplexer 2 comprises a second main optical transmission line 132 for transmitting the second optical signal, a second optical reflectivity variable mirror 52 provided on the second main optical transmission line 132 for reflecting the second optical signal at a controlled reflectivity, and an optical transmitter 82 with an end of the second main optical transmission line 132, a second subordinate optical transmission line 136 connected through a second optical coupler 12 to the second main optical transmission line, and a second optical receiver 72 connected with said second subordinate optical transmission line 136. The second optical input signal is divided by the second optical coupler 12 so that one of the divided second optical input signal is transmitted through the second subordinate optical transmission line 136 to the optical receiver 72, whilst the remaining one of the divided second optical input signal is transmitted to the optical reflectivity variable mirror 52 whereby the remaining one of the divided second optical input signal is reflected by the second optical reflectivity variable mirror 52 at a controlled reflectivity. The second optical reflectivity variable mirror 52 is capable of varying a reflectivity in the range of from 0% to 100%. If the reflectivity of the second optical reflectivity variable mirror 52 is set 0%, then the second optical reflectivity variable mirror 52 is in a transmission state which allows an optical signal transmission. In this case, the second optical signal transmitted from the second optical transmitter 82 is transmitted through the second optical reflectivity variable mirror 52 to the second main optical transmission line 132.

A signal transmission operation of the second optical add-drop multiplexer will subsequently be described. The second optical input signal is transmitted on the second main optical transmission line 132 and then reflected by the second optical reflectivity variable mirror 52 before the reflected optical signal is then transmitted on the second main optical transmission line 132.

A signal drop operation of the second optical add-drop multiplexer will subsequently be described. The second optical input signal is transmitted on the second main optical transmission line 132 and then divided into two parts by the second optical coupler 12. One of the divided second optical input signals is then transmitted through the second subordinate optical transmission line 136 to the optical receiver 72.

A signal add operation of the second optical add-drop multiplexer will subsequently be described. If the reflectivity of the second optical reflectivity variable mirror 52 is set 0%, then the second optical reflectivity variable mirror 52 is in a transmission state which allows an optical signal transmission. In this case, a second substitute optical signal transmitted from the optical transmitter 82 is transmitted through the second optical reflectivity variable mirror 52 to the second main optical transmission line 132.

The third optical add-drop multiplexer 3 comprises a third main optical transmission line 133 for transmitting the third optical signal, a third optical reflectivity variable mirror 53 provided on the third main optical transmission line 133 for reflecting the third optical signal at a controlled reflectivity, and an optical transmitter 83 with an end of the third main optical transmission line 133, a third subordinate optical transmission line 137 connected through a third optical coupler 13 to the third main optical transmission line, and a third receiver 73 connected with said third subordinate optical transmission line 137. The third optical input signal is divided by the third optical coupler 13 so that one of the divided third optical input signal is transmitted through the third subordinate optical transmission line 137 to the optical receiver 73, whilst the remaining one of the divided third optical input signal is transmitted to the optical reflectivity variable mirror 53 whereby the remaining one of the divided third optical input signal is reflected by the third optical reflectivity variable mirror 53 at a controlled reflectivity. The third optical reflectivity variable mirror 53 is capable of varying a reflectivity in the range of from 0% to 100%. If the reflectivity of the third optical reflectivity variable mirror 53 is set 0%, then the third optical reflectivity variable mirror 53 is in a transmission state which allows an optical signal transmission. In this case, the third optical signal transmitted from the third optical transmitter 83 is transmitted through the third optical reflectivity variable mirror 53 to the third main optical transmission line 133.

A signal transmission operation of the third optical add-drop multiplexer will subsequently be described. The third optical input signal is transmitted on the third main optical transmission line 133 and then reflected by the third optical reflectivity variable mirror 53 before the reflected optical signal is then transmitted on the third main optical transmission line 133.

A signal drop operation of the third optical add-drop multiplexer will subsequently be described. The third optical input signal is transmitted on the third main optical transmission line 133 and then divided into two parts by the third optical coupler 13. One of the divided third optical input signals is then transmitted through the third subordinate optical transmission line 137 to the optical receiver 73.

A signal add operation of the third optical add-drop multiplexer will subsequently be described. If the reflectivity of the third optical reflectivity variable mirror 53 is set 0%, then the third optical reflectivity variable mirror 53 is in a transmission state which allows an optical signal transmission. In this case, a third substitute optical signal transmitted from the optical transmitter 83 is transmitted through the third optical reflectivity variable mirror 53 to the third main optical transmission line 133.

The fourth optical add-drop multiplexer 4 comprises a fourth main optical transmission line 134 for transmitting the fourth optical signal, a fourth optical reflectivity variable mirror 54 provided on the fourth main optical transmission line 134 of reflecting the fourth optical signal at a controlled reflectivity, and an optical transmitter 84 with an end of the fourth main optical transmission line 134, a fourth subordinate optical transmission line 138 connected through a fourth optical coupler 14 to the fourth main optical transmission line, and a fourth optical receiver 74 connected with said fourth subordinate optical transmission line 138. The fourth optical input signal is divided by the fourth optical coupler 14 so that one of the divided fourth optical input signal is transmitted through the fourth subordinate optical transmission line 138 to the optical receiver 74, whilst the remaining one of the divided fourth optical input signal is transmitted to the optical reflectivity variable mirror 54 whereby the remaining one of the divided fourth optical input signal is reflected by the fourth optical reflectivity variable mirror 54 at a controlled reflectivity. The fourth optical reflectivity variable mirror 54 is capable of varying a reflectivity in the range of from 0% to 100%. If the reflectivity of the fourth optical reflectivity variable mirror 54 is set 0%, then the fourth-optical reflectivity variable mirror 54 is in a transmission state which allows an optical signal transmission. In this case, the fourth optical signal transmitted from the fourth optical transmitter 84 is transmitted through the fourth optical reflectivity variable mirror 54 to the fourth main optical transmission line 134.

A signal transmission operation of the fourth optical add-drop multiplexer will subsequently be described. The fourth optical input signal is transmitted on the fourth main optical transmission line 134 and then reflected by the fourth optical reflectivity variable mirror 54 before the reflected optical signal is then transmitted on the fourth main optical transmission line 134.

A signal drop operation of the fourth optical add-drop multiplexer will subsequently be described. The fourth optical input signal is transmitted on the fourth main optical transmission line 134 and then divided into two parts by the fourth optical coupler 14. One of the divided fourth optical input signals is then transmitted through the fourth subordinate optical transmission line 138 to the optical receiver 74.

A signal add operation of the fourth optical add-drop multiplexer will subsequently be described. If the reflectivity of the fourth optical reflectivity variable mirror 54 is set 0%, then the fourth optical reflectivity variable mirror 54 is in a transmission state which allows an optical signal transmission. In this case, a fourth substitute optical signal transmitted from the optical transmitter 84 is transmitted through the fourth optical reflectivity variable mirror 54 to the fourth main optical transmission line 134.

First, second, third and fourth output signals are multiplexed by the optical multiplexer/demultiplexer 410 to form a single output signal which is then transmitted through the circulator 60 to the optical transmission line 121.

The above novel optical add-drop multiplexers do require no optical coupler for signal adding, thereby realizing a low optical loss.

As a modification to this embodiment, it is possible to provide any one of the above first to fourth optical switches of FIGS. 1 to 4 in the first to fourth embodiments, in place of the above optical couplers and the optical reflectivity variable mirrors.

It is possible that the input and output ports are commonly used or that the input and output ports are separated from each other by use of an optical coupler and an optical isolator or by use of a circulator.

It is also possible to change the number of the wavelength-multiplexing from four into, for example, eight, sixteen, thirty two or sixty four.

It is also possible to change the wavelength of the optical signals and also change a bit rate or a signal rate to 2.5 Gbps, 5 Gbps, 100 Gbps or set a bit-rate free.

The optical multiplexer, the optical demultiplexer or the optical multiplexer/demultiplexer may comprise an array waveguide grating, a wavelength router having substantially the same grating structure as the array waveguide grating, or a wavelength MUX coupler having substantially the same grating structure as the array waveguide grating.

Since insertion loss is different among the optical multiplexer, the optical demultiplexer and the optical multiplexer/demultiplexer, it is possible to use optical attenuators in individual waveguides for control of the optical power levels.

It is also possible to control a gain of the erbium doped fiber amplifier gate or control reflectivity of the reflective mirror for control of the optical power levels for every wavelengths separately.

It is furthermore possible to replace the erbium doped fiber by rare earth doped fiber such as tellurium doped fiber, or an aluminum doped fiber. The length of the rare earth doped fiber and a doping concentration thereof may be set in accordance with the required specifications of the optical switch.

The excitation light may have a wavelength of 980 nanometers in order to shorten the wavelength for a remarkable reduction in noise factor of the optical output signal. In this case, the optical switch is also free from any substantive insertion loss and a low or reduced crosstalk.

Thirteenth Embodiment

Figure 15:
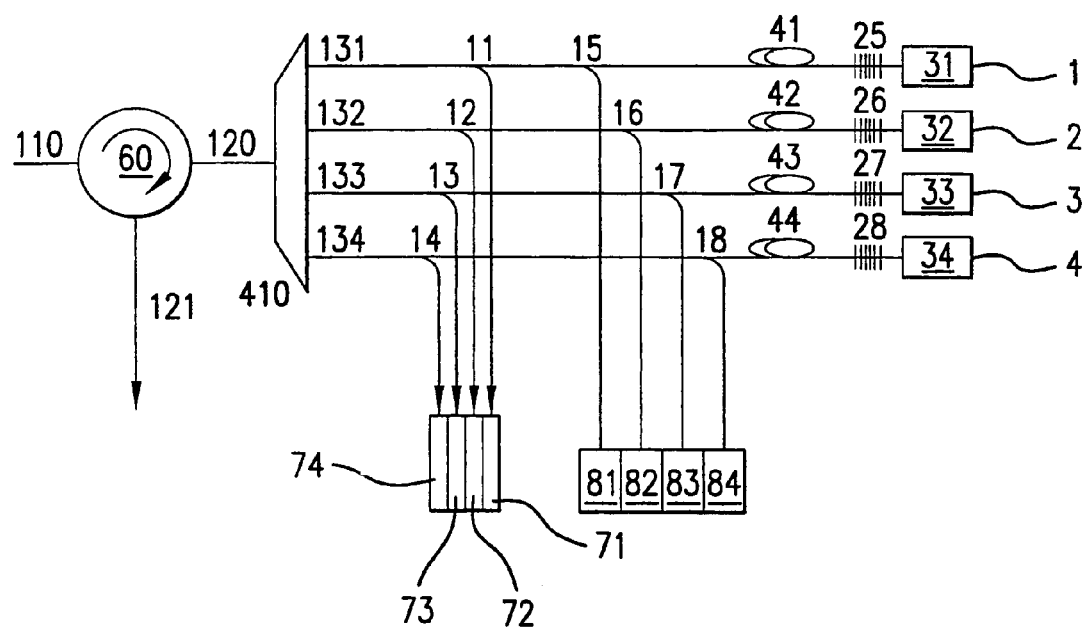
FIG. 15 is a diagram illustrative of a novel wavelength-multiplexed optical add-drop multiplexer using four sets of the above novel optical add-drop multiplexer of FIG. 12 in a thirteenth embodiment in accordance with the present invention.

A thirteenth embodiment according to the present invention will be described in detail with reference to FIG. 15 which is a diagram illustrative of a novel wavelength-multiplexed optical add-drop multiplexer using four sets of the above novel optical add-drop multiplexer of FIG. 12.

The novel wavelength-multiplexed optical add-drop multiplexer comprises a single optical circulator 60 connected with optical transmission lines 110, 120 and 121, an optical multiplexer/demultiplexer 410 connected through said optical transmission line 120 to said optical circulator 60 and first to fourth optical add-drop multiplexers 1, 2, 3 and 4. The first optical add-drop multiplexer is operable for a signal having a wavelength of 1548 nanometers. The second optical add-drop multiplexer is operable for a signal having a wavelength of 1550 nanometers. The third optical add-drop multiplexer is operable for a signal having a wavelength of 1552 nanometers. The fourth optical add-drop multiplexer is operable for a signal having a wavelength of 1554 nanometers.

The optical input signal having four wavelength compositions of 1548 nanometers, 1550 nanometers, 1552 nanometers, and 1554 nanometers is transmitted from the optical transmission line 110 through the optical circulator 60 to the optical multiplexer/demultiplexer 410, so that the optical input signal is wavelength-demultiplexer by the optical multiplexer/demultiplexer 410 whereby the optical input signal is divided into a first signal having a wavelength of 1548 nanometers, a second signal having a wavelength of 1550 nanometers, a third signal having a wavelength of 1552 nanometers, and a fourth signal having a wavelength of 1554 nanometers. The first, second, third and fourth optical signals are inputted into the first, second, third and fourth optical add-drop multiplexers 1, 2, 3 and 4 respectively.

The first optical add-drop multiplexer 1 comprises a first optical transmission line 131 for transmitting an optical input signal, a first erbium doped fiber 41 provided on said first optical transmission line 131, a first wavelength band selective optical reflecting mirror 25 provided on said first optical transmission line 131, a first excitation light source 31 connected to said first wavelength band selective optical reflecting mirror 25, a first optical receiver 71 connected through a first receiver side optical coupler 11 to the first optical transmission line 131 and an optical transmitter 81 connected through a first transmitter side optical coupler 15 to the first signal optical transmission line 131. The excitation light source 31 is capable of emitting an excitation light having a different wavelength from the first optical signal. The first wavelength band selective optical reflecting mirror 25 is capable of selecting a reflecting wavelength band of the first optical signal to be reflected by the first wavelength band selective optical reflecting mirror 25. The first optical input signal is total-reflected by the first wavelength band selective optical reflecting mirror 25, whilst the first excitation light emitted from the first excitation light source 31 is transmitted through the first wavelength band selective optical reflecting mirror 25 to the first erbium doped fiber 41, whereby the first erbium doped fiber 41 is excited by the first excitation light. The first excited erbium doped fiber 41 is capable of amplifying the first optical input signal. The amplified input signal is then total-reflected by the first wavelength band selective optical reflecting mirror 25. The reflected input signal is then transmitted again through the first erbium doped fiber 41, whereby the reflected signal is further amplified. The further amplified optical signal is transmitted through the first output signal transmission line 131.

A signal transmission operation of the above first optical add-drop multiplexer will subsequently be described. The first excitation light is emitted from the first excitation light source 31 and then supplied to the first erbium doped fiber 41, whereby the first erbium doped fiber 41 is excited. The optical input signal is transmitted through the first erbium doped fiber 41 and amplified by the excited first erbium doped fiber 41. The amplified optical input signal is total-reflected by the first wavelength band selective optical reflecting mirror 25. The reflected optical signal is then transmitted again through the first erbium doped fiber 41, whereby the reflected signal is further amplified. The further amplified optical signal is transmitted through the first signal transmission line 131 to the optical multiplexer/demultiplexer 410.

A signal drop operation of the above first optical add-drop multiplexer will subsequently be described. The first optical input signal is divided by the first receiver side optical coupler 11 into two parts, one of which is transmitted to the first optical receiver 71.

A signal add operation of the above first optical add-drop multiplexer will subsequently be described. In this case, no excitation light is emitted from the first excitation light source 31, for which reason the first erbium doped fiber 41 receives no excitation light and is unexcited, whereby the first input optical signal is absorbed by the first erbium doped fiber 41. No optical signal is outputted from the first signal transmission line 131. On the other hand, the first optical transmitter 81 emits a first substitute optical signal which is then transmitted through the first transmitter side optical coupler 15 on the first optical transmission line 131, whereby the first substitute optical signal is outputted from the first optical transmission line 131.

The second optical add-drop multiplexer 2 comprises a second optical transmission line 132 for transmitting an optical input signal, a second erbium doped fiber 42 provided on said second optical transmission line 132, a second wavelength band selective optical reflecting mirror 26 provided on said second optical transmission line 132, a second excitation light source 32 connected to said second wavelength band selective optical reflecting mirror 26, a second optical receiver 72 connected through a second receiver side optical coupler 12 to the second optical transmission line 132 and an optical transmitter 82 connected through a second transmitter side optical coupler 16 to the second signal optical transmission line 132. The excitation light source 32 is capable of emitting an excitation light having a different wavelength from the second optical signal. The second wavelength band selective optical reflecting mirror 26 is capable of selecting a reflecting wavelength band of the second optical signal to be reflected by the second wavelength band selective optical reflecting mirror 26. The second optical input signal is total-reflected by the second wavelength band selective optical reflecting mirror 26, whilst the second excitation light emitted from the second excitation light source 32 is transmitted through the second wavelength band selective optical reflecting mirror 26 to the second erbium doped fiber 42, whereby the second erbium doped fiber 42 is excited by the second excitation light. The second excited erbium doped fiber 42 is capable of amplifying the second optical input signal. The amplified input signal is then total-reflected by the second wavelength band selective optical reflecting mirror 26. The reflected input signal is then transmitted again through the second erbium doped fiber 42, whereby the reflected signal is further amplified. The further amplified optical signal is transmitted through the second output signal transmission line 132.

A signal transmission operation of the above second optical add-drop multiplexer will subsequently be described. The second excitation light is emitted from the second excitation light source 32 and then supplied to the second erbium doped fiber 42, whereby the second erbium doped fiber 42 is excited. The optical input signal is transmitted through the second erbium doped fiber 42 and amplified by the excited second erbium doped fiber 42. The amplified optical input signal is total-reflected by the second wavelength band selective optical reflecting mirror 26. The reflected optical signal is then transmitted again through the second erbium doped fiber 42, whereby the reflected signal is further amplified. The further amplified optical signal is transmitted through the second signal transmission line 132 to the optical multiplexer/demultiplexer 420.

A signal drop operation of the above second optical add-drop multiplexer will subsequently be described. The second optical input signal is divided by the second receiver side optical coupler 12 into two parts, one of which is transmitted to the second optical receiver 72.

A signal add operation of the above second optical add-drop multiplexer will subsequently be described. In this case, no excitation light is emitted from the second excitation light source 32, for which reason the second erbium doped fiber 42 receives no excitation light and is unexcited, whereby the second input optical signal is absorbed by the second erbium doped fiber 42. No optical signal is outputted from the second signal transmission line 132. On the other hand, the second optical transmitter 82 emits a second substitute optical signal which is then transmitted through the second transmitter side optical coupler 16 on the second optical transmission line 132, whereby the second substitute optical signal is outputted from the second optical transmission line 132.

The third optical add-drop multiplexer 3 comprises a third optical transmission line 133 for transmitting an optical input signal, a third erbium doped fiber 43 provided on said third optical transmission line 133, a third wavelength band selective optical reflecting mirror 27 provided on said third optical transmission line 133, a third excitation light source 33 connected to said third wavelength band selective optical reflecting mirror 27, a third optical receiver 73 connected through a third receiver side optical coupler 13 to the third optical transmission line 133 and an optical transmitter 83 connected through a third transmitter side optical coupler 17 to the third signal optical transmission line 133. The excitation light source 33 is capable of emitting an excitation light having a different wavelength from the third optical signal. The third wavelength band selective optical reflecting mirror 27 is capable of selecting a reflecting wavelength band of the third optical signal to be reflected by the third wavelength band selective optical reflecting mirror 27. The third optical input signal is total-reflected by the third wavelength band selective optical reflecting mirror 27, whilst the third excitation light emitted from the third excitation light source 33 is transmitted through the third wavelength band selective optical reflecting mirror 27 to the third erbium doped fiber 43, whereby the third erbium doped fiber 43 is excited by the third excitation light. The third excited erbium doped fiber 43 is capable of amplifying the third optical input signal. The amplified input signal is then total-reflected by the third wavelength band selective optical reflecting mirror 27. The reflected input signal is then transmitted again through the third erbium doped fiber 43, whereby the reflected signal is further amplified. The further amplified optical signal is transmitted through the third output signal transmission line 133.

A signal transmission operation of the above third optical add-drop multiplexer will subsequently be described. The third excitation light is emitted from the third excitation light source 33 and then supplied to the third erbium doped fiber 43, whereby the third erbium doped fiber 43 is excited. The optical input signal is transmitted through the third erbium doped fiber 43 and amplified by the excited third erbium doped fiber 43. The amplified optical input signal is total-reflected by the third wavelength band selective optical reflecting mirror 27. The reflected optical signal is then transmitted again through the third erbium doped fiber 43, whereby the reflected signal is further amplified. The further amplified optical signal is transmitted through the third signal transmission line 133 to the optical multiplexer/demultiplexer 430.

A signal drop operation of the above third optical add-drop multiplexer will subsequently be described. The third optical input signal is divided by the third receiver side optical coupler 13 into two parts, one of which is transmitted to the third optical receiver 73.

A signal add operation of the above third optical add-drop multiplexer will subsequently be described. In this case, no excitation light is emitted from the third excitation light source 33, for which reason the third erbium doped fiber 43 receives no excitation light and is unexcited, whereby the third input optical signal is absorbed by the third erbium doped fiber 43. No optical signal is outputted from the third signal transmission line 133. On the other hand, the third optical transmitter 83 emits a third substitute optical signal which is then transmitted through the third transmitter side optical coupler 17 on the third optical transmission line 133, whereby the third substitute optical signal is outputted from the third optical transmission line 133.

The fourth optical add-drop multiplexer 4 comprises a fourth optical transmission line 134 for transmitting an optical input signal, a fourth erbium doped fiber 44 provided on said fourth optical transmission line 134, a fourth wavelength band selective optical reflecting mirror 28 provided on said fourth optical transmission line 134, a fourth excitation light source 34 connected to said fourth wavelength band selective optical reflecting mirror 28, a fourth optical receiver 74 connected through a fourth receiver side optical coupler 14 to the fourth optical transmission line 134 and an optical transmitter 84 connected through a fourth transmitter side optical coupler 18 to the fourth signal optical transmission line 134. The excitation light source 34 is capable of emitting an excitation light having a different wavelength from the fourth optical signal. The fourth wavelength band selective optical reflecting mirror 28 is capable of selecting a reflecting wavelength band of the fourth optical signal to be reflected by the fourth wavelength band selective optical reflecting mirror 28. The fourth optical input signal is total-reflected by the fourth wavelength band selective optical reflecting mirror 28, whilst the fourth excitation light emitted from the fourth excitation light source 34 is transmitted through the fourth wavelength band selective optical reflecting mirror 28 to the fourth erbium doped fiber 44, whereby the fourth erbium doped fiber 44 is excited by the fourth excitation light. The fourth excited erbium doped fiber 44 is capable of amplifying the fourth optical input signal. The amplified input signal is then total-reflected by the fourth wavelength band selective optical reflecting mirror 28. The reflected input signal is then transmitted again through the fourth erbium doped fiber 44, whereby the reflected signal is further amplified. The further amplified optical signal is transmitted through the fourth output signal transmission line 134.

A signal transmission operation of the above fourth optical add-drop multiplexer will subsequently be described. The fourth excitation light is emitted from the fourth excitation light source 34 and then supplied to the fourth erbium doped fiber 44, whereby the fourth erbium doped fiber 44 is excited. The optical input signal is transmitted through the fourth erbium doped fiber 44 and amplified by the excited fourth erbium doped fiber 44. The amplified optical input signal is total-reflected by the fourth wavelength band selective optical reflecting mirror 28. The reflected optical signal is then transmitted again through the fourth erbium doped fiber 44, whereby the reflected signal is further amplified. The further amplified optical signal is transmitted through the fourth signal transmission line 134 to the optical multiplexer/demultiplexer 440.

A signal drop operation of the above fourth optical add-drop multiplexer will subsequently be described. The fourth optical input signal is divided by the fourth receiver side optical coupler 14 into two parts, one of which is transmitted to the fourth optical receiver 74.

A signal add operation of the above fourth optical add-drop multiplexer will subsequently be described. In this case, no excitation light is emitted from the fourth excitation light source 34, for which reason the fourth erbium doped fiber 44 receives no excitation light and is unexcited, whereby the fourth input optical signal is absorbed by the fourth erbium doped fiber 44. No optical signal is outputted from the fourth signal transmission line 134. On the other hand, the fourth optical transmitter 84 emits a fourth substitute optical signal which is then transmitted through the fourth transmitter side optical coupler 18 on the fourth optical transmission line 134, whereby the fourth substitute optical signal is outputted from the fourth optical transmission line 134.

First, second, third and fourth output signals are multiplexed by the optical multiplexer/demultiplexer 410 to form a single output signal which is then transmitted through the circulator 60 to the optical transmission line 121.

The above novel optical add-drop multiplexer is capable of reducing an insertion loss and also reducing the number of the required optical couplers.

It is also possible to integrate the wavelength band selective optical reflecting mirrors and the excitation light sources.

It is possible that the input and output ports are commonly used or that the input and output ports are separated from each other by use of an optical coupler and an optical isolator or by use of a circulator.

It is also possible to change the number of the wavelength-multiplexing from four into, for example, eight, sixteen, thirty two or sixty four.

It is also possible to change the wavelength of the optical signals and also change a bit rate or a signal rate to 2.5 Gbps, 5 Gbps, 100 Gbps or set a bit-rate free.

The optical multiplexer, the optical demultiplexer or the optical multiplexer/demultiplexer may comprise an array waveguide grating, a wavelength router having substantially the same grating structure as the array waveguide grating, or a wavelength MUX coupler having substantially the same grating structure as the array waveguide grating.

Since insertion loss is different among the optical multiplexer, the optical demultiplexer and the optical multiplexer/demultiplexer, it is possible to use optical attenuators in individual waveguides for control of the optical power levels.

It is also possible to control a gain of the erbium doped fiber amplifier gate or control reflectivity of the reflective mirror for control of the optical power levels for every wavelengths separately.

It is furthermore possible to replace the erbium doped fiber by rare earth doped fiber such as tellurium doped fiber and a doping concentration thereof may be set in accordance with the required specifications of the optical switch.

The excitation light may have a wavelength of 980 nanometers in order to shorten the wavelength for a remarkable reduction in noise factor of the optical output signal. In this case, the optical switch is also free from any substantive insertion loss and a low or reduced crosstalk.

Fourteenth Embodiment

A fourteenth embodiment according to the present invention will be described in detail with reference to FIG. 16 which is a diagram illustrative of a novel wavelength-multiplexed optical add-drop multiplexer having four looped optical transmission paths.

The novel wavelength-multiplexed optical add-drop multiplexer comprises an optical multiplexer/demultiplexer 410 having an input port 110 and an output port 120, and first to fourth optical transmission lines 131, 132, 133 and 134 connected to the optical multiplexer/demultiplexer 410. The first optical transmission line 131 is provided for transmitting a signal having a wavelength of 1530 nanometers. The second optical transmission line 132 is provided for transmitting a signal having a wavelength of 1540 nanometers. The third optical transmission line 133 is provided for transmitting a signal having a wavelength of 1550 nanometers. The fourth optical transmission line is provided for transmitting a signal having a wavelength of 1560 nanometers.

The optical input signal having four wavelength compositions of 1530 nanometers, 1540 nanometers, 1550 nanometers, and 1560 nanometers is transmitted from the optical transmission line 110 to the optical multiplexer/demultiplexer 410, so that the optical input signal is wavelength-demultiplexed by the optical multiplexer/demultiplexer 410 whereby the optical input signal is divided into a first signal having a wavelength of 1530 nanometers, a second signal having a wavelength of 1540 nanometers, a third signal having a wavelength of 1550 nanometers, and a fourth signal having a wavelength of 1560 nanometers. The first, second, third and fourth optical signals are inputted into the first, second, third and fourth optical transmission lines 131, 132, 133 and 134 respectively.

The first optical transmission line 131 has a first receiver side optical coupler 31 which is connected to a first optical receiver 71, and a first transmitter side optical coupler 44 which is connected to a first optical transmitter 84. The first optical transmission line 131 also has a first optical multiplexer/demultiplexer 151.

Figure 16:
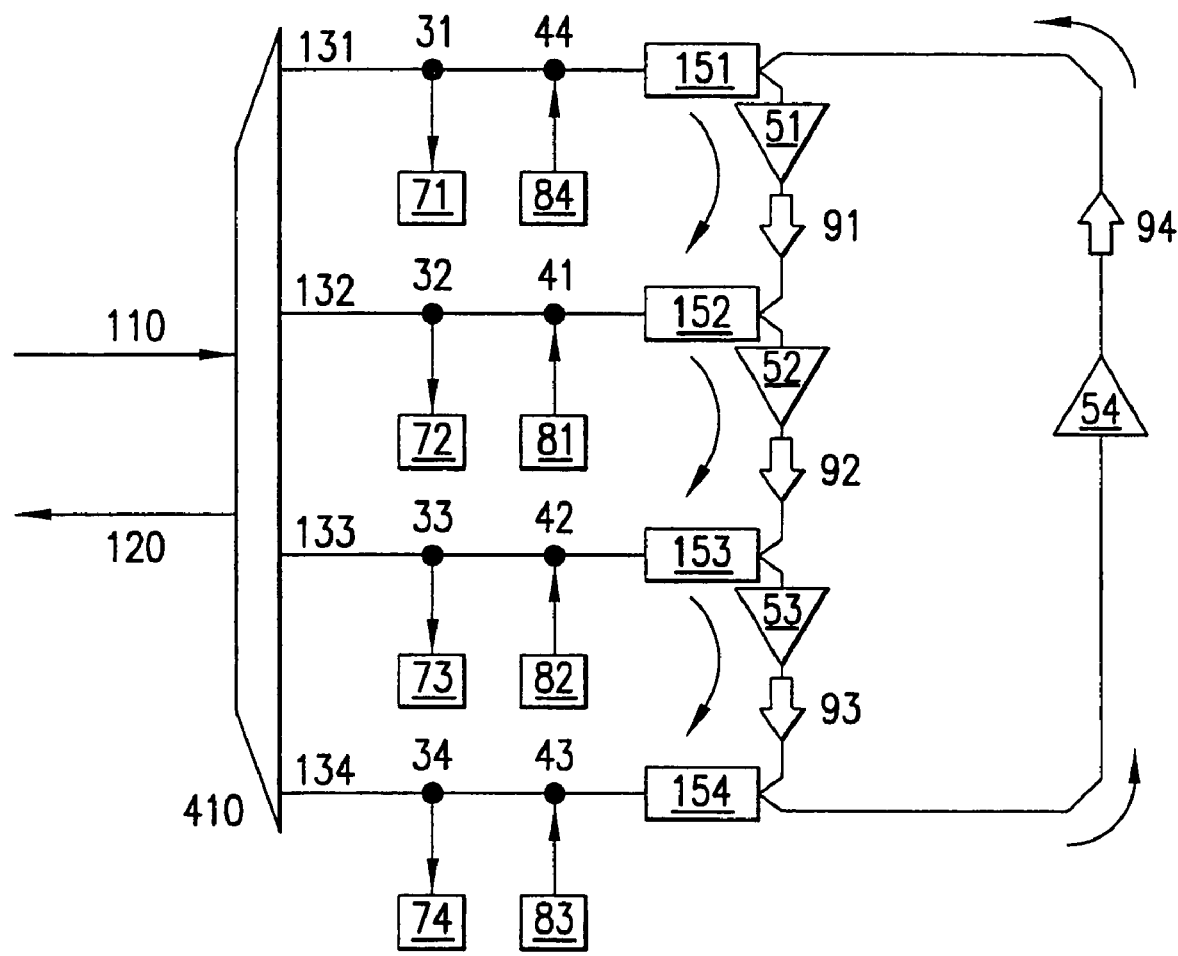
FIG. 16 is a diagram illustrative of a novel wavelength-multiplexed optical add-drop multiplexer having four looped optical transmission paths in a fourteenth embodiment in accordance with the present invention.
Figure 17:
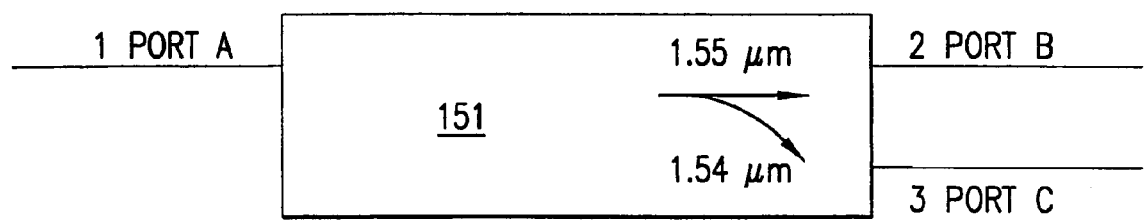
FIG. 17 is a diagram illustrative of the first optical multiplexer/demultiplexer used in the wavelength-multiplexed optical add-drop multiplexer of FIG. 16 in a fourteenth embodiment in accordance with the present invention.

FIG. 17 is a diagram illustrative of the first optical multiplexer/demultiplexer 151 used in the wavelength-multiplexed optical add-drop multiplexer of FIG. 16. The first optical multiplexer/demultiplexer 151 performs a wavelength demultiplexing so as to divide the first optical input signal into two different wavelength optical signals having 1.55 micrometers and 1.54 micrometers which are outputted from two output ports. The first optical multiplexer/demultiplexer 151 is used in place of the optical coupler so that the wavelength different two optical signals has a total optical power which is higher than the first optical signal, thereby to solve a problem with remarkable optical power loss caused when the signal is transmitted through a plurality of optical couplers.

The second optical transmission line 132 has a second receiver side optical coupler 32 which is connected to a second optical receiver 72, and a second transmitter side optical coupler 41 which is connected to a second optical transmitter 81. The second optical transmission line 132 also has a second optical multiplexer/demultiplexer 152. The first optical multiplexer/demultiplexer 151 is also connected through a series connection of a first optical amplifier 51 and a first isolator 91 to the second optical multiplexer/demultiplexer 152. One of the wavelength-demultiplexed optical signals is transmitted from the first optical multiplexer/demultiplexer 151 through the first optical amplifier 51 and the first isolator 91 to the second optical multiplexer/demultiplexer 152.

The second optical multiplexer/demultiplexer 152 performs a wavelength demultiplexing so as to divide the first optical input signal into two different wavelength optical signals which are outputted from two output ports. The second optical multiplexer/demultiplexer 152 is used in place of the optical coupler so that the wavelength different two optical signals has a total optical power which is higher than the second optical signal, thereby to solve a problem with remarkable optical power loss caused when the signal is transmitted through a plurality of optical couplers.

The third optical transmission line 133 has a third receiver side optical coupler 33 which is connected to a third optical receiver 73, and a third transmitter side optical coupler 42 which is connected to a third optical transmitter 82. The third optical transmission line 133 also has a third optical multiplexer/demultiplexer 153. The second optical multiplexer/demultiplexer 152 is also connected through a series connection of a second optical amplifier 52 and a second isolator 92 to the third optical multiplexer/demultiplexer 153. One of the wavelength-demultiplexed optical signals is transmitted from the second optical multiplexer/demultiplexer 152 through the second optical amplifier 52 and the second isolator 92 to the third optical multiplexer/demultiplexer 153.

Third optical multiplexer/demultiplexer 153 performs a wavelength demultiplexing so as to divide the first optical input signal into two different wavelength optical signals which are outputted from two output ports. The third optical multiplexer/demultiplexer 153 is used in place of the optical coupler so that the wavelength different two optical signals has a total optical power which is higher than the third optical signal, thereby to solve a problem with remarkable optical power loss caused when the signal is transmitted through a plurality of optical couplers.

The fourth optical transmission line 134 has a fourth receiver side optical coupler 34 which is connected to a fourth optical receiver 73, and a fourth transmitter side optical coupler 43 which is connected to a fourth optical transmitter 82. The fourth optical transmission line 134 also has a fourth optical multiplexer/demultiplexer 154. The third optical multiplexer/demultiplexer 153 is also connected through a series connection of a third optical amplifier 52 and a third isolator 93 to the fourth optical multiplexer/demultiplexer 154. One of the wavelength-demultiplexed optical signals is transmitted from the third optical multiplexer/demultiplexer 153 through the third optical amplifier 52 and the third isolator 93 to the fourth optical multiplexer/demultiplexer 154.

The fourth optical multiplexer/demultiplexer 154 performs a wavelength demultiplexing so as to divide the first optical input signal into two different wavelength optical signals which are outputted from two output ports. The fourth optical multiplexer/demultiplexer 154 is used in place of the optical coupler so that the wavelength different two optical signals has a total optical power which is higher than the fourth optical signal, thereby to solve a problem with remarkable optical power loss caused when the signal is transmitted through a plurality of optical couplers.

The fourth optical multiplexer/demultiplexer 154 is also connected through a series connection of a fifth optical amplifier 54 and a fifth optical attenuator 94 to the first optical multiplexer/demultiplexer 151.

The above wavelength-multiplexed optical add-drop multiplexer performs signal transmission operation, signal drop operation and signal add operation.

The signal transmission operation of the wavelength-multiplexed optical add-drop multiplexer will be described. The first input signal is transmitted through the first optical multiplexer/demultiplexer 151 to the first optical amplifier 51, whereby the signal is amplified by the first optical amplifier 51. The amplified signal is then transmitted through the first optical isolator 91 to the second optical multiplexer/demultiplexer 152. Since the second optical multiplexer/demultiplexer 152 has a multiplexing function, the amplified signal is transmitted through the second optical transmission line 132 to the optical multiplexer/demultiplexer 141, whereby the signal is multiplexed with other signal to output an output signal from the output port 120. The second input signal is transmitted through the second optical multiplexer/demultiplexer 152 to the second optical amplifier 52, whereby the signal is amplified by the second optical amplifier 52. The amplified signal is then transmitted through the second optical isolator 92 to the third optical multiplexer/demultiplexer 153. Since the third optical multiplexer/demultiplexer 153 has a multiplexing function, the amplified signal is transmitted through the third optical transmission line 133 to the optical multiplexer/demultiplexer 141, whereby the signal is multiplexed with other signal to output an output signal from the output port 120. The third input signal is transmitted through the third optical multiplexer/demultiplexer 153 to the third optical amplifier 53, whereby the signal is amplified by the third optical amplifier 53. The amplified signal is then transmitted through the third optical isolator 93 to the fourth optical multiplexer/demultiplexer 154. Since the fourth optical multiplexer/demultiplexer 154 has a multiplexing function, the amplified signal is transmitted through the fourth optical transmission line 134 to the optical multiplexer/demultiplexer 141, whereby the signal is multiplexed with other signal to output an output signal from the output port 120. The fourth input signal is transmitted through the fourth optical multiplexer/demultiplexer 154 to the fourth optical amplifier 54, whereby the signal is amplified by the fourth optical amplifier 54. The amplified signal is then transmitted through the fourth optical isolator 94 to the first optical multiplexer/demultiplexer 151. Since the first optical multiplexer/demultiplexer 151 has a multiplexing function, the amplified signal is transmitted through the first optical transmission line 131 to the optical multiplexer/demultiplexer 141, whereby the signal is multiplexed with other signal to output an output signal from the output port 120.

The signal drop operation of the wavelength-multiplexed optical add-drop multiplexer will be described. The first input signal is transmitted from the first optical transmission line 131 through the first receiver side optical coupler 31 into the first optical receiver 71. The second input signal is transmitted from the second optical transmission line 132 through the second receiver side optical coupler 32 into the second optical receiver 72. The third input signal is transmitted from the third optical transmission line 133 through the third receiver side optical coupler 33 into the third optical receiver 73. The fourth input signal is transmitted from the fourth optical transmission line 134 through the fourth receiver side optical coupler 34 into the fourth optical receiver 74.

The signal add operation of the wavelength-multiplexed optical add-drop multiplexer will be described. The first optical amplifier 51 turns OFF, whereby the transmission of the first optical signal through the first optical transmission line 131 and the first optical multiplexer/demultiplexer 151 is discontinued by the first optical amplifier 51, whereby no signal is transmitted through the second optical multiplexer/demultiplexer 152 to the second optical transmission line 132. On the other hand, a first substitute signal is transmitted from the second optical transmitter 81 so that the first substitute signal is then transmitted through the second optical transmission line 132 to the optical multiplexer/demultiplexer 141, whereby the signal is multiplexed with other signal to output an output signal from the output port 120. The second optical amplifier 52 turns OFF, whereby the transmission of the second optical signal through the second optical transmission line 132 and the second optical multiplexer/demultiplexer 152 is discontinued by the second optical amplifier 52, whereby no signal is transmitted through the third optical multiplexer/demultiplexer 153 to the third optical transmission line 133. On the other hand, a second substitute signal is transmitted from the third optical transmitter 82 so that the second substitute signal is then transmitted through the third optical transmission line 133 to the optical multiplexer/demultiplexer 141, whereby the signal is multiplexed with other signal to output an output signal from the output port 120. The third optical amplifier 53 turns OFF, whereby the transmission of the third optical signal through the third optical transmission line 133 and the third optical multiplexer/demultiplexer 153 is discontinued by the third optical amplifier 53, whereby no signal is transmitted through the fourth optical multiplexer/demultiplexer 154 to the fourth optical transmission line 134. On the other hand, a third substitute signal is transmitted from the fourth optical transmitter 83 so that the third substitute signal is then transmitted through the fourth optical transmission line 134 to the optical multiplexer/demultiplexer 141, whereby the signal is multiplexed with other signal to output an output signal from the output port 120. The fourth optical amplifier 54 turns OFF, whereby the transmission of the fourth optical signal through the fourth optical transmission line 134 and the fourth optical multiplexer/demultiplexer 154 is discontinued by the fourth optical amplifier 54, whereby no signal is transmitted through the first optical multiplexer/demultiplexer 151 to the first optical transmission line 131. On the other hand, a fourth substitute signal is transmitted from the first optical transmitter 84 so that the fourth substitute signal is then transmitted through the first optical transmission line 131 to the optical multiplexer/demultiplexer 141, whereby the signal is multiplexed with other signal to output an output signal from the output port 120.

The use of the optical wavelength-multiplexer/demultiplexer to serve as the same function as the optical coupler reduces the optical power loss by not less than 5 dB as compared to the 1:1 optical coupler.

Fifteenth Embodiment

Figure 18:
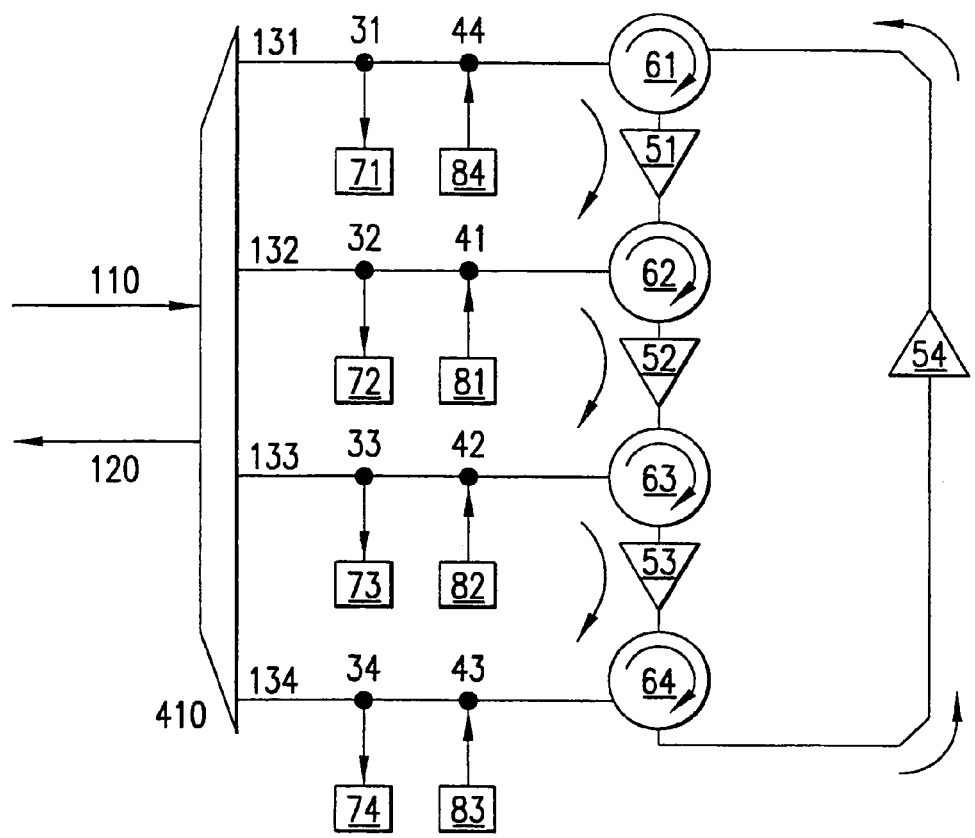
FIG. 18 is a diagram illustrative of a novel wavelength-multiplexed optical add-drop multiplexer having four looped optical transmission paths in a fifteenth embodiment in accordance with the present invention.

A fifteenth embodiment according to the present invention will be described in detail with reference to FIG. 18 which is a diagram illustrative of a novel wavelength-multiplexed optical add-drop multiplexer having four looped optical transmission paths.

The novel wavelength-multiplexed optical add-drop multiplexer comprises an optical multiplexer/demultiplexer 410 having an input port 110 and an output port 120, and first to fourth optical transmission lines 131, 132, 133 and 134 connected to the optical multiplexer/demultiplexer 410. The first optical transmission line 131 is provided for transmitting a signal having a wavelength of 1530 nanometers. The second optical transmission line 132 is provided for transmitting a signal having a wavelength of 1540 nanometers. The third optical transmission line 133 is provided for transmitting a signal having a wavelength of 1550 nanometers. The fourth optical transmission line is provided for transmitting a signal having a wavelength of 1560 nanometers.

The optical input signal having four wavelength composition of 1530 nanometers, 1540 nanometers, 1550 nanometers, and 1560 nanometers is transmitted from the optical transmission line 110 to the optical multiplexer/demultiplexer 410, so that the optical input signal is wavelength-demultiplexed by the optical multiplexer/demultiplexer 410 whereby the optical input signal is divided into a first signal having a wavelength of 1530 nanometers, a second signal having a wavelength of 1540 nanometers, a third signal having a wavelength of 1550 nanometers, and a fourth signal having a wavelength of 1560 nanometers. The first, second, third and fourth optical signals are inputted into the first, second, third and fourth optical transmission lines 131, 132, 133 and 134 respectively.

The first optical transmission line 131 has a first receiver side optical coupler 31 which is connected to a first optical receiver 71, and a first transmitter side optical coupler 44 which is connected to a first optical transmitter 84. The first optical transmission line 131 also has a first optical circulator 61.

The second optical transmission line 132 has a second receiver side optical coupler 32 which is connected to a second optical receiver 72, and a second transmitter side optical coupler 41 which is connected to a second optical transmitter 81. The second optical transmission line 132 also has a second optical circulator 62. The first optical circulator 61 is also connected through a first optical amplifier 51 to the second optical circulator 62. One of the wavelength-demultiplexed optical signals is transmitted from the first optical circulator 61 through the first optical amplifier 51 to the second optical circulator 62.

The third optical transmission line 133 has a third receiver side optical coupler 33 which is connected to a third optical receiver 73, and a third transmitter side optical coupler 42 which is connected to a third optical transmitter 82. The third optical transmission line 133 also has a third optical circulator 63. The second optical circulator 62 is also connected through a second optical amplifier 52 to the third optical circulator 63. One of the wavelength-demultiplexed optical signals is transmitted from the second optical circulator 62 through the second optical amplifier 52 to the third optical circulator 63.

The fourth optical transmission line 134 has a fourth receiver side optical coupler 34 which is connected to a fourth optical receiver 73, and a fourth transmitter side optical coupler 43 which is connected to a fourth optical transmitter 82. The fourth optical transmission line 134 also has a fourth optical circulator 64. The third optical circulator 63 is also connected through a third optical amplifier 52 to the fourth optical circulator 64. One of the wavelength-demultiplexed optical signals is transmitted from the third optical circulator 63 through the third optical amplifier 52 to the fourth optical circulator 64.

The fourth optical circulator 64 is also connected through a series connection of a fifth optical amplifier 54 and a fifth optical attenuator 94 to the first optical circulator 61.

The above wavelength-multiplexed optical add-drop multiplexer performs signal transmission operation, signal drop operation and signal add operation.

The signal transmission operation of the wavelength-multiplexed optical add-drop multiplexer will be described. The first input signal is transmitted through the first optical circulator 61 to the first optical amplifier 51, whereby the signal is amplified by the first optical amplifier 51. The amplified signal is then transmitted to the second optical circulator 62. The amplified signal is transmitted through the second optical transmission line 132 to the optical multiplexer/demultiplexer 141, whereby the signal is multiplexed with other signal to output an output signal from the output port 120. The second input signal is transmitted through the second optical circulator 62 to the second optical amplifier 52, whereby the signal is amplified by the second optical amplifier 52. The amplified signal is then transmitted to the third optical circulator 63. The amplified signal is transmitted through the third optical transmission line 133 to the optical multiplexer/demultiplexer 141, whereby the signal is multiplexed with other signal to output an output signal from the output port 120. The third input signal is transmitted through the third optical circulator 63 to the third optical amplifier 53, whereby the signal is amplified by the third optical amplifier 53. The amplified signal is then transmitted to the fourth optical circulator 64. The amplified signal is transmitted through the fourth optical transmission line 134 to the optical multiplexer/demultiplexer 141, whereby the signal is multiplexed with other signal to output an output signal from the output port 120. The fourth input signal is transmitted through the fourth optical circulator 64 to the fourth optical amplifier 54, whereby the signal is amplified by the fourth optical amplifier 54. The amplified signal is then transmitted to the first optical circulator 61. The amplified signal is transmitted through the first optical transmission line 131 to the optical multiplexer/demultiplexer 141, whereby the signal is multiplexed with other signal to output an output signal from the output port 120.

The signal drop operation of the wavelength-multiplexed optical add-drop multiplexer will be described. The first input signal is transmitted from the first optical transmission line 131 through the first receiver side optical coupler 31 into the first optical receiver 71. The second input signal is transmitted from the second optical transmission line 132 through the second receiver side optical coupler 32 into the second optical receiver 72. The third input signal is transmitted from the third optical transmission line 133 through the third receiver side optical coupler 33 into the third optical receiver 73. The fourth input signal is transmitted from the fourth optical transmission line 134 through the fourth receiver side optical coupler 34 into the fourth optical receiver 74.

The signal add operation of the wavelength-multiplexed optical add-drop multiplexer will be described. The first optical amplifier 51 turns OFF, whereby the transmission of the first optical signal through the first optical transmission line 131 and the first optical circulator 61 is discontinued by the first optical amplifier 51, whereby no signal is transmitted through the second optical circulator 62 to the second optical transmission line 132. On the other hand, a first substitute signal is transmitted from the second optical transmitter 81 so that the first substitute signal is then transmitted through the second optical transmission line 132 to the optical multiplexer/demultiplexer 141, whereby the signal is multiplexed with other signal to output an output signal from the output port 120. The second optical amplifier 52 turns OFF, whereby the transmission of the second optical signal through the second optical transmission line 132 and the second optical circulator 62 is discontinued by the second optical amplifier 52, whereby no signal is transmitted through the third optical circulator 63 to the third optical transmission line 133. On the other hand, a second substitute signal is transmitted from the third optical transmitter 82 so that the second substitute signal is then transmitted through the third optical transmission line 133 to the optical multiplexer/demultiplexer 141, whereby the signal is multiplexed with other signal to output an output signal from the output port 120. The third optical amplifier 53 turns OFF, whereby the transmission of the third optical signal through the third optical transmission line 133 and the third optical circulator 63 is discontinued by the third optical amplifier 53, whereby no signal is transmitted through the fourth optical circulator 64 to the fourth optical transmission line 134. On the other hand, a third substitute signal is transmitted from the fourth optical transmitter 83 so that the third substitute signal is then transmitted through the fourth optical transmission line 134 to the optical multiplexer/demultiplexer 141, whereby the signal is multiplexed with other signal to output an output signal from the output port 120. The fourth optical amplifier 54 turns OFF, whereby the transmission of the fourth optical signal through the fourth optical transmission line 134 and the fourth optical circulator 64 is discontinued by the fourth optical amplifier 54, whereby no signal is transmitted through the first optical circulator 61 to the first optical transmission line 131. On the other hand, a fourth substitute signal is transmitted from the first optical transmitter 84 so that the fourth substitute signal is then transmitted through the first optical transmission line 131 to the optical multiplexer/demultiplexer 141, whereby the signal is multiplexed with other signal to output an output signal from the output port 120.

The use of the optical isolator to serve as the same function as the optical coupler reduces the optical power loss by not less than 5 dB as compared to the 1:1 optical coupler.

Sixteenth Embodiment

A sixteenth embodiment according to the present invention will be described in detail with reference to FIG. 19 which is a diagram illustrative of a novel wavelength-multiplexed optical amplifier having four looped optical transmission paths.

The novel wavelength-multiplexed optical amplifier is structurally different from the above wavelength-multiplexed optical add-drop multiplexer of FIG. 16 in view of no provision of optical receivers and optical transmitters.

The novel wavelength-multiplexed optical amplifier comprises an optical multiplexer/demultiplexer 410 having an input port 110 and an output port 120, and first to fourth optical transmission lines 131, 132, 133 and 134 connected to the optical multiplexer/demultiplexer 410. The first optical transmission line 131 is provided for transmitting a signal having a wavelength of 1530 nanometers. The second optical transmission line 132 is provided for transmitting a signal having a wavelength of 1540 nanometers. The third optical transmission line 133 is provided for transmitting a signal having a wavelength of 1550 nanometers. The fourth optical transmission line is provided for transmitting a signal having a wavelength of 1560 nanometers.

The optical input signal having four wavelength composition of 1530 nanometers, 1540 nanometers, 1550 nanometers, and 1560 nanometers is transmitted from the optical transmission line 110 to the optical multiplexer/demultiplexer 410, so that the optical input signal is wavelength-demultiplexed by the optical multiplexer/demultiplexer 410 whereby the optical input signal is divided into a first signal having a wavelength of 1530 nanometers, a second signal having a wavelength of 1540 nanometers, a third signal having a wavelength of 1550 nanometers, and a fourth signal having a wavelength of 1560 nanometers. The first, second, third and fourth optical signals are inputted into the first, second, third and fourth optical transmission lines 131, 132, 133 and 134 respectively.

The first optical transmission line 131 has a first optical multiplexer/demultiplexer 151.

The first optical multiplexer/demultiplexer 151 performs a wavelength demultiplexing so as to divide the first optical input signal into two different wavelength optical signals having 1.55 micrometers and 1.54 micrometers which are outputted from two output ports. The first optical multiplexer/demultiplexer 151 is used in place of the optical coupler so that the wavelength different two optical signals has a total optical power which is higher than the first optical signal, thereby to solve a problem with remarkable optical power loss caused when the signal is transmitted through a plurality of optical couplers.

The second optical transmission line 132 has a second optical multiplexer/demultiplexer 152. The first optical multiplexer/demultiplexer 151 is also connected through a series connection of a first optical amplifier 55 and a first isolator 91 to the second optical multiplexer/demultiplexer 152. One of the wavelength-demultiplexed optical signals is transmitted from the first optical multiplexer/demultiplexer 151 through the first optical amplifier 55 and the first isolator 91 to the second optical multiplexer/demultiplexer 152.

The second optical multiplexer/demultiplexer 152 performs a wavelength demultiplexing so as to divide the first optical input signal into two different wavelength optical signals which are outputted from two output ports. The second optical multiplexer/demultiplexer 152 is used in place of the optical coupler so that the wavelength different two optical signals has a total optical power which is higher than the second optical signal, thereby to solve a problem with remarkable optical power loss caused when the signal is transmitted through a plurality of optical couplers.

The third optical transmission line 133 has a third optical multiplexer/demultiplexer 153. The second optical multiplexer/demultiplexer 152 is also connected through a series connection of a second optical amplifier 56 and a second isolator 92 to the third optical multiplexer/demultiplexer 153. One of the wavelength-demultiplexed optical signals is transmitted from the second optical multiplexer/demultiplexer 152 through the second optical amplifier 56 and the second isolator 92 to the third optical multiplexer/demultiplexer 153.

The third optical multiplexer/demultiplexer 153 performs a wavelength demultiplexing so as to divide the first optical input signal into two different wavelength optical signals which are outputted from two output ports. The third optical multiplexer/demultiplexer 153 is used in place of the optical coupler so that the wavelength different two optical signals has a total optical power which is higher than the third optical signal, thereby to solve a problem with remarkable optical power loss caused when the signal is transmitted through a plurality of optical couplers.

The fourth optical transmission line 134 has a fourth optical multiplexer/demultiplexer 154. The third optical multiplexer/demultiplexer 153 is also connected through a series connection of a third optical amplifier 56 and a third isolator 93 to the fourth optical multiplexer/demultiplexer 154. One of the wavelength-demultiplexed optical signals is transmitted from the third optical multiplexer/demultiplexer 153 through the third optical amplifier 56 and the third isolator 93 to the fourth optical multiplexer/demultiplexer 154.

The fourth optical multiplexer/demultiplexer 154 performs a wavelength demultiplexing so as to divide the first optical input signal into two different wavelength optical signals which are outputted from two output ports. The fourth optical multiplexer/demultiplexer 154 is used in place of the optical coupler so that the wavelength different two optical signals has a total optical power which is higher than the fourth optical signal, thereby to solve a problem with remarkable optical power loss caused when the signal is transmitted through a plurality of optical couplers.

The fourth optical multiplexer/demultiplexer 154 is also connected through a series connection of a fifth optical amplifier 58 and a fifth optical attenuator 94 to the first optical multiplexer/demultiplexer 151.

The above wavelength-multiplexed optical amplifier performs signal transmission operation.

The signal transmission operation of the wavelength-multiplexer optical amplifier will described. The first input signal is transmitted through the first optical multiplexer/demultiplexer 151 to the first optical amplifier 55, whereby the signal is amplified by the first optical amplifier 55. The amplified signal is then transmitted through the first optical isolator 91 to the second optical multiplexer/demultiplexer 152. Since the second optical multiplexer/demultiplexer 152 has a multiplexing function, the amplified signal is transmitted through the second optical transmission line 132 to the optical multiplexer/demultiplexer 141, whereby the signal is multiplexed with other signal to output an output signal from the output port 120. The second input signal is transmitted through the second optical multiplexer/demultiplexer 152 to the second optical amplifier 56, whereby the signal is amplified by the second optical amplifier 56. The amplified signal is then transmitted through the second optical isolator 92 to the third optical multiplexer/demultiplexer 153. Since the third optical multiplexer/demultiplexer 153 has a multiplexing function, the amplified signal is transmitted through the third optical transmission line 133 to the optical multiplexer/demultiplexer 141, whereby the signal is multiplexed with other signal to output an output signal from the output port 120. The third input signal is transmitted through the third optical multiplexer/demultiplexer 153 to the third optical amplifier 57, whereby the signal is amplified by the third optical amplifier 57. The amplified signal is then transmitted through the third optical isolator 93 to the fourth optical multiplexer/demultiplexer 154. Since the fourth optical multiplexer/demultiplexer 154 has a multiplexing function, the amplified signal is transmitted through the fourth optical transmission line 134 to the optical multiplexer/demultiplexer 141, whereby the signal is multiplexed with other signal to output an output signal from the output port 120. The fourth input signal is transmitted through the fourth optical multiplexer/demultiplexer 154 to the fourth optical amplifier 58, whereby the signal is amplified by the fourth optical amplifier 58. The amplified signal is then transmitted through the fourth optical isolator 94 to the first optical multiplexer/demultiplexer 151. Since the first optical multiplexer/demultiplexer 151 has a multiplexing function, the amplified signal is transmitted through the first optical transmission line 131 to the optical multiplexer/demultiplexer 141, whereby the signal is multiplexed with other signal to output an output signal from the output port 120.

The use of the optical wavelength-multiplexer/demultiplexer to serve as the same function as the optical coupler reduces the optical power loss by not less than 5 dB as compared to the 1:1 optical coupler.

Seventeenth Embodiment

Figure 20:
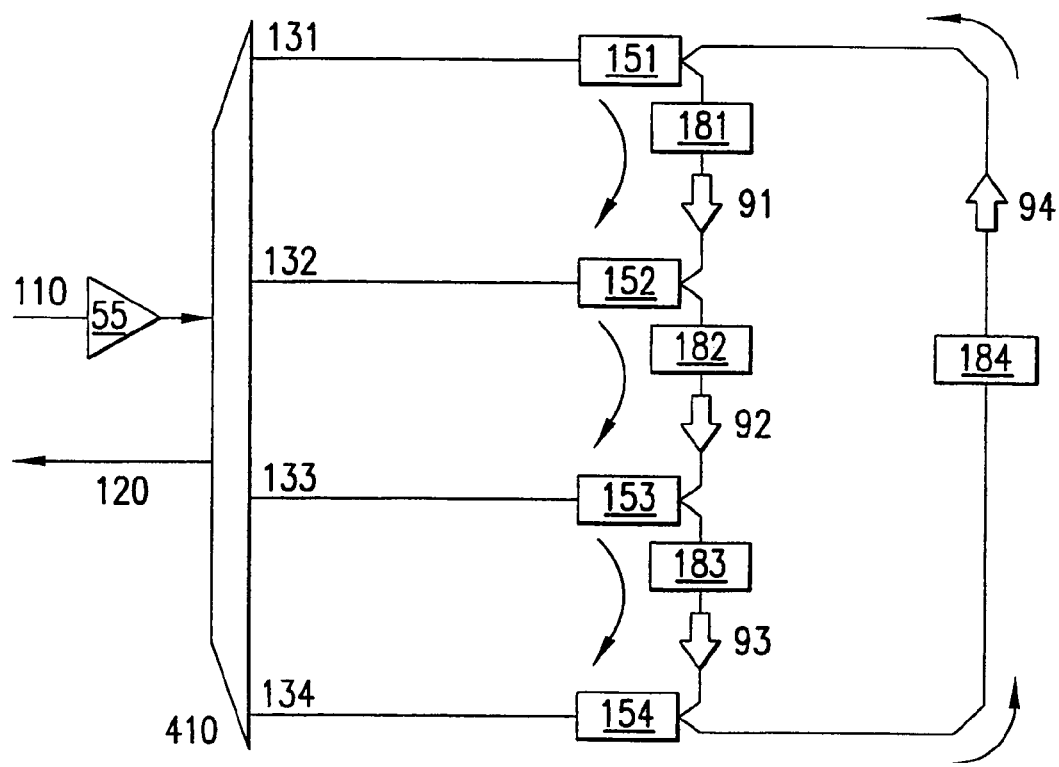
FIG. 20 is a diagram illustrative of a novel wavelength-multiplexed optical add-drop multiplexer having four looped optical transmission paths in a seventeenth embodiment in accordance with the present invention.

A seventeenth embodiment according to the present invention will be described in detail with reference to FIG. 20 which is a diagram illustrative of a novel wavelength-multiplexed optical equalizer having four looped optical transmission paths.

Figure 19:
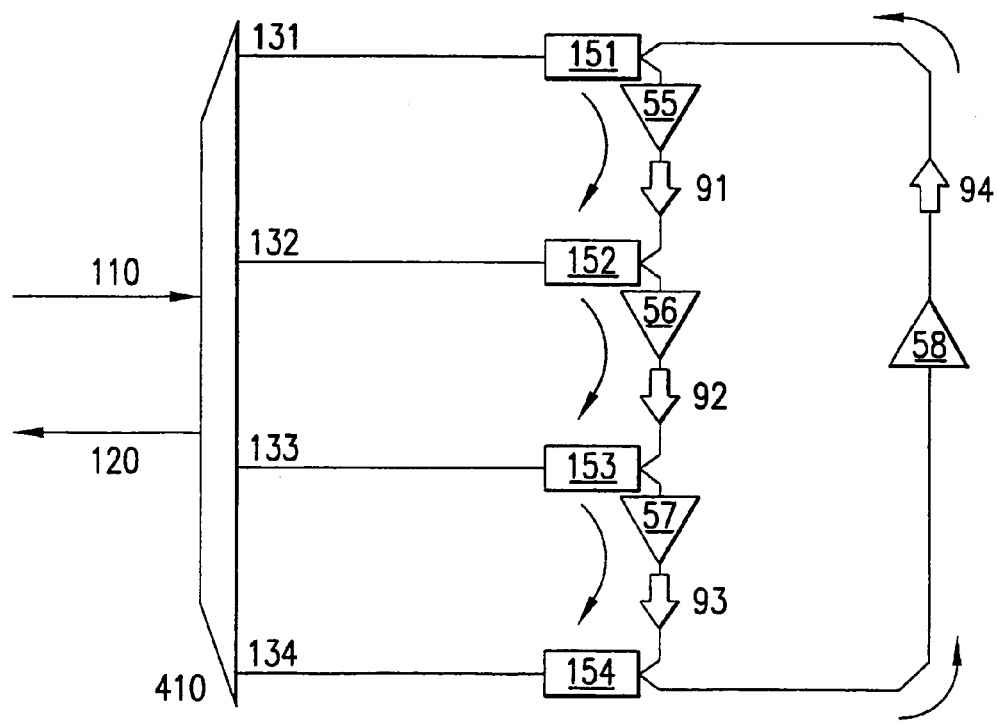
FIG. 19 is a diagram illustrative of a novel wavelength-multiplexed optical amplifier having four looped optical transmission paths in a sixteenth embodiment in accordance with the present invention.

The novel wavelength-multiplexed optical equalizer is structurally different from the above wavelength-multiplexed optical amplifier of FIG. 19 in view of further provision of an optical amplifier 55 on an input port and replacing optical amplifiers by attenuators 181, 182, 183 and 184.

The novel wavelength-multiplexed optical equalizer comprises an optical multiplexer/demultiplexer 410 having an input port 110 and an output port 120, and first to fourth optical transmission lines 131, 132, 133 and 134 connected to the optical multiplexer/demultiplexer 410. The first optical transmission line 131 is provided for transmitting a signal having a wavelength of 1530 nanometers. The second optical transmission line 132 is provided for transmitting a signal having a wavelength of 1540 nanometers. The third optical transmission line 133 is provided for transmitting a signal having a wavelength of 1550 nanometers. The fourth optical transmission line is provided for transmitting a signal having a wavelength of 1560 nanometers.

The optical input signal having four wavelength compositions of 1530 nanometers, 1540 nanometers, 1550 nanometers, and 1560 nanometers is transmitted from the optical transmission line 110 to the optical multiplexer/demultiplexer 410, so that the optical input signal is wavelength-demultiplexed by the optical multiplexer/demultiplexer 410 whereby the optical input signal is divided into a first signal having a wavelength of 1530 nanometers, a second signal having a wavelength of 1540 nanometers, a third signal having a wavelength of 1550 nanometers, and a fourth signal having a wavelength of 1560 nanometers. The first, second, third and fourth optical signals are inputted into the first, second, third and fourth optical transmission lines 131, 132, 133 and 134 respectively.

The first optical transmission line 131 has a first optical multiplexer/demultiplexer 151.

The first optical multiplexer/demultiplexer 151 performs a wavelength demultiplexing so as to divide the first optical input signal into two different wavelength optical signals having 1.55 micrometers and 1.54 micrometers which are outputted from two output ports. The first optical multiplexer/demultiplexer 151 is used in place of the optical coupler so that the wavelength different two optical signals has a total optical power which is higher than the first optical signal, thereby to solve a problem with remarkable optical power loss caused when the signal is transmitted through a plurality of optical couplers.

The second optical transmission line 132 has a second optical multiplexer/demultiplexer 152. The first optical multiplexer/demultiplexer 151 is also connected through a series connection of a first optical attenuator 181 and a first isolator 91 to the second optical multiplexer/demultiplexer 152. One of the wavelength-demultiplexed optical signals is transmitted from the first optical multiplexer/demultiplexer 151 through the first optical attenuator 181 and the first isolator 91 to the second optical multiplexer/demultiplexer 152.

The second optical multiplexer/demultiplexer 152 performs a wavelength demultiplexing so as to divide the first optical input signal into two different wavelength optical signals which are outputted from two output ports. The second optical multiplexer/demultiplexer 152 is used in place of the optical coupler so that the wavelength different two optical signals has a total optical power which is higher than the second optical signal, thereby to solve a problem with remarkable optical power loss caused when the signal is transmitted through a plurality of optical couplers.

The third optical transmission line 133 has a third optical multiplexer/demultiplexer 153. The second optical multiplexer/demultiplexer 152 is also connected through a series connection of a second optical attenuator 182 and a second isolator 92 to the third optical multiplexer/demultiplexer 153. One of the wavelength-demultiplexed optical signals is transmitted from the second optical multiplexer/demultiplexer 152 through the second optical attenuator 182 and the second isolator 92 to the third optical multiplexer/demultiplexer 153.

The third optical multiplexer/demultiplexer 153 performs a wavelength demultiplexing so as to divide the first optical input signal into two different wavelength optical signals which are outputted from two output ports. The third optical multiplexer/demultiplexer 153 is used in place of the optical coupler so that the wavelength different two optical signals has a total optical power which is higher than the third optical signal, thereby to solve a problem with remarkable optical power loss caused when the signal is transmitted through a plurality of optical couplers.

The fourth optical transmission line 134 has a fourth optical multiplexer/demultiplexer 154. The third optical multiplexer/demultiplexer 153 is also connected through a series connection of a third optical attenuator 182 and a third isolator 93 to the fourth optical multiplexer/demultiplexer 154. One of the wavelength-demultiplexed optical signals is transmitted from the third optical multiplexer/demultiplexer 153 through the third optical attenuator 182 and the third isolator 93 to the fourth optical multiplexer/demultiplexer 154.

The fourth optical multiplexer/demultiplexer 154 performs a wavelength demultiplexing so as to divide the first optical input signal into two different wavelength optical signals which are outputted from two output ports. The fourth optical multiplexer/demultiplexer 154 is used in place of the optical coupler so that the wavelength different two optical signals has a total optical power which is higher than the fourth optical signal, thereby to solve a problem with remarkable optical power loss caused when the signal is transmitted through a plurality of optical couplers.

The fourth optical multiplexer/demultiplexer 154 is also connected through a series connection of a fifth optical attenuator 184 and a fifth optical attenuator 94 to the first optical multiplexer/demultiplexer 151.

The above wavelength-multiplexed optical equalizer performs signal transmission operation.

The signal transmission operation of the wavelength-multiplexed optical equalizer will be described. The first input signal is transmitted through the first optical multiplexer/demultiplexer 151 to the first optical attenuator 181, whereby the signal is attenuated by the first optical attenuator 181. The attenuated signal is then transmitted through the first optical isolator 91 to the second optical multiplexer/demultiplexer 152. Since the second optical multiplexer/demultiplexer 152 has a multiplexing function, the attenuated signal is transmitted through the second optical transmission line 132 to the optical multiplexer/demultiplexer 141, whereby the signal is multiplexed with other signal to output an output signal from the output port 120. The second input signal is transmitted through the second optical multiplexer/demultiplexer 152 to the second optical attenuator 182, whereby the signal is attenuated by the second optical attenuator 182. The attenuated signal is then transmitted through the second optical isolator 92 to the third optical multiplexer/demultiplexer 153. Since the third optical multiplexer/demultiplexer 153 has a multiplexing function, the attenuated signal is transmitted through the third optical transmission line 133 to the optical multiplexer/demultiplexer 141, whereby the signal is multiplexed with other signal to output an output signal from the output port 120. The third input signal is transmitted through the third optical multiplexer/demultiplexer 153 to the third optical attenuator 183, whereby the signal is attenuated by the third optical attenuator 183. The attenuated signal is then transmitted through the third optical isolator 93 to the fourth optical multiplexer/demultiplexer 154. Since the fourth optical multiplexer/demultiplexer 154 has a multiplexing function, the attenuated signal is transmitted through the fourth optical transmission line 134 to the optical multiplexer/demultiplexer 141, whereby the signal is multiplexed with other signal to output an output signal from the output port 120. The fourth input signal is transmitted through the fourth optical multiplexer/demultiplexer 154 to the fourth optical attenuator 184, whereby the signal is attenuated by the fourth optical attenuator 184. The attenuated signal is then transmitted through the fourth optical isolator 94 to the first optical multiplexer/demultiplexer 151. Since the first optical multiplexer/demultiplexer 151 has a multiplexing function, the attenuated signal is transmitted through the first optical transmission line 131 to the optical multiplexer/demultiplexer 141, whereby the signal is multiplexed with other signal to output an output signal from the output port 120.

The use of the optical wavelength-multiplexer/demultiplexer to serve as the same function as the optical coupler reduces the optical power loss by not less than 5 dB as compared to the 1:1 optical coupler.

Eighteenth Embodiment

An eighteenth embodiment according to the present invention will be described in detail with reference to FIG. 21 which is a diagram illustrative of a novel optical gate switch utilizing optical wavelength multiplexer/demultiplexer and an erbium doped fiber.

An optical transmission line 121 is provided for transmitting an optical signal having a wavelength of 1550 nanometers. The optical transmission line 121 has first and second optical wavelength multiplexer/demultiplexers 155 and 156, and an erbium doped fiber 141 between the first and second optical wavelength multiplexer/demultiplexers 155 and 156. An excitation light source 161 is provided for emitting an excitation light having a wavelength of 1480 nanometers. The excitation light source 161 is connected through a first subordinate optical transmission line 122 to the first wavelength multiplexer/demultiplexer 155. A second subordinate optical transmission line 123 extends from the second optical wavelength multiplexer/demultiplexer 156. The excitation light is emitted from the excitation light source 161 and then transmitted through the first subordinate optical transmission line 122 to the first wavelength multiplexer/demultiplexer 155. The excitation light is multiplexed with the optical signal by the first wavelength multiplexer/demultiplexer 155 and further fed to the erbium doped fiber 141 to excite the erbium doped fiber 141, whereby the optical signal transmitted on the optical transmission line 121 is amplified by the erbium doped fiber 141 and then amplified signal is transmitted to the second wavelength multiplexer/demultiplexer 156. The excitation of the erbium doped fiber 141 is caused by absorption of the 1480 nanometers wavelength composition of the multiplexed signal into the erbium doped fiber 141. The 1480 nanometers wavelength composition of the multiplexed signal may partially be unabsorbed into the erbium doped fiber 141. The multiplexed signal is then transmitted to the second wavelength multiplexer/demultiplexer 156 so that the remaining 1480 nanometers wavelength composition is demultiplexed from the 1550 nanometers wavelength composition by the second wavelength multiplexer/demultiplexer 156, whereby the remaining 1480 nanometers wavelength composition is transmitted through the second subordinate optical transmission line 123 whilst the 1550 nanometers wavelength composition is then transmitted through the optical transmission line 121.

The excitation light has a large intensity for causing an excitation of the erbium doped fiber 141. A majority part of the excitation light is absorbed into the erbium doped fiber 141 for excitation of the erbium doped fiber 141, whilst a minority part of the excitation light is not absorbed into the erbium doped fiber 141 and then transmitted through the erbium doped fiber 141. This transmitted excitation light remains to have the large intensity. Actually, this remaining excitation light is multiplexed with the optical signal. However, the second wavelength multiplexer/demultiplexer 156 is operated for demultiplexing the signal into the optical signal having the wavelength of 1550 nanometers and the remaining excitation light having the wavelength of 1480 nanometers, whereby the second wavelength multiplexer/demultiplexer 156 sends the optical signal having the wavelength of 1550 nanometers on the optical transmission line 121 and also sends the remaining excitation light having the wavelength of 1480 nanometers on the second subordinate optical transmission line 123 to avoid the transmission of the remaining excitation light on the optical transmission line 121. The optical transmission line 121 may be connected to an optical multiplexer/demultiplexer. However, the optical multiplexer/demultiplexer receives no excitation light, whereby the optical multiplexer/demultiplexer is free from any damage by the excitation light. If the optical transmission line 121 is connected to other optical device, then the optical device receives no excitation light, whereby the optical device is free from any damage by the excitation light.

Nineteenth Embodiment

A nineteenth embodiment according to the present invention will be described in detail with reference to FIG. 22 which is a diagram illustrative of a novel optical gate switch utilizing optical wavelength multiplexer/demultiplexer and an erbium doped fiber.

An optical transmission line 121 is provided for transmitting an optical signal having a wavelength of 1550 nanometers. The optical transmission line 121 has first and second optical wavelength multiplexer/demultiplexers 157 and 158, and an erbium doped fiber 141 between the first and second optical wavelength multiplexer/demultiplexers 157 and 158. An excitation light source 163 is provided for emitting an excitation light having a wavelength of 1480 nanometers. The excitation light source 163 is connected through a first subordinate optical transmission line 122 to the first wavelength multiplexer/demultiplexer 157. A second subordinate optical transmission line 123 extends from the second optical wavelength multiplexer/demultiplexer 158. The second subordinate optical transmission line 123 has an optical reflective mirror 25 and a monitor 200. The optical reflecting mirror may comprise a wavelength band selective optical reflecting mirror which is capable of selecting a wavelength band of a light to be reflected. The excitation light is emitted from the excitation light source 163 and then transmitted through the first subordinate optical transmission line 122 to the first wavelength multiplexer/demultiplexer 157. The excitation light is multiplexed with the optical signal by the first wavelength multiplexer/demultiplexer 157 and further fed to the erbium doped fiber 141 to excite the erbium doped fiber 141, whereby the optical signal transmitted on the optical transmission line 121 is amplified by the erbium doped fiber 141 and then amplified signal is transmitted to the second wavelength multiplexer/demultiplexer 158. The excitation of the erbium doped fiber 141 is caused by absorption of the 1480 nanometers wavelength composition of the multiplexed signal into the erbium doped fiber 141. The 1480 nanometers wavelength composition of the multiplexed signal may partially be unabsorbed into the erbium doped fiber 141. The multiplexed signal is then transmitted to the second wavelength multiplexer/demultiplexer 158 so that the remaining 1480 nanometers wavelength composition is demultiplexed from the 1550 nanometers wavelength composition by the second wavelength multiplexer/demultiplexer 158, whereby the remaining 1480 nanometers wavelength composition is transmitted through the second subordinate optical transmission line 123 whilst the 1550 nanometers wavelength composition is then transmitted through the optical transmission line 121. The remaining 1480 nanometers wavelength composition corresponds to a transmitted minority part of the excitation light having a large intensity, for which reason the transmitted minority part of the excitation light having a large intensity is transmitted through the second subordinate optical transmission line to the wavelength-band optical reflecting mirror 25. The transmitted minority part of the excitation light is thus reflected by the wavelength-band optical reflecting mirror 25 and then transmitted through the second wavelength multiplexer/demultiplexer 158 to the erbium doped fiber 141 again whereby the transmitted minority part of the excitation light is further used to excite the erbium doped fiber 141. As a result, the efficiency of the excitation of the erbium doped fiber 141 is high.

The excitation light has a large intensity for causing an excitation of the erbium doped fiber 141. A majority part of the excitation light is absorbed into the erbium doped fiber 141 for excitation of the erbium doped fiber 141, whilst a minority part of the excitation light is not absorbed into the erbium doped fiber 141 and then transmitted through the erbium doped fiber 141. This transmitted excitation light remains to have the large intensity. Actually, this remaining excitation light is multiplexed with the optical signal. However, the second wavelength multiplexer/demultiplexer 158 is operated for demultiplexing the signal into the optical signal having the wavelength of 1550 nanometers and the remaining excitation light having the wavelength of 1480 nanometers, whereby the second wavelength multiplexer/demultiplexer 158 sends the optical signal having the wavelength of 1550 nanometers on the optical transmission line 121 and also sends the remaining excitation light having the wavelength of 1480 nanometers on the second subordinate optical transmission line 123 to avoid the transmission of the remaining excitation light on the optical transmission line 121. The optical transmission line 121 may be connected to an optical multiplexer/demultiplexer. However, the optical multiplexer/demultiplexer receives no excitation light, whereby the optical multiplexer/demultiplexer is free from any damage by the excitation light. If the optical transmission line 121 is connected to other optical device, then the optical device receives no excitation light, whereby the optical device is free from any damage by the excitation light.

Further, a slight amount of the optical signal is transmitted through the second wavelength multiplexer/demultiplexer 158 to the second subordinate optical transmission line 123. Since the wavelength-band optical reflecting mirror 25 sets the reflecting wavelength band at 1448 nanometers for reflecting the excitation light component, then the slight amount of the optical signal having the wavelength of 1550 nanometers is transmitted through the wavelength-band optical reflecting mirror 25 to the monitor 200. The monitor 200 monitors the intensity of the leaked optical signal for controlling optical power levels and device damage monitoring.

Twentieth Embodiment

Figure 23:
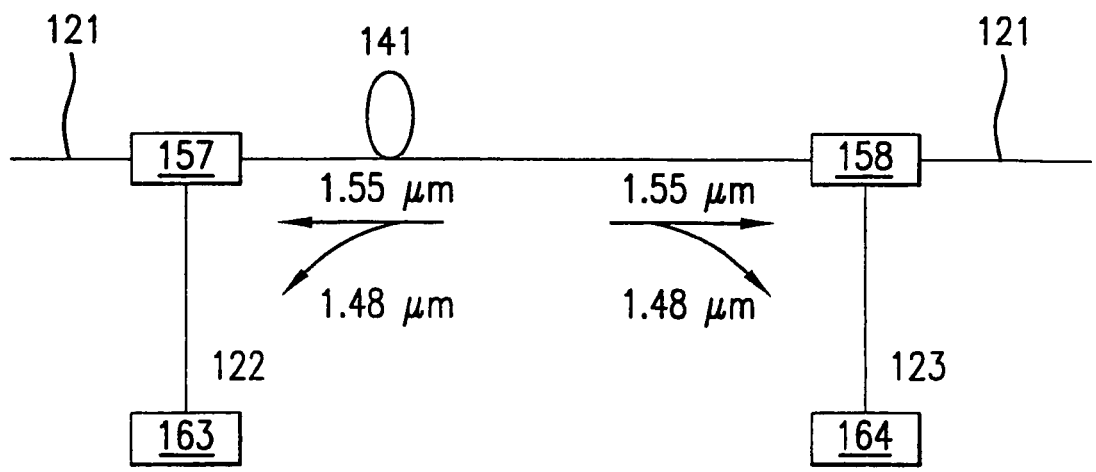
FIG. 23 is a diagram illustrative of a novel optical gate switch utilizing optical wavelength multiplexer/demultiplexer and an erbium doped fiber in an twenty embodiment in accordance with the present invention.

A twentieth embodiment according to the present invention will be described in detail with reference to FIG. 23 which is a diagram illustrative of a novel optical gate switch utilizing optical wavelength multiplexer/demultiplexer and an erbium doped fiber.

An optical transmission line 121 is provided for transmitting an optical signal having a wavelength of 1550 nanometers. The optical transmission line 121 has first and second optical wavelength multiplexer/demultiplexers 157 and 158, and an erbium doped fiber 141 between the first and second optical wavelength multiplexer/demultiplexers 157 and 158. A first excitation light source 163 is provided for emitting a first excitation light having a wavelength of 1480 nanometers. The first excitation light source 163 is connected through a first subordinate optical transmission line 122 to the first wavelength multiplexer/demultiplexer 157. A second excitation light source 164 is provided for emitting a second excitation light having a wavelength of 1480 nanometers. The second excitation light source 164 is connected through a second subordinate optical transmission line 123 to the second wavelength multiplexer/demultiplexer 158. The first excitation light is emitted from the excitation light source 163 and then transmitted through the first subordinate optical transmission line 122 to the first wavelength multiplexer/demultiplexer 157. The first excitation light is multiplexed with the optical signal by the first wavelength multiplexer/demultiplexer 157 and further fed to the erbium doped fiber 141 to excite the erbium doped fiber 141, whereby the optical signal transmitted on the optical transmission line 121 is amplified by the erbium doped fiber 141 and then amplified signal is transmitted to the second wavelength multiplexer/demultiplexer 158. The second excitation light is emitted from the excitation light source 164 and then transmitted through the second subordinate optical transmission line 123 to the second wavelength multiplexer/demultiplexer 158. The second excitation light is multiplexed with the optical signal by the first wavelength multiplexer/demultiplexer 158 and further fed to the erbium doped fiber 141 to excite the erbium doped fiber 141, whereby the optical signal transmitted on the optical transmission line 121 is amplified by the erbium doped fiber 141 and then amplified signal is transmitted to the second wavelength multiplexer/demultiplexer 158.

The first excitation light has a large intensity for causing an excitation of the erbium doped fiber 141. A majority part of the first excitation light is absorbed into the erbium doped fiber 141 for excitation of the erbium doped fiber 141, whilst a minority part of the first excitation light is not absorbed into the erbium doped fiber 141 and then transmitted through the erbium doped fiber 141. This transmitted first excitation light remains to have the large intensity. Actually, this remaining first excitation light is multiplexed with the optical signal. However, the second wavelength multiplexer/demultiplexer 158 is operated for demultiplexing the signal into the optical signal having the wavelength of 1550 nanometers and the remaining first excitation light having the wavelength of 1480 nanometers, whereby the second wavelength multiplexer/demultiplexer 158 sends the optical signal having the wavelength of 1550 nanometers on the optical transmission line 121 and also sends the remaining first excitation light having the wavelength of 1480 nanometers on the second subordinate optical transmission line 123 to avoid the transmission of the remaining first excitation light on the optical transmission line 121. The optical transmission line 121 may be connected to an optical multiplexer/demultiplexer. However, the optical multiplexer/demultiplexer receives no first excitation light, whereby the optical multiplexer/demultiplexer is free from any damage by the first excitation light. If the optical transmission line 121 is connected to other optical device, then the optical device receives no first excitation light, whereby the optical device is free from any damage by the first excitation light.

The second excitation light has a large intensity for causing an excitation of the erbium doped fiber 141. A majority part of the second excitation light is absorbed into the erbium doped fiber 141 for excitation of the erbium doped fiber 141, whilst a minority part of the second excitation light is not absorbed into the erbium doped fiber 141 and then transmitted through the erbium doped fiber 141. This transmitted second excitation light remains to have the large intensity. Actually, this remaining second excitation light is multiplexed with the optical signal. However, the first wavelength multiplexer/demultiplexer 157 is operated for demultiplexing the signal into the optical signal having the wavelength of 1550 nanometers and the remaining second excitation light having the wavelength of 1480 nanometers, whereby the first wavelength multiplexer/demultiplexer 157 sends the optical signal having the wavelength of 1550 nanometers on the optical transmission line 121 and also sends the remaining second excitation light having the wavelength of 1480 nanometers on the second subordinate optical transmission line 123 to avoid the transmission of the remaining second excitation light on the optical transmission line 121. The optical transmission line 121 may be connected to an optical multiplexer/demultiplexer.

However, the optical multiplexer/demultiplexer receives no second excitation light, whereby the optical multiplexer/demultiplexer is free from any damage by the second excitation light. If the optical transmission line 121 is connected to other optical device, then the optical device receives no second excitation light, whereby the optical device is free from any damage by the second excitation light.

The use of the first and second excitation light sources reduces the required intensity of the individual excitation light.

Twenty First Embodiment

Figure 21:
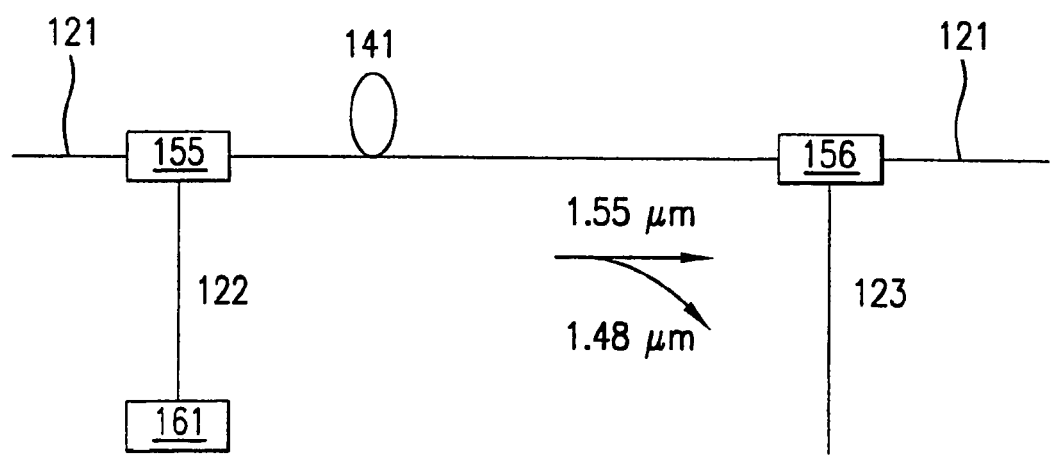
FIG. 21 is a diagram illustrative of a novel optical gate switch utilizing optical wavelength multiplexer/demultiplexer and an erbium doped fiber in an eighteenth embodiment in accordance with the present invention.
Figure 22:
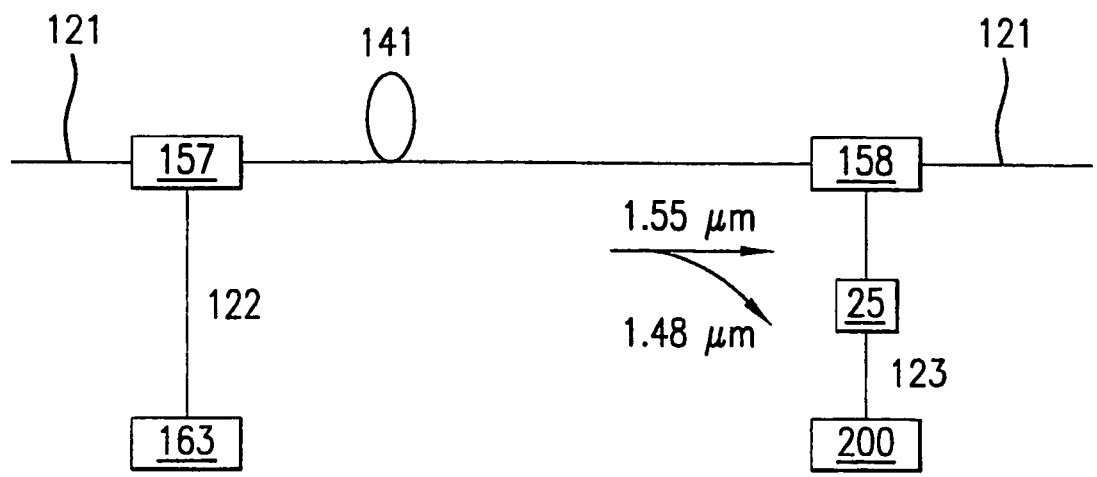
FIG. 22 is a diagram illustrative of a novel optical gate switch utilizing optical wavelength multiplexer/demultiplexer and an erbium doped fiber in an nineteenth embodiment in accordance with the present invention.
Figure 24:
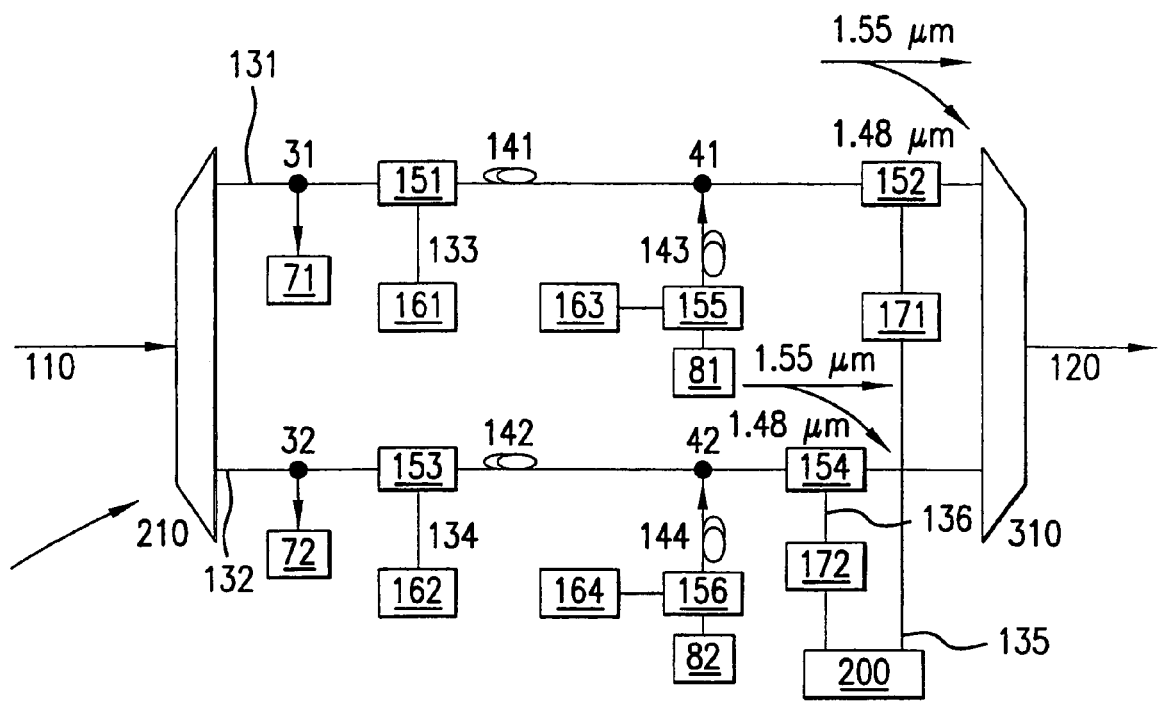
FIG. 24 is a novel wavelength-multiplexed optical add-drop multiplexer/demultiplexers in place of optical couplers and further utilizing erbium doped fibers in a twenty first embodiment in accordance with the present invention.

A twenty first embodiment according to the present invention will be described in detail with reference to FIG. 24 which is a novel wavelength-multiplexed optical add-drop multiplexer including the above optical multiplexer/demultiplexers utilizing the above novel optical gate switches having the same structure as illustrated in FIG. 22, wherein band-pass filters 171 and 172 are used in place of wavelength band selective optical reflecting mirror 25 of FIG. 22 as well as utilizing the above novel optical gate switches having the same structure as illustrated in FIG. 21.

Twenty Second Embodiment

Figure 25:
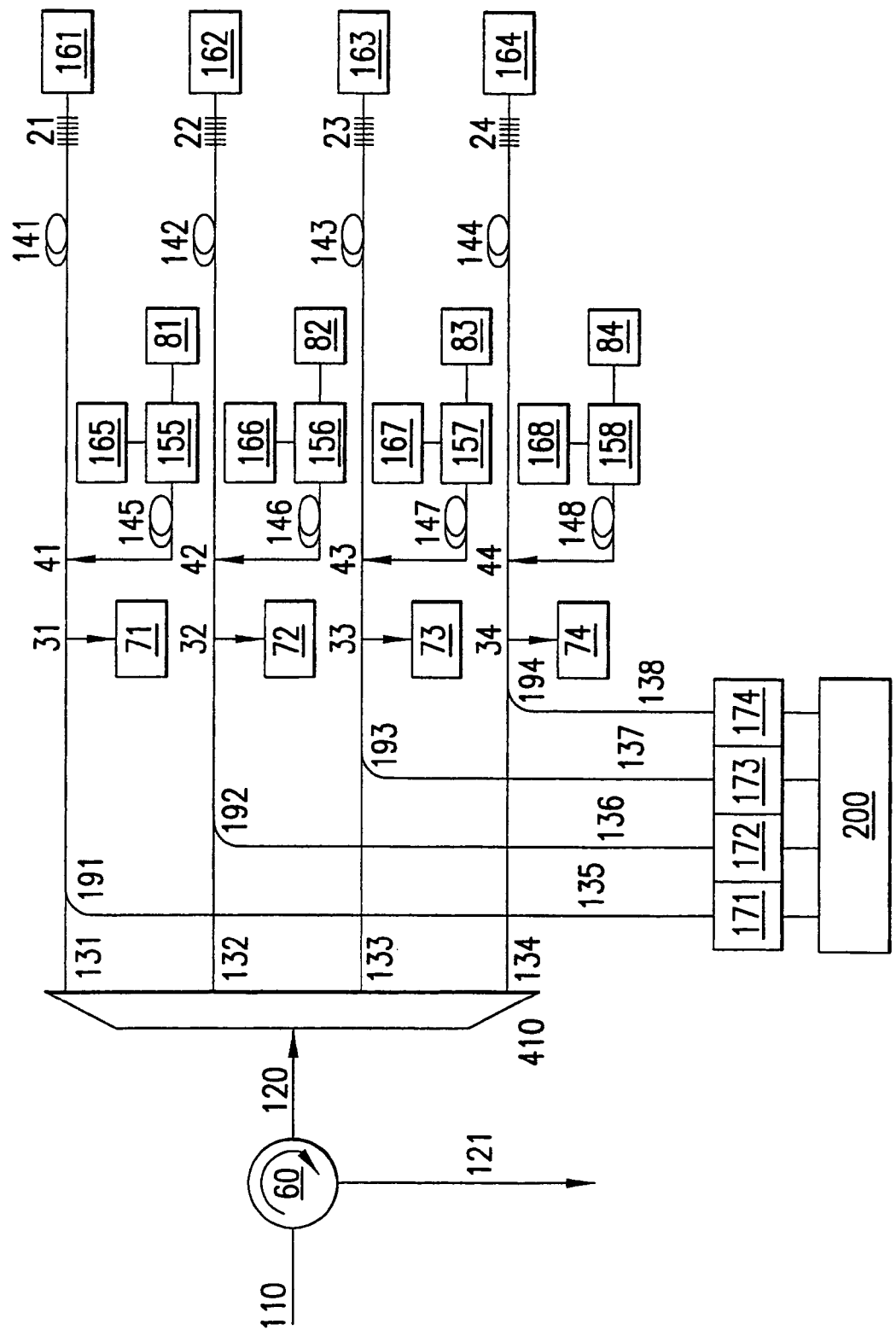
FIG. 25 is a novel wavelength-multiplexed optical add-drop multiplexer which is modified from the above novel wavelength-multiplexed optical add-drop multiplexer of FIG. 15 by utilizing optical multiplexer/demultiplexers in place of optical couplers and further utilizing erbium doped fibers in a twenty second embodiment in accordance with the present invention.

A twenty second embodiment according to the present invention will be described in detail with reference to FIG. 25 which is a novel wavelength-multiplexed optical add-drop multiplexer which is modified from the above novel wavelength-multiplexed optical add-drop multiplexer of FIG. 15 by utilizing the above novel optical gate switches having the same structure as illustrated in FIG. 21.

Twenty Fourth Embodiment

Figure 26:
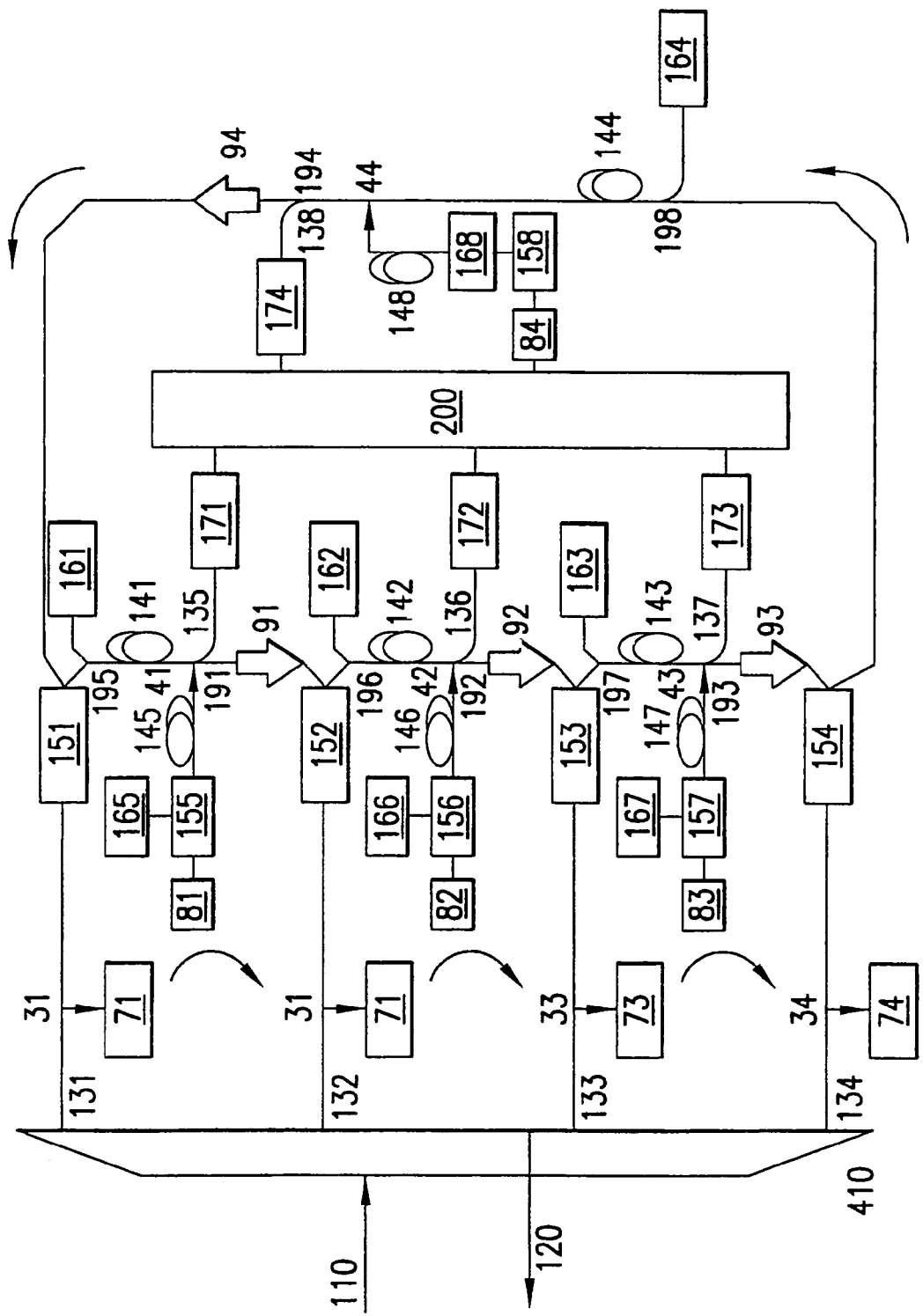
FIG. 26 is a novel wavelength-multiplexed optical add-drop multiplexer which is modified from the above novel wavelength-multiplexed optical add-drop multiplexer of FIG. 16 by utilizing optical multiplexer/demultiplexers in place of optical couplers and further utilizing erbium doped fibers in a twenty third embodiment in accordance with the present invention.

A twenty fourth embodiment according to the present invention will be described in detail with reference to FIG. 26 which is a novel wavelength-multiplexed optical add-drop multiplexer which is modified from the above novel wavelength-multiplexed optical add-drop multiplexer of FIG. 16 by utilizing the above novel optical gate switches having the same structure as illustrated in FIG. 22, wherein band-pass filters 171 and 172 are used in place of wavelength band selective optical reflecting mirror 25 of FIG. 22 as well as utilizing the above novel optical gate switches having the same structure as illustrated in FIG. 21.

Twenty Fourth Embodiment

Figure 27:
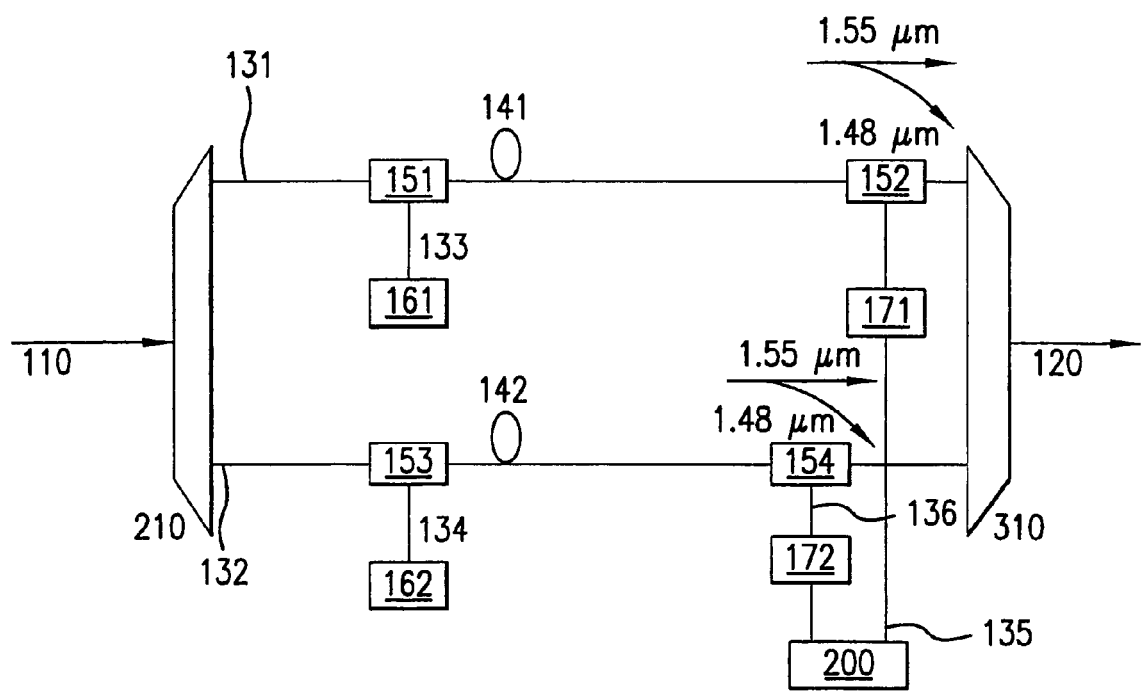
FIG. 27 is a novel wavelength-multiplexed optical add-drop multiplexer utilizing optical multiplexer/demultiplexers in place of optical couplers and further utilizing erbium doped fibers in a twenty fourth embodiment in accordance with the present invention.

A twenty fourth embodiment according to the present invention will be described in detail with reference to FIG. 27 which is a novel wavelength-multiplexed optical add-drop multiplexer utilizing the above novel optical gate switches having the same structure as illustrated in FIG. 22, wherein band-pass filters 171 and 172 are used in place of wavelength band selective optical reflecting mirror 25 of FIG. 22.

Twenty Fifth Embodiment

Figure 28:
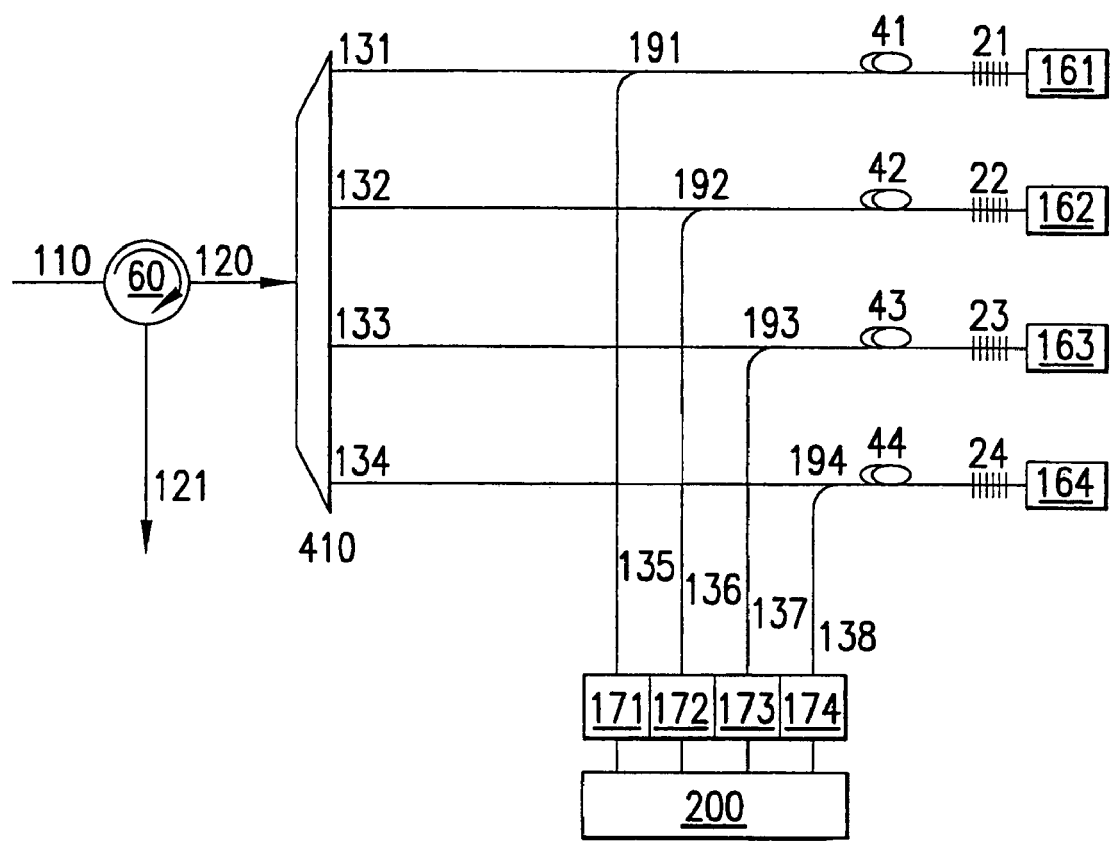
FIG. 28 is a novel wavelength-multiplexed optical add-drop multiplexer which is modified from the above novel wavelength-multiplexed optical add-drop multiplexer of FIG. 15 by utilizing optical multiplexer/demultiplexers in place of optical couplers and further utilizing erbium doped fibers in a twenty fifth embodiment in accordance with the present invention.

A twenty fifth embodiment according to the present invention will be described in detail with reference to FIG. 28 which is a novel wavelength-multiplexed optical add-drop multiplexer which is modified from the above novel wavelength-multiplexed optical add-drop multiplexer of FIG. 15 by eliminating optical transmitters and replacing optical receivers by a combination of band pass filters 171, 172, 173 and 174 with a monitor 200.

Twenty Sixth Embodiment

Figure 29:
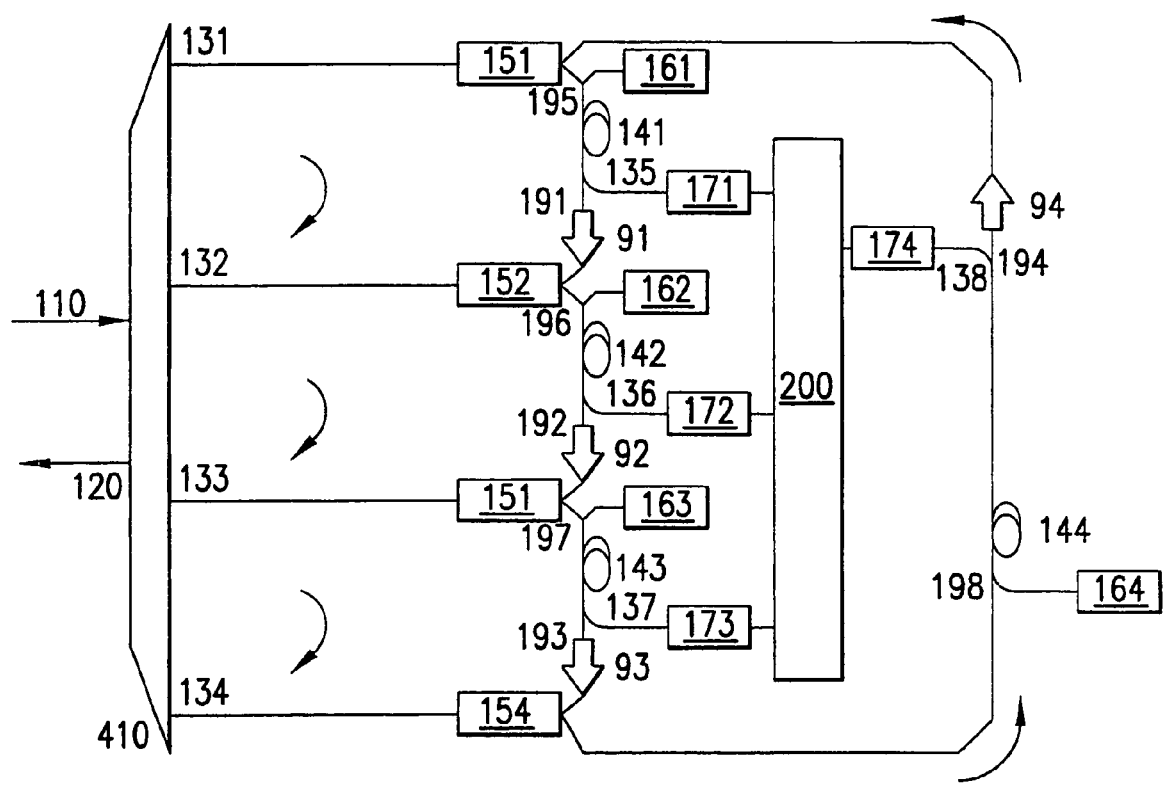
FIG. 29 is a novel wavelength-multiplexed optical add-drop multiplexer which is modified from the above novel wavelength-multiplexed optical add-drop multiplexer of FIG. 16 by utilizing optical multiplexer/demultiplexers in place of optical couplers and further utilizing erbium doped fibers in a twenty sixth embodiment in accordance with the present invention.

A twenty sixth embodiment according to the present invention will be described in detail with reference to FIG. 29 which is a novel wavelength-multiplexed optical add-drop multiplexer which is modified from the above novel wavelength-multiplexed optical add-drop multiplexer of FIG. 19 by replacing optical amplifiers with the above novel optical gate switches having the same structure as illustrated in FIG. 22, wherein band-pass filters 171 and 172 are used in place of wavelength band selective optical reflecting mirror 25 of FIG. 22.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An optical loop-structured circuit having at least a plurality of looped optical transmission lines having at least a plurality of optical transmission line junctions from which at least three optical transmission lines extend, wherein at least one of said plurality of optical transmission line junctions has an optical device configured for performing at least a wavelength demultiplexing function, which is connected to said at least three optical transmission lines, so that said optical device serves as a same role as an optical coupler so as to reduce an optical power loss as compared to a 1:1 optical coupler when an optical signal is transmitted through one said optical transmission line junction, wherein at least two of said plurality of looped optical transmission lines are connected to an optical multiplexer/demultiplexer, whilst a single looped optical transmission line is separated by said at least two of said plurality of looped optical transmission lines from said optical multiplexer/demultiplexer, so that optical signals are individually transmitted along said plurality of looped optical transmission lines, and wherein all of said plurality of optical transmission line junctions have said optical devices.

2. The optical loop-structured circuit as claimed in claim 1, wherein, all of said plurality of optical transmission line junctions have said optical devices, and said optical device reduces the optical power loss by not less than 5 dB as compared to the 1:1 optical coupler.

3. The optical loop-structured circuit as claimed in claim 1, wherein at least one of said plurality of looped optical transmission lines has at least a single set of an optical amplifier and an optical isolator so that said optical loop-structured circuit has a function of an optical amplifier.

4. The optical loop-structured circuit as claimed in claim 3, wherein said at least one of said plurality of looped optical transmission lines is further connected to at least two set of an optical receiver and an optical transmitter so that said optical loop-structured circuit has a function of an optical add-drop multiplexer.

5. The optical loop-structured circuit as claimed in claim 1, wherein at least one of said plurality of looped optical transmission lines has at least a single set of an optical attenuator and an optical isolator so that said optical loop-structured circuit has a function of an optical equalizer.

6. The optical loop-structured circuit as claimed in claim 1, wherein each of said plurality of looped optical transmission lines has at least a single set of an optical amplifier and an optical isolator so that said optical loop-structured circuit has a function of an optical amplifier.

7. The optical loop-structured circuit as claimed in claim 6, wherein each of said plurality of looped optical transmission lines is further connected to at least two set of an optical receiver and an optical transmitter so that said optical loop-structured circuit has a function of an optical add-drop multiplexer.

8. The optical loop-structured circuit as claimed in claim 1, wherein each of said plurality of looped optical transmission lines has at least a single set of an optical attenuator and an optical isolator so that said optical loop-structured circuit has a function of an optical equalizer.

9. The optical loop-structured circuit as claimed in claim 1, wherein said optical device comprises an optical multiplexer/demultiplexer.

10. The optical loop-structured circuit as claimed in claim 1, wherein said optical device comprises an optical multiplexer.

11. The optical loop-structured circuit as claimed in claim 1, wherein said optical device comprises an optical demultiplexer.

12. An optical loop-structured circuit having at least a plurality of looped optical transmission lines having at least a plurality of optical transmission line junctions from which at least three optical transmission lines extend, wherein at least one of said plurality of optical transmission line junctions has an optical circulator, which is connected to said at least three optical transmission lines, so that said optical circulator serves as a same role as an optical coupler so as to reduce an optical power loss when an optical signal is transmitted through one said optical transmission line junction, wherein at least two of said plurality of looped optical transmission lines are connected to an optical multiplexer/demultiplexer, whilst a single looped optical transmission line is separated by said at least two of said plurality of looped optical transmission lines from said optical multiplexer/demultiplexer, so that optical signals are individually transmitted along said plurality of looped optical transmission lines, and wherein all of said plurality of optical transmission line junctions have said optical circulators.

13. The optical loop-structured circuit as claimed in claim 12, wherein all of said plurality of optical transmission line junctions have said optical circulators.

14. The optical loop-structured circuit as claimed in claim 12, wherein at least one of said plurality of looped optical transmission lines has at least a single set of an optical amplifier and an optical isolator so that said optical loop-structured circuit has a function of an optical amplifier.

15. The optical loop-structured circuit as claimed in claim 14, wherein said at least one of said plurality of looped optical transmission lines is further connected to at least two set of an optical receiver and an optical transmitter so that said optical loop-structured circuit has a function of an optical add-drop multiplexer.

16. The optical loop-structured circuit as claimed in claim 12, wherein at least one of said plurality of looped optical transmission lines has at least a single set of an optical attenuator and an optical isolator so that said optical loop-structured circuit has a function of an optical equalizer.

17. The optical loop-structured circuit as claimed in claim 12, wherein each of said plurality of looped optical transmission lines has at least a single set of an optical amplifier and an optical isolator so that said optical loop-structured circuit has a function of an optical amplifier.

18. The optical loop-structured circuit as claimed in claim 17, wherein each of said plurality of looped optical transmission lines is further connected to at least two set of an optical receiver and an optical transmitter so that said optical loop-structured circuit has a function of an optical add-drop multiplexer.

19. The optical loop-structured circuit as claimed in claim 12, wherein each of said plurality of looped optical transmission lines has at least a single set of an optical attenuator and an optical isolator so that said optical loop-structured circuit has a function of an optical equalizer.

20. An optical loop-structured circuit having at least a plurality of looped optical transmission lines having at least a plurality of optical transmission line junctions from which at least three optical transmission lines extend, wherein at least one of said plurality of optical transmission line junctions has an optical device configured for performing at least a wavelength demultiplexing function, which is connected to said at least three optical transmission lines, so that said optical device serves as a same role as an optical coupler so as to reduce an optical power loss as compared to a 1:1 optical coupler when an optical signal is transmitted through one said optical transmission line junction, wherein, each said optical device comprises a three port optical multiplexer/demultiplexer that demultiplexes a signal accepted at a first port connected to the optical transmission line connected into two different wavelength optical signals available respectively at a second port and a third port, the second port is connected to input to an optical isolator, the third port is connected to input to an ON-OFF amplifier, and a total power of the two different wavelength optical signals is greater than a total optical power of the signal accepted at the first port connected to the optical line connection to the master multiplexer/demultiplexer.

21. A wavelength-multiplexed optical add-drop circuit, comprising:

a master optical multiplexer/demultiplexer having a signal input port and a signal output port; and plural looped optical transmission paths connecting to the master multiplexer/demultiplexer, each optical transmission path comprising an optical line connected to the master multiplexer/demultiplexer, a three port optical device connected to the optical line, and an on/off switchable amplifier connected to an output of the three port optical device, an output of the switchable amplifier of a first one of the optical transmission paths feeding into an input of the three port optical device of a second one of the optical transmission paths, an output of the switchable amplifier of a last of the optical transmission paths feeding into an input of the three port optical device of the first one of the optical transmission paths, wherein, operation as an add-drop multiplexer is accomplished by switching the switchable amplifiers selectively ON and OFF.

22. The circuit of claim 21, wherein, said three port optical device reduces the optical power loss by not less than 5 dB as compared to a 1:1 optical coupler.

23. The circuit of claim 21, wherein, each three port optical device comprises an optical multiplexer/demultiplexer that demultiplexes a signal accepted at a first port connected to the optical line connected to the master multiplexer/demultiplexer into two different wavelength optical signals available respectively at a second port and a third port, the second port is connected to input to an optical isolator, the third port is connected to input to the associated on/off switchable amplifier, and a total power of the two different wavelength optical signals is greater than a total optical power of the signal accepted at the first port connected to the optical line connection to the master multiplexer/demultiplexer.

24. The circuit of claim 23, wherein, each optical isolator is located at an output of one on/off switchable amplifier.

25. The circuit of claim 24, wherein, each optical line of each transmission path further comprises i) a first receiver side optical coupler, an optical receiver connected to the first receiver side optical coupler, a first transmitter side optical coupler, and an optical transmitter connected to the first transmitter side optical coupler.

26. The circuit of claim 25, wherein, an input signal is demultiplexed by master multiplexer/demultiplexer so that input signals of different wavelengths are transmitted on each transmission path and via each first receiver side optical coupler into each optical receiver, switching OFF the switchable amplifier of the first transmission path discontinues transmission through the input of the three port optical device of the second optical transmission path and a first substitute signal is transmitted from optical transmitter of the second optical transmission path so that the first substitute signal is then transmitted through the second optical transmission line to the master optical multiplexer/demultiplexer where the first substitute signal is multiplexed to output the signal output signal of the master multiplexer/demultiplexer.

27. The circuit of claim 21, wherein, each three port optical device comprises an optical circulator that accepts at a first signal at a first port connected to the optical line connected to the master multiplexer/demultiplexer, accepts a second signal at a second port that is fed by one of the switchable amplifiers, and outputs a third signal at a third port that feeds another optical circulator.

28. The circuit of claim 27, wherein, each optical line of each transmission path further comprises i) a first receiver side optical coupler, an optical receiver connected to the first receiver side optical coupler, a first transmitter side optical coupler, and an optical transmitter connected to the first transmitter side optical coupler, an input signal is demultiplexed by master multiplexer/demultiplexer so that input signals of different wavelengths are transmitted on each transmission path and via each first receiver side optical coupler into each optical receiver, and switching OFF the switchable amplifier of the first transmission path discontinues transmission from the third port output, of the circulator of the first optical transmission path to the second port input of the circulator of the second optical transmission path and a first substitute signal is transmitted from the optical transmitter of the second optical transmission path so that the first substitute signal is then transmitted through the second optical transmission line to the master optical multiplexer/demultiplexer where the first substitute signal is multiplexed to output the signal output signal of the master multiplexer/demultiplexer.

* * * * *